(12) United States Patent
Sekiguchi et al.

(10) Patent No.: US 8,562,080 B2
(45) Date of Patent: Oct. 22, 2013

(54) BRAKE SYSTEM FOR ENGINE-OPERATED VEHICLE AND CONTROLLING METHOD THEREOF

(75) Inventors: Hideki Sekiguchi, Isesaki (JP); Toshiya Oosawa, Atsugi (JP); Satoru Watanabe, Isesaki (JP); Tomoyuki Murakami, Isesaki (JP); Akihiro Sato, Atsugi (JP); Motohiro Higuma, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 959 days.

(21) Appl. No.: 12/382,268

(22) Filed: Mar. 12, 2009

(65) Prior Publication Data

US 2009/0230761 A1 Sep. 17, 2009

(30) Foreign Application Priority Data

Mar. 13, 2008 (JP) ................. 2008-064021

(51) Int. Cl.
 *B60T 13/46* (2006.01)
 *F02D 9/06* (2006.01)
(52) U.S. Cl.
 USPC ............................................ 303/12; 477/206
(58) Field of Classification Search
 USPC ........... 303/3, 4, 10–12, 122, 122.09, 122.12, 303/122.13; 123/90.1–90.67, 399; 477/205, 477/206; 60/547.1
 See application file for complete search history.

(56) References Cited

U.S. PATENT DOCUMENTS

| | | | | |
|---|---|---|---|---|
| 5,938,297 A | * | 8/1999 | Whaite et al. | 303/114.3 |
| 6,244,676 B1 | * | 6/2001 | Watanabe et al. | 303/191 |
| 6,398,316 B1 | * | 6/2002 | Mizutani et al. | 303/114.3 |
| 6,851,409 B2 | | 2/2005 | Machida et al. | |
| 2001/0002589 A1 | | 6/2001 | Kawasaki et al. | |
| 2001/0013322 A1 | | 8/2001 | Arai et al. | |
| 2001/0037780 A1 | | 11/2001 | Arai et al. | |
| 2002/0046732 A1 | | 4/2002 | Katou | |
| 2002/0060495 A1 | | 5/2002 | Mizutani et al. | |
| 2002/0060496 A1 | | 5/2002 | Mizutani et al. | |
| 2002/0067072 A1 | | 6/2002 | Mizutani et al. | |
| 2003/0075151 A1 | | 4/2003 | Machida et al. | |
| 2006/0158028 A1 | * | 7/2006 | Ichikawa | 303/114.3 |
| 2006/0186729 A1 | * | 8/2006 | Lehmann et al. | 303/11 |
| 2007/0221150 A1 | | 9/2007 | Inoue et al. | |
| 2009/0044614 A1 | * | 2/2009 | Kaestner et al. | 73/121 |

FOREIGN PATENT DOCUMENTS

| | | |
|---|---|---|
| DE | 19916888 | 12/1999 |
| DE | 102005009423 | 9/2006 |
| DE | 10 2007 000 174 A1 | 10/2007 |

(Continued)

*Primary Examiner* — Bradley King
*Assistant Examiner* — Vishal Sahni
(74) *Attorney, Agent, or Firm* — Antonelli, Terry, Stout & Kraus, LLP.

(57) ABSTRACT

A brake system provided with a brake booster using intake negative pressure of an engine for boosting a brake operating force for a vehicle. A requested braking force is detected base on an operating amount of a brake pedal, and when the requested braking force is less than a threshold value, a master cylinder pressure prevailing in the master cylinder using an operating force boosted by the brake booster is supplied to the wheel cylinder. On the other hand, when the requested braking force is greater than or equal to the threshold value, brake fluid pressure having been boosted by a pump is supplied to the wheel cylinder. The threshold value is set to a value that becomes greater the larger the negative pressure inside the brake booster.

29 Claims, 47 Drawing Sheets

(56) References Cited

FOREIGN PATENT DOCUMENTS

| | | |
|---|---|---|
| EP | 1 302 645 A2 | 4/2003 |
| EP | 1 302 645 A3 | 4/2003 |
| JP | 08-295231 | 11/1996 |
| JP | 09-086366 | 3/1997 |
| JP | 10-291469 | 11/1998 |
| JP | 2000-016260 | 1/2000 |
| JP | 2000-211494 | 8/2000 |
| JP | 2001-041067 | 2/2001 |
| JP | 2001-173470 | 6/2001 |
| JP | 2001-241339 | 9/2001 |
| JP | 2002-70604 | 3/2002 |
| JP | 2003-049673 | 2/2003 |
| JP | 2003-129806 | 5/2003 |
| JP | 2003-184587 | 7/2003 |
| JP | 2005-023874 | 1/2005 |
| JP | 2005-163634 | 6/2005 |
| JP | 2006-168412 | 6/2006 |
| JP | 2007-262914 | 10/2007 |

* cited by examiner

FIG. 27

| No | 1 | 2 | 3 | 4 | 5 | 6 | 7 | 8 | 9 |
|---|---|---|---|---|---|---|---|---|---|
| FL, RR system | Pressure increase | | | Pressure maintenance | | | Pressure reduction | | |
| FR, RL system | Pressure increase | Pressure maintenance | Pressure reduction | Pressure increase | Pressure maintenance | Pressure reduction | Pressure increase | Pressure maintenance | Pressure reduction |
| FL, RR system Gate valve | Closed | Closed | | Intermediate open | Closed | | Open | Open | Open |
| FR, RL system Gate valve | Intermediate open | Intermediate open | Open | Closed | Closed | Open | Closed | Closed | Open |
| Motor | ON | ON | ON | ON | OFF | OFF | ON | OFF | OFF |

FIG. 28

| | Pressure increase | Pressure reduction | Maintenance | Non-controlled |
|---|---|---|---|---|
| Supply valve | Open | Closed | Closed | Open |
| Relief valve | Closed | Open | Closed | Closed |

1. STRATIFIED LEAN COMBUSTION OPERATION REGION
2. HOMOGENEOUS LEAN COMBUSTION OPERATION REGION
3. HOMOGENEOUS STOCHIOMETRIC COMBUSTION OPERATION REGION

BRAKE SYSTEM FOR ENGINE-OPERATED VEHICLE AND CONTROLLING METHOD THEREOF

BACKGROUND OF THE INVENTION

1. Field of the Invention

The present invention relates to a brake system for an engine-operated vehicle and, more particularly, it relates to a brake system of the described type, adapted for being cooperated with an engine mounted on the vehicle and provided with a unit capable of employing intake negative pressure occurring in the engine in order to boost a brake operating force that is applied to the brake system of the vehicle. The present invention also relates to a method of controlling an operation of a brake system.

2. Description of the Related Art

Japanese Laid-open (Kokai) Patent Application Publication No. 2005-163634 discloses that in a vehicle provided with: a variable valve mechanism capable of continuously changing a lift characteristic of an intake valve; a negative pressure adjusting valve capable of adjusting intake negative pressure of an engine; and a brake booster into which intake negative pressure occurring in the engine may be introduced, whereby the intake negative pressure of the engine is increased as soon as negative pressure prevailing in the brake booster is reduced to a pressure level which is less than or equal to a predetermined value.

Japanese Laid-open (Kokai) Patent Application Publication No. 2006-168412 discloses that assistant fluid pressure is added to master cylinder fluid pressure based on a deviation between an actual vehicle deceleration and a target vehicle deceleration that corresponds to master cylinder fluid pressure.

Moreover, Japanese Laid-open (Kokai) Patent Application Publication No. 2006-168412 discloses that assistant fluid pressure is added to master cylinder fluid pressure so that a brake operating force may be boosted, even after a boosting limit point of a brake booster, in a way similar to that before the boosting limit point.

In the invention disclosed in the first-mentioned Japanese Laid-open (Kokai) Patent Application Publication No. 2005-163634, when the negative pressure within the brake booster decreases, negative pressure is increased regardless of the presence of a request for brake application or of a request for an increase in a braking force. As a result, there has been a problem in that pumping loss is significant, resulting in reduced fuel economy.

At this stage, it is to be understood that throughout the description of the present patent application, a reduction in negative pressure refers to a technical condition such that a pressure below atmospheric pressure becomes close to atmospheric pressure.

Furthermore, the invention disclosed in Japanese Laid-open (Kokai) Patent Application Publication No. 2006-168412 is to compensate for a deficiency of wheel cylinder pressure with fluid pressure supplied from a pump, and it is not intended to suppress a reduction in intake negative pressure of an engine. Hence, the invention of this publication has nothing to do with suppression of deterioration in fuel economy that must be caused by pumping loss.

SUMMARY OF THE INVENTION

Therefore, an object of the present invention is to provide a vehicle brake system and a vehicle braking method that can suppress a reduction in intake negative pressure occurring in an engine, namely intake negative pressure of the engine, which is mounted on the vehicle while supplying required fluid pressure to wheel cylinders.

In general, in order to achieve the above object, the present invention is made such that: a first fluid pressure is generated according to a brake operating force that has been boosted with use of intake negative pressure of an engine; a pump generates second fluid pressure; the first fluid pressure is supplied to a wheel cylinder when a requested braking force is lower than a threshold value that is set according to the state of intake negative pressure generation of the engine; and the second fluid pressure having been switched from the first fluid pressure is supplied to the wheel cylinder when the requested braking force is greater than or equal to the threshold value.

The above and other objects and features of this invention will become understood from the following description with reference to the accompanying drawings.

BRIEF DESCRIPTION OF THE DRAWINGS

FIG. 27 is a diagram illustrating pump up pressure control patterns in the brake hydraulic circuit shown in FIG. 25;

FIG. 28 is a diagram illustrating hydraulic control patterns for each wheel cylinder in the brake hydraulic circuit shown in FIG. 25;

DESCRIPTION OF THE PREFERRED EMBODIMENTS

Figure 1:
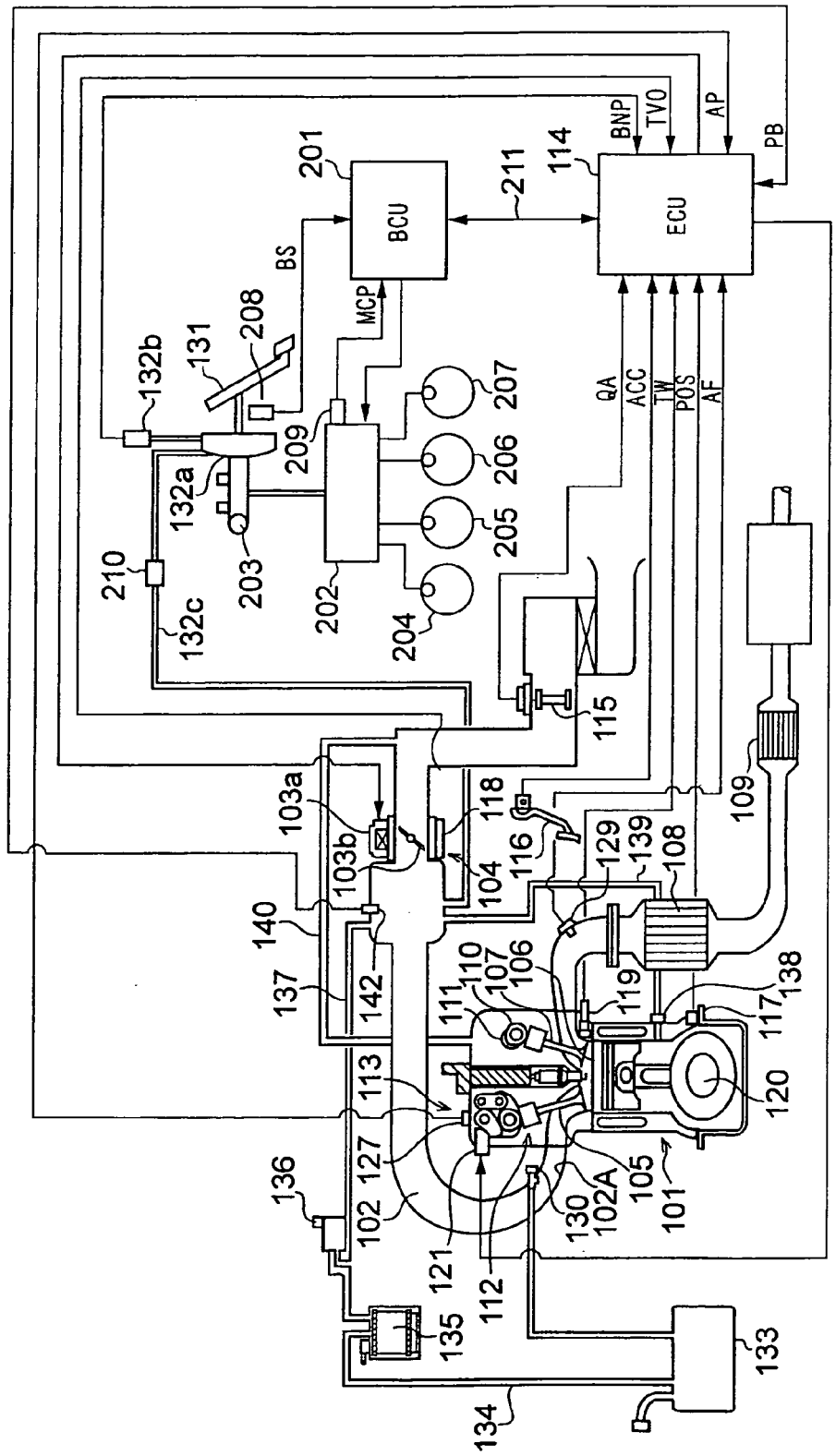
FIG. 1 is a block diagram of an engine in an embodiment of the present invention.

FIG. 1 is a diagram illustrating a configuration of a vehicle engine and a vehicle brake system in an embodiment.

An engine 101 shown in FIG. 1 is an internal combustion engine, more specifically, a spark ignition type gasoline engine.

In an intake pipe 102 of engine 101, there is interposed an electronically controlled throttle 104 in which a throttle motor 103a drives a throttle valve 103b to open and close.

Furthermore air is suctioned into a combustion chamber 106 via electronically controlled throttle 104 and an intake valve 105.

Fuel is injected from a fuel injection valve 130 disposed in an air intake port 102A of each cylinder.

Combustion exhaust gas is discharged from combustion chamber 106 via an exhaust valve 107 and is purified in a front catalyst converter 108 and a rear catalyst converter 109, and is then discharged into the atmosphere.

Exhaust valve 107 is driven by a cam 111 pivotally supported on an exhaust cam shaft 110 so as to open and close, while maintaining a constant valve lift amount, valve operating angle, and valve timing.

On the other hand, intake valve 105 is such that the valve lift amount and the valve operating angle, and the center phase of the valve operating angle can be continuously changed by a variable lift mechanism 112 and a variable valve timing mechanism 113.

An engine control unit (ECU) 114 having a built-in micro computer sets a target opening of throttle valve 103b and a target opening characteristic of intake valve 105 in order to obtain a target air intake amount and a target intake negative pressure, and based on these target values, controls electronically controlled throttle 104, variable valve lift mechanism 112, and variable valve timing mechanism 113.

Specifically, by controlling the opening characteristic of intake valve 105 by variable valve lift mechanism 112 and variable valve timing mechanism 113, the air intake amount of engine 101 is controlled, and electronically controlled throttle 104 controls the generation of intake negative pressure.

That is to say, generation of the intake negative pressure by electronically controlled throttle 104 is not for controlling the air intake amount, but is for supplying negative pressure to equipment (such as brake booster 132a, an evaporated fuel treatment apparatus, and a blowby gas treatment apparatus described later) that use intake negative pressure (intake pipe negative pressure) of engine 101.

Consequently, by using engine 101, operation thereof under a low intake negative pressure condition is possible, and fuel economy and output performance can be improved.

To engine control unit 114 is input detection signals from; an accelerator pedal sensor 116 that detects an accelerator opening ACC, an air flow sensor 115 that detects an air intake amount QA, a crank angle sensor 117 that outputs an angle signal POS of a crank shaft 120, a throttle sensor 118 that detects an opening TVO of throttle valve 103b, a water temperature sensor 119 that detects a cooling water temperature TW of engine 101, and an intake pressure sensor 142 that detects intake negative pressure (intake pipe negative pressure) PB of engine 101.

Based on an angle signal POS from crank angle sensor 117, an engine rotating speed NE is calculated in engine control unit 114.

Moreover, engine 101 is provided with an evaporated fuel treatment apparatus in which evaporated fuel generated in a fuel tank 133 is temporarily adsorbed in a canister 135 via an evaporated fuel passage 134, and the evaporated fuel that has been desorbed from canister 135 is suctioned, via a purge passage 137 provided with a purge control valve 136, into an intake passage on the downstream of throttle valve 103b.

Furthermore, engine 101 is provided with a blowby gas treatment apparatus in which blowby gas accumulated within the crank case is suctioned, via a blowby gas passage 139 with a PCV (positive crankcase ventilation valve) 138 interposed therein, into the intake passage on the downstream side of throttle valve 103b, and fresh air on the upstream side of throttle valve 103b is introduced via a fresh air passage 140 into the crankcase through the cylinder head.

Meanwhile, there is provided a brake hydraulic circuit comprising brake booster (negative pressure boosting device) 132a that uses intake negative pressure (intake pipe negative pressure) of engine 101 to boost a brake operating force.

The brake hydraulic circuit comprises: brake booster 132a that boosts an operating force of a brake pedal 131; a tandem type master cylinder 203 in which a master cylinder pressure (first fluid pressure) is generated according to the operating force boosted by brake booster 132a; and a hydraulic unit 202 that supplies the master cylinder pressure to respective wheel cylinders 204 through 207.

Intake negative pressure on the downstream side of throttle valve 103b is to be introduced into brake booster 132a via a negative pressure introduction pipe 132c. A check valve 210 is interposed partway along negative pressure introduction pipe 132c.

To a brake control unit (BCU) 201 having a built-in microcomputer, that controls a solenoid valve and a motor included in hydraulic unit 202 is input signals from a negative pressure sensor 132b that detects negative pressure (booster negative pressure) BNP in a negative pressure chamber of brake booster 132a, a brake pedal sensor 208 that detects a stroke amount BS of brake pedal 131, and a fluid pressure sensor 209 that detects master cylinder pressure MCP.

Engine control unit 114 and brake control unit 201 are connected by a communication circuit 211 so as to be able to mutually communicate, and they mutually transmit/receive detection results from the various kinds of sensors.

Figure 2:
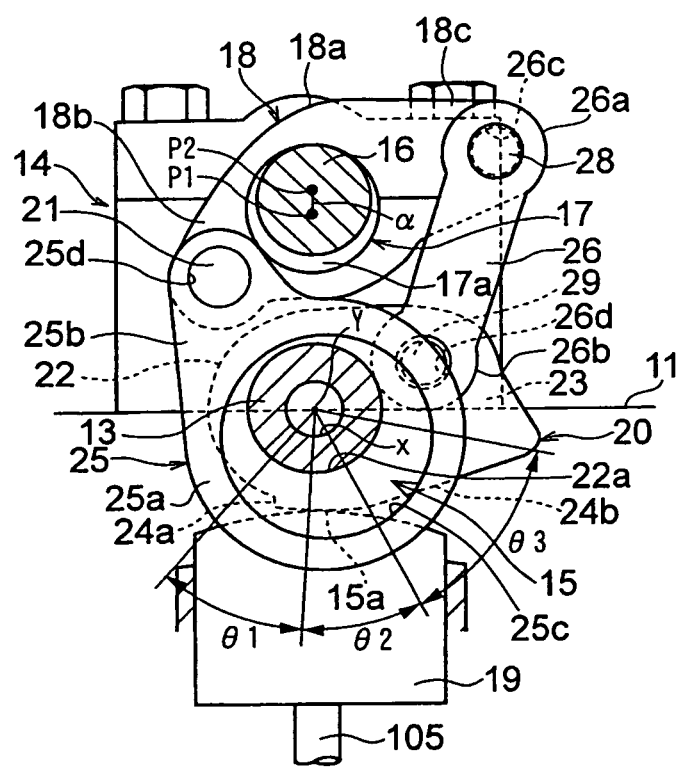
FIG. 2 is a sectional view illustrating a variable valve lift mechanism (VEL) in the embodiment of the present invention.
Figure 3:
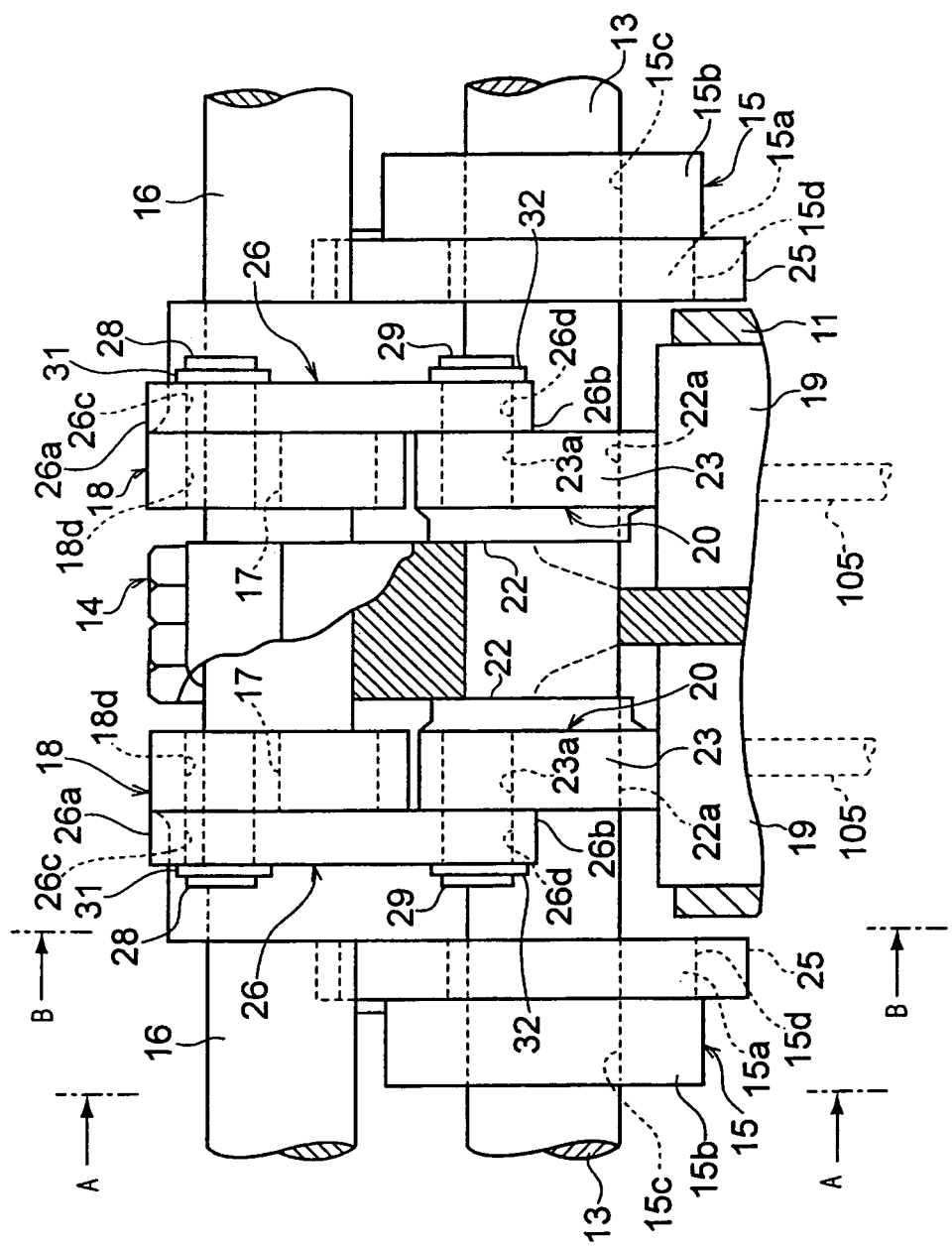
FIG. 3 is a side view of the above variable valve lift mechanism.
Figure 4:
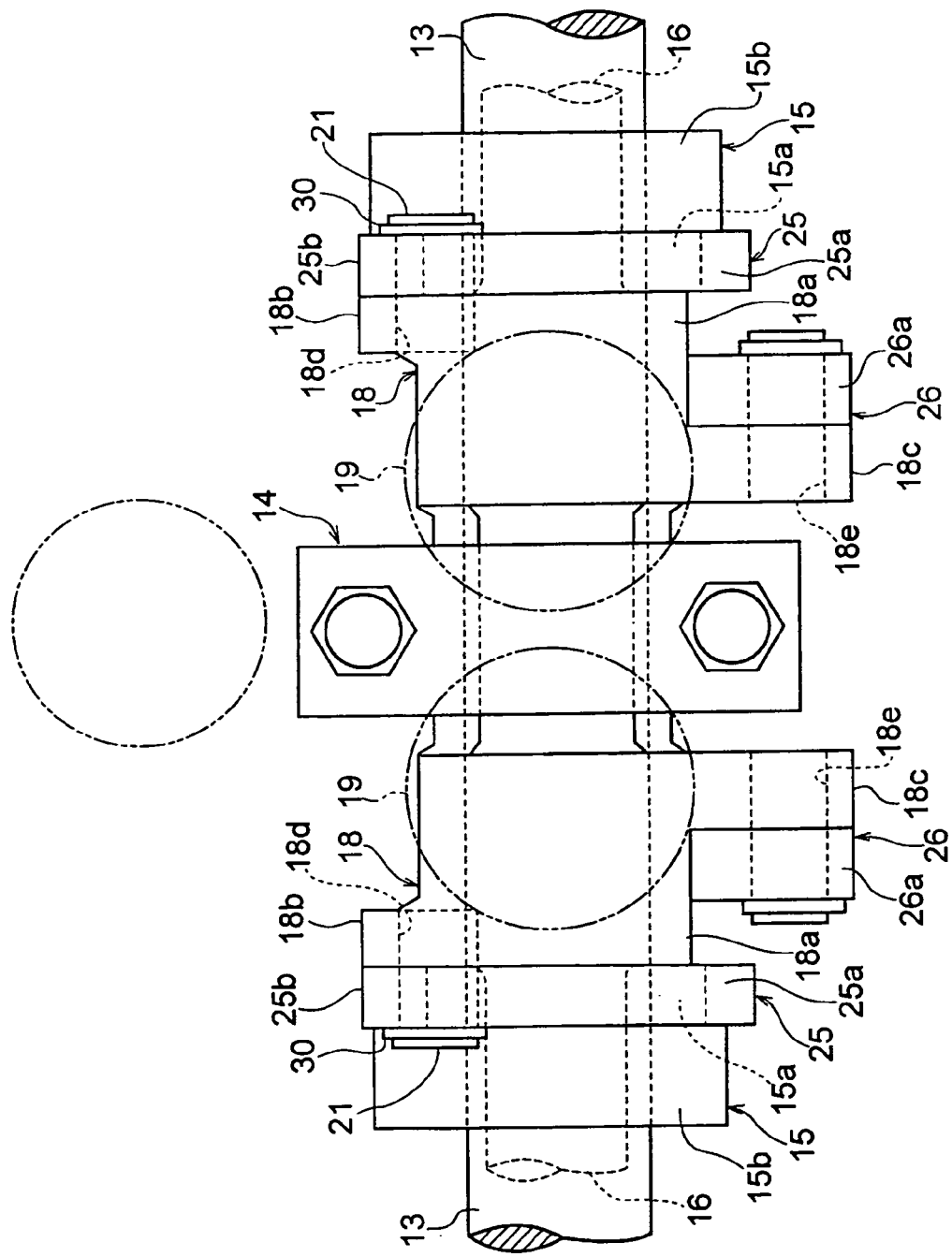
FIG. 4 is a plan view of the above variable valve lift mechanism.

FIG. 2 to FIG. 4 show the structure of variable valve lift mechanism (VEL) 112 in detail.

The variable valve lift mechanism shown in FIG. 2 to FIG. 4 is provided with: a pair of intake valves 105, 105; a hollow intake cam shaft 13 rotatably supported on a cam bearing 14 of a cylinder head 11; two eccentric cams 15, 15 (driving cams), which are rotating cams pivotably supported on intake cam shaft 13; a control shaft 16 rotatably supported on the same cam bearing 14 in an upper position of intake cam shaft 13; a pair of rocker arms 18, 18 oscillatably supported via a control cam 17 on control shaft 16; and a pair of independent oscillating cams 20, 20 disposed on the top end sections of respective intake valves 105, 105 via valve lifters 19, 19.

Eccentric cams 15, 15 and rocker arms 18, 18 are linked by link arms 25, 25, and rocker arms 18, 18 and oscillating cams 20, 20 are linked by link members 26, 26.

Rocker arms 18, 18, link arms 25, 25, and link members 26, 26 constitute a transmission mechanism.

Figure 5:
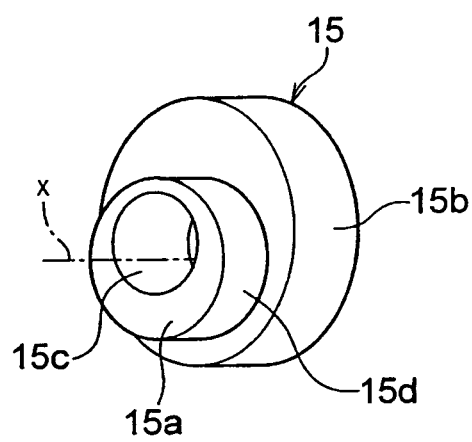
FIG. 5 is a perspective view illustrating an eccentric cam used in the above variable valve lift mechanism.

Eccentric cam 15 is of a substantially ring shape as shown in FIG. 5, and comprises a small diametered cam main body 15a and a flange section 15b that is integrally provided on the outer end face of cam main body 15a. A cam shaft insertion hole 15c is formed in the internal axial direction, and the central axis X of cam main body 15a is decentered by a predetermined amount from the central axis Y of intake cam shaft 13.

Moreover, eccentric cams 15 are press-fixed with respect to intake cam shaft 13 via cam shaft insertion hole 15c, on both of the outer sides where valve lifter 19 is not interfered with, and outer circumferential faces 15d of cam main bodies 15a are formed so as to have the same cam profile.

Rocker arm 18 is bent-formed in a substantially crank shape as shown in FIG. 4, and a base section 18a in the center thereof is rotatably supported on control cam 17.

Moreover, in one end section 18b provided so as to protrude on the outer end section of base section 18a, there is through-formed a pin hole 18d into which a pin 21 linking with the tip end of link arm 25 is press-fitted, and on an other end section 18c provided so as to protrude on the inner end section of base section 18a, there is formed a pin hole 18e into which a pin 28 joining with one end section 26a described later of each of link members 26 is press-fitted.

Control cam 17 is of a circular cylinder shape and is fixed on the outer circumference of control shaft 16, and as shown in FIG. 2, the position of a central axis P1 is decentered by a from a central axis P2 of control shaft 16.

Figure 6:
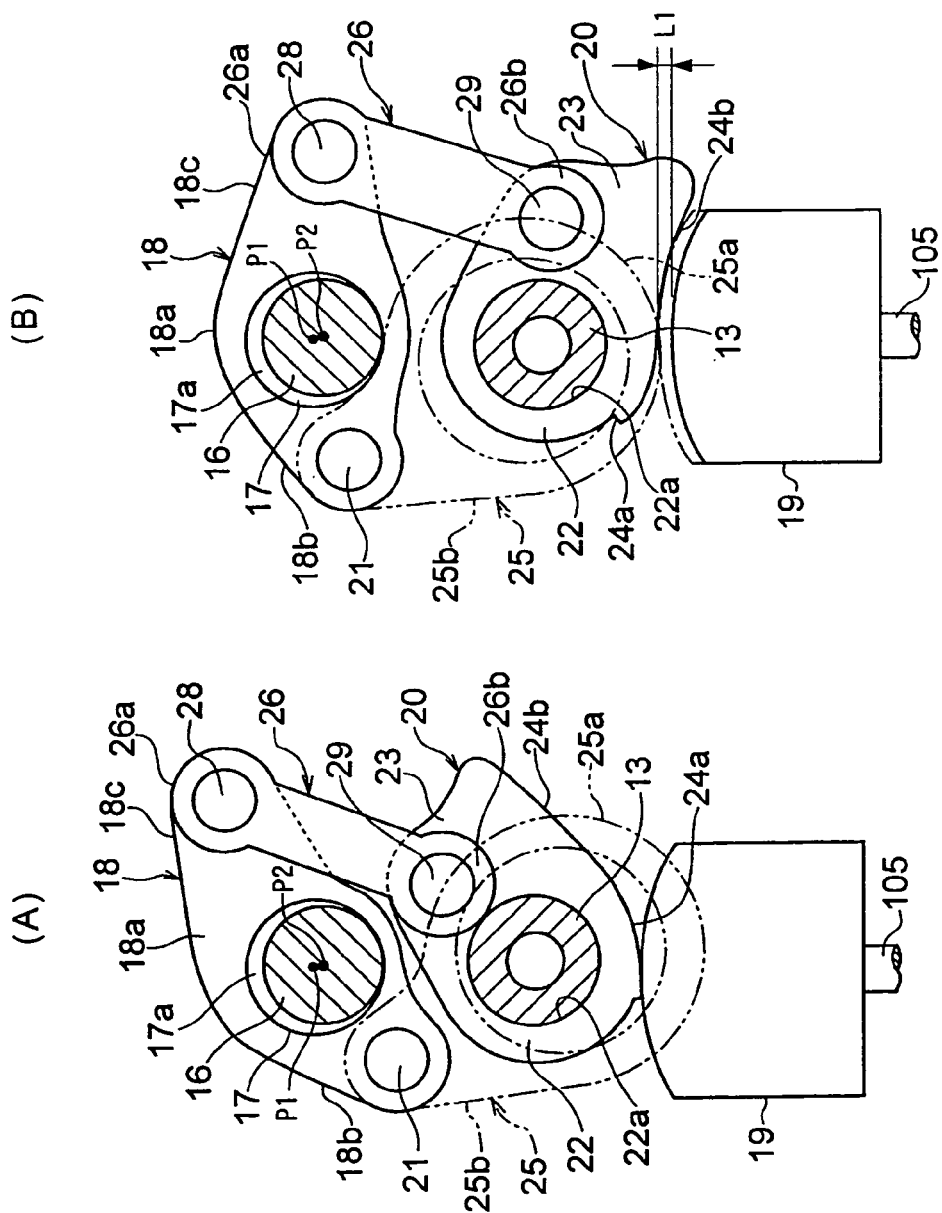
FIG. 6 is a sectional view illustrating a state where the above variable valve lift mechanism is controlled to perform low valve lift.
Figure 7:
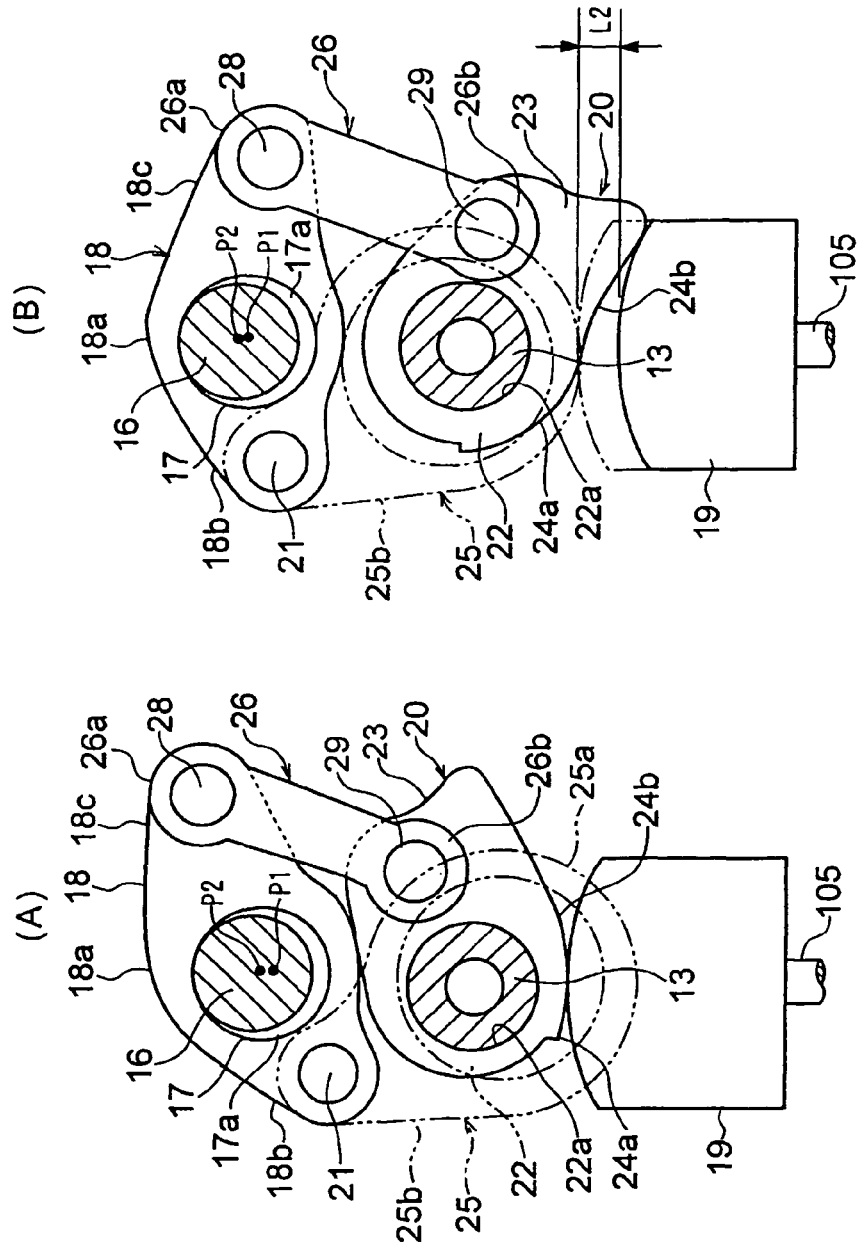
FIG. 7 is a sectional view illustrating a state where the above variable valve lift mechanism is controlled to perform high valve lift.

Oscillating cam 20 is of a substantially lateral U shape as shown in FIG. 2, FIG. 6 and FIG. 7, and in a substantially toric shaped base end section 22 there is through-formed a supporting hole 22a through and on which intake cam shaft 13 is insert-fitted and rotatably supported, and a pin hole 23a is through-formed in an end section 23 positioned on the other end section 18c side of rocker arm 18.

Moreover, on the under face of oscillating cam 20, there are formed a base circular face 24a on base end section 22 side and a cam face 24b that extends in an arc shape from base circular face 24a towards end section 23 side. Base circular face 24a and cam face 24b are to come in contact with predetermined positions on the top face of each of valve lifters 19 according to the oscillating position of oscillating cam 20.

Figure 8:
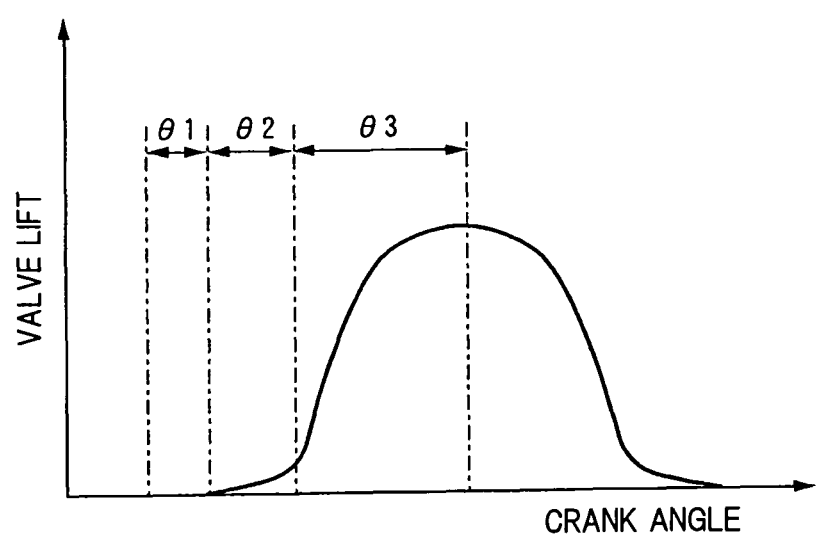
FIG. 8 is a diagram of the valve lift characteristic corresponding to the base end surface and the cam surface of an oscillating cam in the above variable valve lift mechanism.

That is to say, as can be seen from the valve lift characteristic shown in FIG. 8, it is set such that: a predetermined angle range θ1 of base circular face 24a becomes a base circle section; a predetermined angle range θ2 from base circle section θ1 of cam face 24b becomes a so called ramp section; and furthermore a predetermined angle range θ3 from ramp section θ2 of cam face 24b becomes a lift section.

Moreover, link arm 25 is provided with a toric shaped base section 25a and a protruding end 25b that is provided so as to protrude in a predetermined position on the outer circumferential face of base section 25a. In the center position of base section 25a there is formed a fitting hole 25c that rotatably fits with the outer circumferential face of cam main body 15a of eccentric cam 15, and in protruding end 25b, there is through-formed a pin hole 25d through which pin 21 is rotatably inserted.

Furthermore, link member 26 is formed in a straight line of a predetermined length, and in both of circular shaped end sections 26a and 26b, there are through-formed pin insertion holes 26c and 26d, through which the end sections of respective pins 28 and 29, which are press-fitted into respective pin holes 18d and 23a of the other end section 18c of rocker arm 18 and end section 23 of oscillating cam 20, are rotatably inserted. On one end section of respective pins 21, 28, and 29, there are provided snap rings 30, 31, and 32 that restrict axial direction movement of link arm 25 and link member 26.

In the above configuration, according to the positional relationship between central axis P2 of control shaft 16 and central axis P1 of control cam 17, the valve lift amount changes as shown in FIG. 6 and FIG. 7, and by rotation-driving control shaft 16, the position of central axis P2 of control shaft 16 is changed with respect to central axis P1 of control cam 17.

Figure 9:
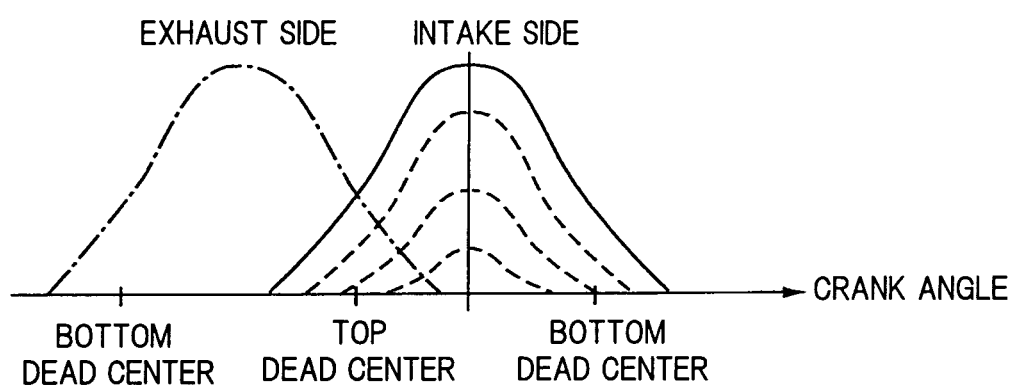
FIG. 9 is a diagram of the valve lift characteristic of the above variable valve lift mechanism.
Figure 10:
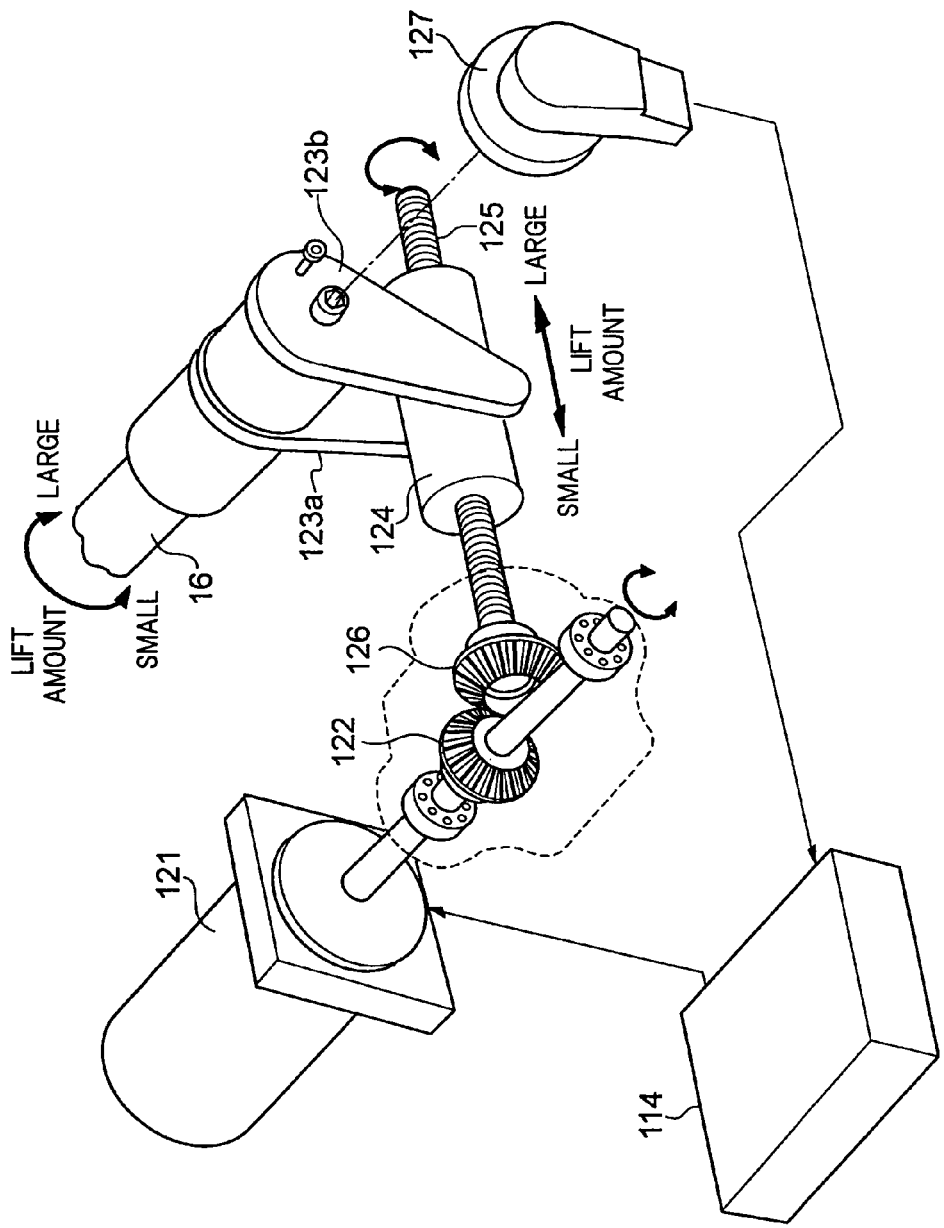
FIG. 10 is a perspective view illustrating a rotation driving mechanism of a control shaft in the above variable valve lift mechanism.

With the configuration shown in FIG. 10, control shaft 16 is rotation-driven by a DC servo motor (actuator) 121 within a predetermined rotation angle range, and the operating angle of control shaft 16 is changed by actuator 121, thereby continuously changing the valve lift amount and the valve operating angle of intake valve 105 (refer to FIG. 9).

In FIG. 10, DC servo motor 121 is disposed so that the rotating shaft thereof becomes parallel with control shaft 16, and a bevel gear 122 is pivotably supported on the tip end of the rotating shaft.

On the other hand, a pair of stays 123a and 123b is fixed on the tip end of control shaft 16, and a nut 124 is supported so as to be able to oscillate about the axis and in parallel with control shaft 16 that connects the tip end sections of the pair of stays 123a and 123b.

On the tip end of a threaded rod 125 to be threaded into nut 124, there is pivotably supported a bevel gear 126 to be meshed with bevel gear 122, and rotation of DC servo motor 121 causes threaded rod 125 to rotate and the position of nut 124 meshing with threaded rod 125 shifts in the axial direction of threaded rod 125, thereby rotating control shaft 16.

Here, the direction in which the position of nut 124 becomes closer to bevel gear 126 is the direction in which the valve lift amount becomes smaller. Conversely, the direction in which the position of nut 124 goes away from bevel gear 126 is the direction in which the valve lift amount becomes greater.

On the tip end of control shaft 16, as shown in FIG. 10, there is provided an angle sensor 127 that detects an angle position AP of control shaft 16. Engine control unit 114 feedback controls the operating amount (current flow amount and current flow direction) of DC servo motor 121 so that the actual angle position detected by angle sensor 127 matches with a target angle position.

The structure of variable valve lift mechanism (VEL) 112 is not limited to that mentioned above.

Figure 11:
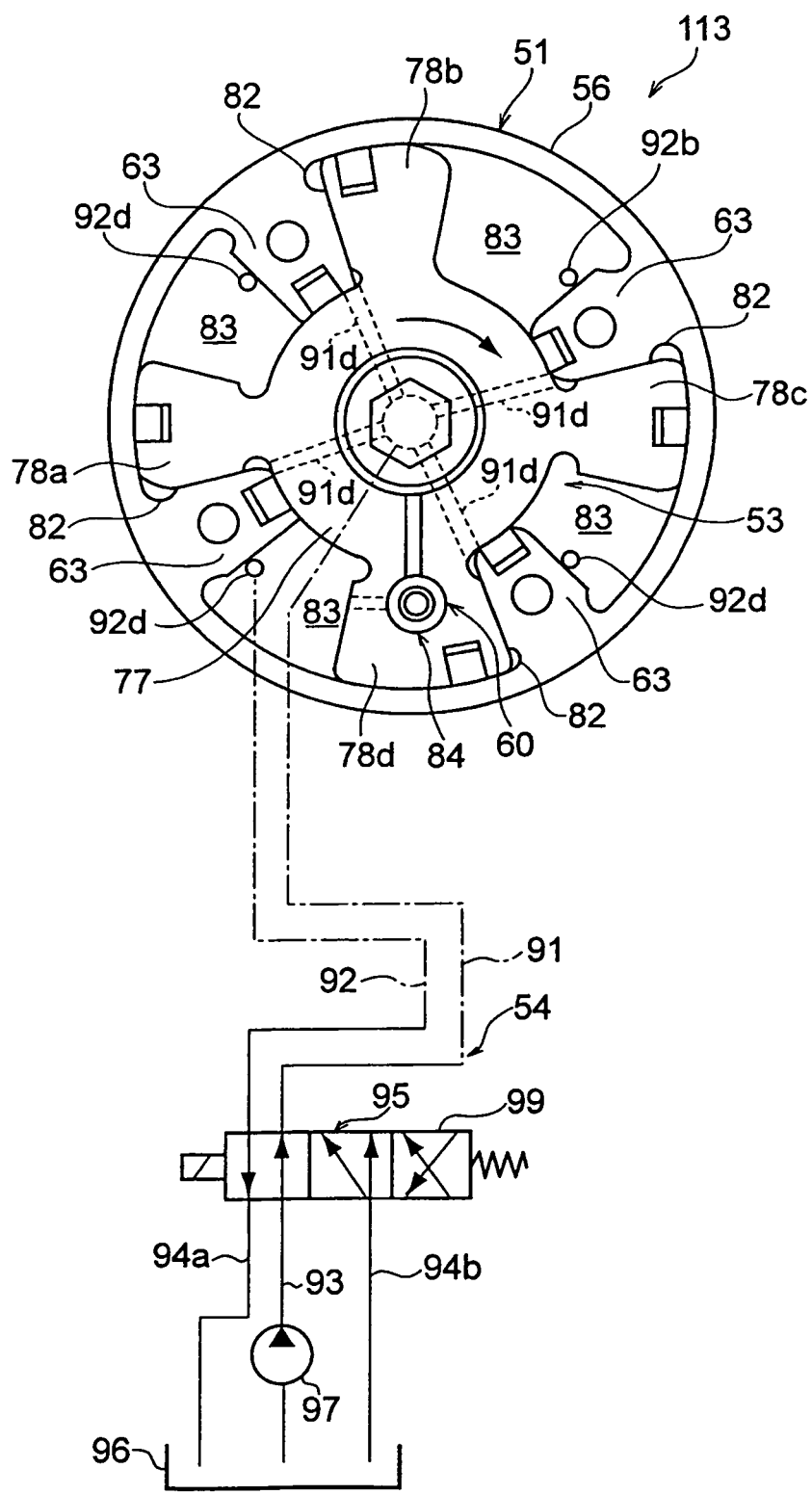
FIG. 11 is a sectional view illustrating a variable valve timing mechanism (VTC) in the embodiment of the present invention.

FIG. 11 shows the structure of variable valve timing mechanism (VTC) 113.

Variable valve timing mechanism 113 of the present embodiment is a hydraulic mechanism that is provided with: a cam sprocket 51 (timing sprocket) rotation-driven by crank shaft 120 via a timing chain; a rotation member 53 that is fixed on the end section of intake cam shaft 13 and rotatably housed within cam sprocket 51; a hydraulic circuit 54 that relatively rotates rotation member 53 with respect to cam sprocket 51; and a locking mechanism 60 that selectively locks the relative rotational position between cam sprocket 51 and rotation member 53 in a predetermined position.

Cam sprocket 51 comprises: a rotating section (not shown in the drawing) having a teeth section on the outer circumference thereof, with which the timing chain (or timing belt) meshes; a housing 56 that is disposed in front of the rotating section so as to rotatably house rotation member 53; and a front cover and a rear cover (not shown in the drawing) that block front/rear openings of housing 56.

Housing 56 is of a cylindrical shape, with both of the front/rear ends formed open ended, and on the inner circumferential face of housing 56 there are provided four protruding partition wall sections 63 in sectionally trapezoid shape along the circumferential direction of housing 56 at equal intervals of 90°.

Rotation member 53 is fixed on the front end section of intake cam shaft 13, and on the outer circumferential face of a toric shaped base section 77, there are provided four vanes 78a, 78b, 78c, and 78d at equal intervals of 90°.

First to fourth vanes 78a to 78d are respectively of substantially sectionally inverse trapezoid shape and are disposed in cavity sections between respective partition wall sections 63, and they partition these cavity sections in front and rear thereof in the rotational direction. Thereby, between both sides of vanes 78a to 78d and both end faces of the respective partition wall sections 63, there are formed an advance angle side hydraulic chamber 82 and a delay angle side hydraulic chamber 83.

Locking mechanism 60 is such that a lock pin 84 is insert-fitted into an engaging hole (not shown in the drawing) in a turning position on the maximum delay angle side of rotation member 53 (in a reference operation state).

Hydraulic circuit 54 has two systems of oil pressure passages, namely a first oil pressure passage 91 that supplies and discharges oil pressure with respect to advance angle side hydraulic chamber 82 and a second oil pressure passage 92 that supplies and discharges oil pressure with respect to delay angle side hydraulic chamber 83, and to both of these oil pressure passages 91 and 92, there are connected a supply passage 93 and drain passages 94a and 94b respectively via an electromagnetic switching valve 95 for switching the passages.

In supply passage 93, there is provided an engine-driven oil pump 97 that pressure feeds the oil inside an oil pan 96, while the downstream side ends of drain passages 94a and 94b are communicated with oil pan 96.

First oil pressure passage 91 is connected to four branched passages 91d that are formed in a substantially radial pattern in base section 77 of rotation member 53 so as to communicate with the respective advance angle side hydraulic chambers 82, and second oil pressure passage 92 is connected to four oil holes 92d that open to respective delay angle side hydraulic chambers 83.

Electromagnetic switching valve 95 is such that a spool valve therein carries out relative switching control between respective oil pressure passages 91 and 92, supply passage 93, and drain passages 94a and 94b.

ECU 114 controls a current flow amount to an electromagnetic actuator 99 that drives electromagnetic switching valve 95, based on a duty control signal, thereby controlling the center phase of an operating angle of intake valve 105.

For example, when a control signal of on-duty 0% (OFF signal) is output to electromagnetic actuator 99, the operating oil that has been pressure-fed from oil pump 47 travels through second oil pressure passage 92 to be supplied into delay angle side hydraulic chamber 83, and the operating oil within advance angle side hydraulic chamber 82 travels through first oil pressure passage 91 to be discharged from first drain passage 94*a* into oil pan 96.

Consequently, the internal pressure of delay angle side hydraulic chamber 83 becomes high, and the internal pressure of advance angle side hydraulic chamber 82 becomes low, and rotation member 53 rotates towards the maximum delay angle side via vanes 78*a* to 78*d*. As a result, the center phase the valve operating angle of intake valve 105 is shifted to the delay angle side.

On the other hand, when a control signal of on-duty 100% (ON signal) is output to electromagnetic actuator 99, the operating oil travels through first oil pressure passage 91 so as to be supplied into advance angle side hydraulic chamber 82, and the operating oil within delay angle side hydraulic chamber 83 travels through second oil pressure passage 92 and second drain passage 94*b* so as to be discharged into oil pan 96, thereby reducing the pressure of delay angle side hydraulic chamber 83.

Therefore, rotation member 53 rotates towards the advance angle side to a maximum extent via vanes 78*a* to 78*d*, thereby shifting the center phase of the valve operating angle of intake valve 105 to the advance angle side.

Thus, within a range where vanes 78*a* to 78*d* can relatively rotate in housing 56, the phase of intake cam shaft 13 with respect to crank shaft 120 continuously shifts between the most delay angle side position and the most advance angle side position, and the center phase of the operating angle of intake valve 105 continuously shifts.

In addition to the mechanism that uses oil pressure as described above, as variable valve timing mechanism 113, a variable valve timing mechanism in which a brake torque is made to act on a cam shaft may be used as disclosed in Japanese Laid-open (Kokai) Patent Application Publication No. 2003-129806 and Japanese Laid-open (Kokai) Patent Application Publication No. 2001-241339.

Furthermore, this may be a variable valve timing mechanism as disclosed in Japanese Laid-open (Kokai) Patent Application Publication No. 2007-262914 in which an electric motor is used as a driving source.

Figure 12:
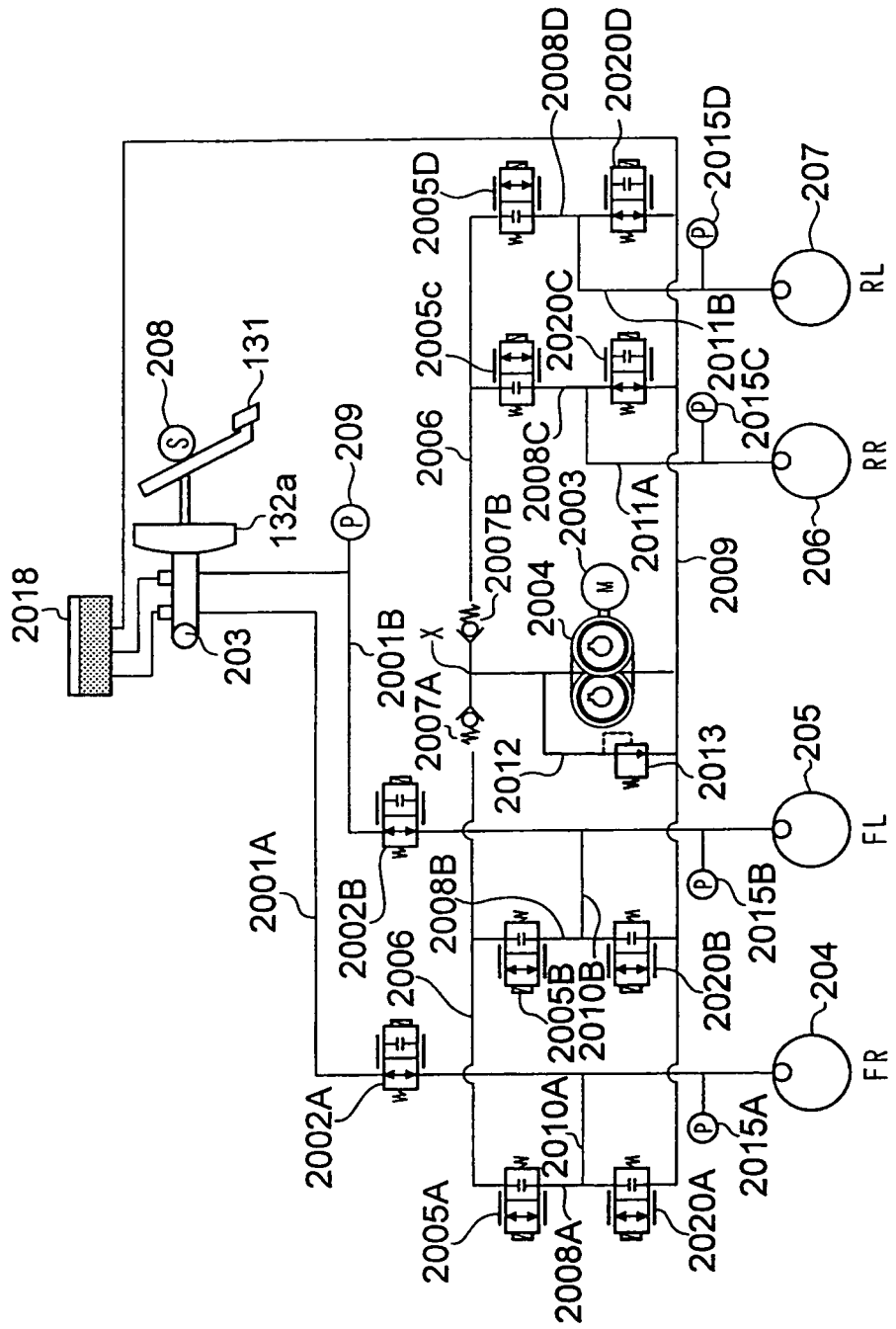
FIG. 12 is a diagram of a brake hydraulic circuit in the embodiment of the present invention.

FIG. 12 is a diagram illustrating details of hydraulic unit 202 in the brake hydraulic circuit.

In hydraulic unit 202 shown in FIG. 12, there are provided two independent supply pipes 2001A and 2001B to be connected from master cylinder 203 to respective wheel cylinders 204 and 205 of front wheels FR on the right and FL on the left, and in supply pipes 2001A and 2001B there are respectively interposed cutoff valves 2002A and 2002B.

Moreover, there is provided a pump 2004 driven by a motor 2003. Pump 2004 suctions brake fluid in a reservoir tank 2018 from a suction opening, raises the pressure of the brake fluid, and discharges it. Pump 2004 is, for example, a plunger or a gear pump.

A supply pipe 2006 connects a discharge port of pump 2004 with one of ports of supply valves 2005A to 2005D that control pump up pressure supply respectively to wheel cylinders 204, 205, 206, and 207.

Supply pipe 2006 branches into two on the downstream side of the discharge opening of pump 2004, and then it further branches into two so as to be respectively connected to one of the ports of supply valves 2005A to 2005D.

On the downstream side of the first branch point X of supply pipe 2006, there are interposed check valves 2007A and 2007B that only allow flows towards supply valves 2005A to 2005D.

First pipes 2008A to 2008D respectively connect the other port of supply valves 2005A to 2005D with one of the ports of relief valves 2020A to 2020D that control relief of the fluid pressure from wheel cylinders 204, 205, 206, and 207.

Moreover the other port of relief valves 2020A to 2020D is connected to a reservoir pipe 2009 that connects the intake opening of pump 2004 to reservoir tank 2018.

Furthermore, there are provided second pipes 2010A and 2010B that respectively connect a section partway along first pipes 2008A and 2008B to supply pipes 2001A and 2001B on the downstream side of cutoff valves 2002A and 2002B.

Moreover, there are provided third pipes 2011A and 2011B that respectively connect a section partway along first pipes 2008C and 2008D to wheel cylinders 206 and 207 of rear wheels RR on the right and RL on the left.

Furthermore there is provided a relief pipe 2012 that connects supply pipe 2006 immediately after the discharge opening of pump 2004 to reservoir pipe 2009 immediately before the intake opening of pump 2004, and in relief pipe 2012 there is interposed a relief valve 2013 that opens when the fluid pressure on the pump discharge side exceeds a set pressure.

Cutoff valves 2002A and 2002B and relief valves 2020C and 2020D are solenoid valves that are biased towards a valve opening direction by a spring and are closed by application of electric current to an electromagnetic coil.

Supply valves 2005A to 2005D and relief valves 2020A and 2020B are solenoid valves that are biased towards a valve closing direction by a spring and are opened by application of electric current to an electromagnetic coil.

In wheel cylinders 204, 205, 206, and 207, there are respectively provided pressure sensors 2015A to 2015D that detect wheel cylinder pressure, and detection signals from pressure sensors 2015A to 2015D (wheel cylinder pressure signals) are input to brake control unit 201.

In the above configuration, paths for supplying master cylinder pressure to respective wheel cylinders 206 and 207 of the rear wheels RR on the right and RL on the left are not provided, and pump up pressure generated by pump 2004 (second fluid pressure) is supplied to wheel cylinders 206 and 207.

In the state where no electric current is supplied to supply valves 2005C and 2005D and relief valves 2020C and 2020D that control supply/discharge of the pump up pressure for wheel cylinders 206 and 207, supply valves 2005C and 2005D are in the close state and relief valves 2020C and 2020D are in the open state.

In this case, the pump up pressure from pump 2004 is blocked by supply valves 2005C and 2005D while relief valves 2020C and 2020D are in the open state. Therefore wheel cylinders 206 and 207 are communicated with reservoir tank 2018 via relief valves 2020C and 2020D. As a result, the fluid pressure of wheel cylinders 206 and 207 is relieved to reservoir tank 2018 and the fluid pressure of wheel cylinders 206 and 207 (wheel cylinder pressure) is reduced.

On the other hand, in the state where electric current is supplied to supply valves 2005C and 2005D and relief valves 2020C and 2020D, supply valves 2005C and 2005D are in the opened state and relief valves 2020C and 2020D are in the close state.

In this case, while the pump up pressure from pump 2004 is supplied to wheel cylinders 206 and 207 via supply valves 2005C and 2005D, the connection between wheel cylinders 206 and 207 and reservoir tank 2018 is blocked by relief valves 2020C and 2020D. Therefore the fluid pressure (wheel cylinder pressure) of wheel cylinders 206 and 207 is increased.

Furthermore, when no electric current is applied to supply valves 2005C and 2005D and electric current is applied to relief valves 2020C and 2020D, supply valves 2005C and 2005D are brought into the close state and relief valves 2020C and 2020D are also brought into the close state. Consequently, supply/discharge of pump up pressure with respect to wheel cylinders 206 and 207 is stopped, and the wheel cylinder pressure is maintained.

On the other hand, to respective wheel cylinders 204 and 205 of front wheels FR on the right and FL on the left, either one of master cylinder pressure and pump up pressure can be selectively supplied.

That is to say, when no electric current is applied to supply valves 2005A and 2005B and relief valves 2020A and 2020B, supply valves 2005A and 2005B and relief valves 2020A and 2020B are both brought into the close state. At this time, if no electric current is also applied to cutoff valves 2002A and 2002B, then the master cylinder pressure is supplied to wheel cylinders 204 and 205.

On the other hand, if electric current is applied to cutoff valves 2002A and 2002B, cutoff valves 2002A and 2002B are brought into the close state and supply of the master cylinder pressure to wheel cylinders 204 and 205 is stopped.

In this state where electric current is applied to cutoff valves 2002A and 2002B (where the valves are closed), when no electric current is applied to relief valves 2020A and 2020B and electric current is applied to supply valves 2005A and 2005B, relief valves 2020A and 2020B are closed, and by opening supply valves 2005A and 2005B, pump up pressure is supplied to wheel cylinders 204 and 205.

Moreover, in a state where electric current is applied to cutoff valves 2002A and 2002B (where the valves are closed), if no electric current is applied to supply valves 2005A and 2005B and electric current is applied to relief valves 2020A and 2020B, supply valves 2005A and 2005B are closed, and by opening relief valves 2020A and 2020B, pump up pressure is relieved from wheel cylinders 204 and 205.

Furthermore, in the state where electric current is being applied to cutoff valves 2002A and 2002B (where the valves are closed), if no electric current is being applied to supply valves 2005A and 2005B and relief valves 2020A and 2020B, the supply/discharge of pump up pressure with respect to wheel cylinders 204 and 205 is stopped, and the wheel cylinder pressure is thereby maintained.

Figure 13:
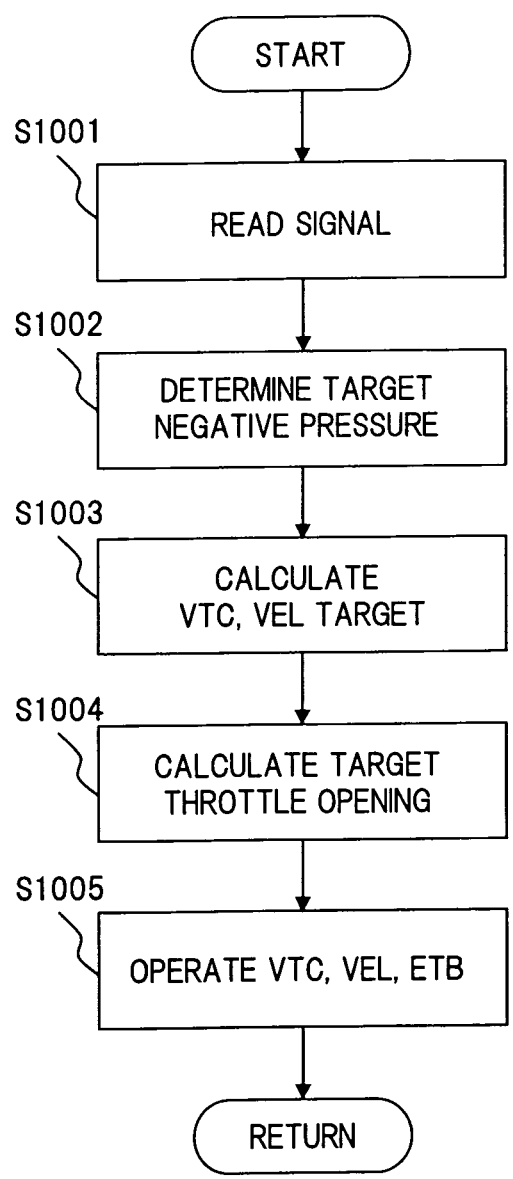
FIG. 13 is a flow chart illustrating a control of the engine in the embodiment of the present invention.

Next, an engine control carried out by engine control unit 114 is described, with reference to the flow chart shown in FIG. 13.

In step S1001, various kinds of signals are read.

Specifically, signals to be read include; accelerator opening ACC, engine rotating speed NE, air intake amount QA, intake negative pressure PB, and booster negative pressure BNP.

In step S1002, a target intake negative pressure (target intake pipe negative pressure) is set.

Taking the fuel economy performance and output power performance of engine 101 into consideration, it is preferable that the intake negative pressure (intake pipe negative pressure) be as low as possible (as close to atmospheric pressure as possible).

This is because pumping loss becomes more significant and fuel economy is likely to be reduced if the intake negative pressure (intake pipe negative pressure) is high, and if pre-acceleration intake negative pressure is significant, an amount of air for reducing the intake negative pressure to the post acceleration intake negative pressure is filled between throttle valve 103b and intake valve 105, and a delay occurs in an increase of a cylinder air amount as a result.

Consequently, as described later, engine control unit 114 generates an intake negative pressure of a required level when necessary so as to achieve an improvement in fuel economy performance and power output performance.

Specifically, in the case where one of the following plurality of conditions is satisfied, an intake negative pressure required under the satisfied condition is taken as a target intake negative pressure. In the case where more than one condition among the following plurality of conditions are satisfied at the same time, a maximum value among a plurality of target intake negative pressures required respectively under the satisfied conditions is selected. In the case where none of the following plurality of conditions is satisfied, the target intake negative pressure is set to 0 mmHg (atmospheric pressure) or to a value close to atmospheric pressure.

(1) Request Concerning Purge of Fuel from Canister

In order to desorb the evaporated fuel adsorption-captured in canister 135, and suction this into engine 101, the intake pipe negative pressure of engine 101 is required to act on canister 135. Therefore, if a condition for carrying out a canister purge is satisfied, a target intake negative pressure is determined according to a purge required amount.

Here, if the intake negative pressure is low (if the intake pressure is close to atmospheric pressure), the purge amount decreases and processing for evaporated fuel cannot proceed. On the other hand, if the intake negative pressure is high, the purge amount increases, but fuel economy performance and power output performance are reduced.

Consequently, a minimum intake negative pressure for acquiring a required purge amount is found beforehand in a simulation or experiment, and a target intake negative pressure is set according to the purge amount that is required at that time.

(2) Request Concerning Blowby Gas Processing

In order to suction the blowby gas accumulated within the crank case into engine 101, the intake pipe negative pressure of engine 101 is required to act within the crank case.

Consequently, if a condition for suctioning the blowby gas into engine 101 is satisfied, a target intake negative pressure is set according to the blowby gas amount to be processed.

(3-1) Request when Determining Low Brake Fluid Temperature

If the temperature of brake fluid is low, the viscosity of the brake fluid becomes higher and discharge response of pump 2004 is delayed, resulting in a delay in control response of a braking force caused by pump up pressure.

Therefore, if the brake fluid temperature is no greater than a determination temperature, in order to carry out braking with master cylinder pressure, an intake pipe negative pressure that is equal to the intake negative pressure generated in the case of controlling the intake air amount with throttle valve 103b is set as a target intake negative pressure.

(3-2) Request when Determining Continuous Operation of the Pump

When pump 2004 is continuously operated, there is a possibility of overheating motor 2003.

Therefore, a continuous operation state of the pump is determined; when the operation of motor 2003 continues for longer than a determination time, when an integral value of the electric current of motor 2003 is greater than or equal to a determination value, or when the temperature of motor 2003 is greater than or equal to a determination temperature.

Then, when the continuous operation state of pump 2004 is determined, in order to carry out braking with master cylinder pressure, an intake pipe negative pressure that is equal to the intake negative pressure generated in the case of controlling the intake air amount with throttle valve 103b is set as a target intake negative pressure.

(3-3) Request when Having an Abnormality in Pump Up Pressure

In the case where an abnormality occurs in which wheel cylinder pressure cannot be increased by pump up pressure, in order to carry out braking with master cylinder pressure, an intake pipe negative pressure that is equal to the intake negative pressure generated in the case of controlling the intake air amount with throttle valve 103b is set as a target intake negative pressure.

Here, in the state of controlling pump up pressure supply where motor 2003 is driven, and in this state where the wheel cylinder pressure supplied by the pump up pressure is less than or equal to a determination pressure, an abnormality in pump up pressure is determined.

(4) Request Concerning Braking Force

Figure 14:
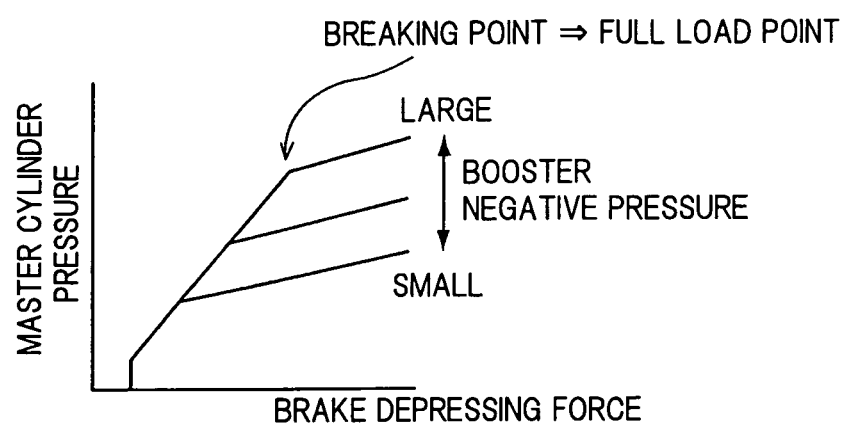
FIG. 14 is a diagram illustrating a relationship between brake stepping force and master cylinder pressure in the brake booster in the embodiment of the present invention.

As shown in FIG. 14, the master cylinder pressure obtained at a boosting limit point (full load point) at which a valve mechanism of brake booster 132a fully opens, changes according to the negative pressure of the negative pressure chamber of brake booster 132a (booster negative pressure), and master cylinder pressure at the boosting limit point becomes higher when the booster negative pressure is higher.

If the intake pipe negative pressure is set low to suppress booster negative pressure in order to improve fuel economy performance and power output performance, requests for braking with pump up pressure increase, causing a need to increase durability in the pump and solenoid valve as a result.

On the other hand, if the intake pipe negative pressure is set high to increase the booster negative pressure, then a required braking force can be obtained with the master cylinder pressure, and hence the frequency of braking with pump up pressure can be reduced. However, this would result in reduced fuel economy performance and power output performance.

Here approximately 90 percent of normal braking of regular use is braking of 0.4 g or less in deceleration. If it is possible to obtain this 0.4 g at the boosting limit point (full load point), then it is possible, in most cases, to obtain a required braking with a master cylinder pressure before the boosting limit point (full load point), generated by boosting the brake operating force.

Figure 15:
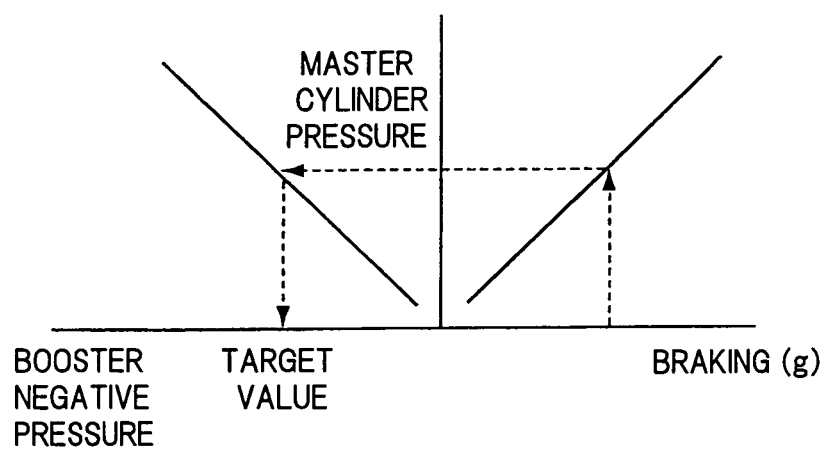
FIG. 15 is a diagram for explaining setting of a target booster negative pressure in the embodiment of the present invention.

Therefore, a target intake negative pressure (booster negative pressure) is set so that normal braking is to be carried out at the master cylinder pressure that is generated before the boosting limit point (full load point), and the master cylinder pressure that corresponds to the maximum value of deceleration in normal braking can be obtained at the boosting limit point (full load point) of brake booster 132a (refer to FIG. 15).

If the target intake negative pressure is set as described above, the target intake negative pressure can be suppressed low, and the frequency of braking with pump up pressure can be reduced while achieving an improvement in fuel economy performance and power output performance. Hence the durability requirement for the pump and solenoid valve can be suppressed.

Instead of setting the target intake negative pressure based on the above mentioned respective conditions (1), (2), (3-1), (3-2), (3-3), and (4), the target intake negative pressure can be set as described below.

In order to satisfy the requirements of the conditions (1), (2), and (4), the target intake negative pressure is set to a constant value (for example, −100 mmHg) in low and intermediate accelerator opening ranges (low/intermediate load ranges), excluding a wide accelerator opening range (high load range).

In determining whether or not it is in the wide accelerator opening range, for example, it is determined as a wide opening range when the engine torque at a given time is greater than or equal to 90% of the maximum engine torque for the engine rotating speed NE at that time.

Figure 16:
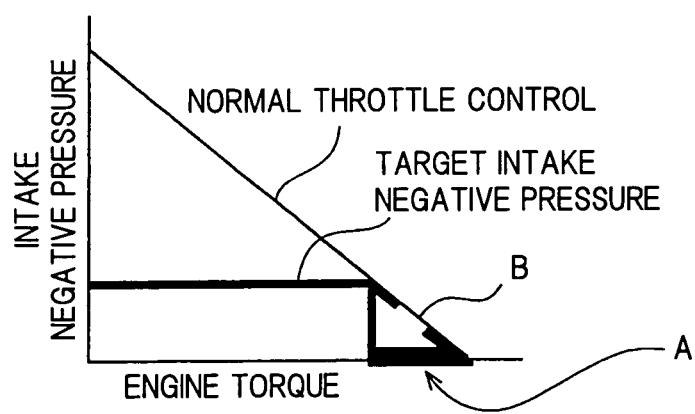
FIG. 16 is a diagram illustrating a characteristic of intake negative pressure in the embodiment of the present invention.

Moreover in the wide accelerator opening range, ensuring engine power output is prioritized over intake negative pressure generation, and throttle valve 103b is fully opened for example where the target negative pressure is set to 0 mmHg (atmospheric pressure) (line A in FIG. 16).

On the other hand, if a request of any of the conditions (3-1), (3-2) and (3-3) occurs, the target intake negative pressure is switched from the target intake negative pressure according to the acceleration opening to a target intake negative pressure corresponding to the request among the conditions (3-1), (3-2), and (3-3).

Over the entire wide acceleration opening range, rather than setting the target intake negative pressure to 0 mmHg (atmospheric pressure), after entering the wide accelerator opening range, the target intake negative pressure may be gradually reduced from −100 mmHg (brought close to the atmospheric pressure) as the accelerator opening becomes wider (line B in FIG. 16).

Figure 17:
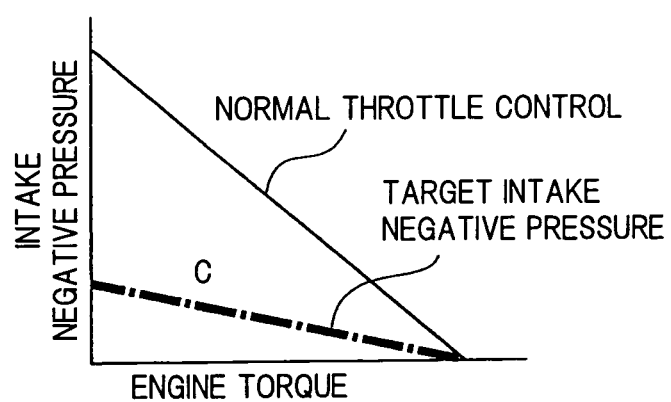
FIG. 17 is a diagram illustrating a characteristic of intake negative pressure in the embodiment of the present invention.

Moreover, as shown with line C in FIG. 17, the target intake negative pressure may be gradually reduced as engine load (engine torque) becomes higher.

As mentioned above, by generating a slight intake negative pressure within the low and intermediate accelerator opening ranges, braking by means of; canister purge, blowby gas processing, or master cylinder pressure can be performed.

Moreover, if requests of the conditions (3-1), (3-2), and (3-3) do not occur, the negative pressure is controlled so as to be substantially constant and the negative pressure does not change. Therefore, frequency of changes in engine torque accompanying negative pressure changes can be reduced, and discomfort to the driver due to vehicle vibration and the like can be prevented.

Once the target intake negative pressure (target intake pipe negative pressure) has been set as described above in step S1002 of the flow chart in FIG. 13, then in the next step S1003, desired value of variable valve lift mechanism (VEL) 112 and variable valve timing mechanism (VTC) 113 are set, and in the subsequent step S1004, a desired value of the electronically controlled throttle (ETB) is set.

Then in step S1005, based on the above control targets, variable valve lift mechanism (VEL) 112, variable valve timing mechanism (VTC) 113, and electronically controlled throttle (ETB) 104 are controlled.

Setting of the above control targets is performed as disclosed for example in Japanese Laid-open (Kokai) Patent Application Publication No. 2003-184587.

That is to say, a target torque is set according to the accelerator opening and the engine rotating speed NE, and a target air intake amount that enables acquisition of this target torque is calculated. Furthermore, the above target air intake amount is converted into a target volume flow rate based on the engine rotating speed NE and the exhaust gas amount (total cylinder capacity).

Then the target volume flow rate is corrected based on the target intake negative pressure (target intake pipe negative pressure) at that time, and a target valve opening area is calculated from the corrected target volume flow rate.

Next, a target angle of control shaft 16, that is, a target valve lift amount is calculated from the center phase of the operating angle of intake valve 105 at that time operated by variable valve timing mechanism (VTC) 113, and the target valve opening area.

Furthermore, a target center phase of the operating angle of intake valve 105 varied by variable valve timing mechanism (VTC) 113 is set from engine load, engine rotating speed, and the like.

Moreover, a target opening of electronically controlled throttle (ETB) 104 is calculated as an opening that enables acquisition of a target intake negative pressure under the conditions of the target valve lift amount and the target center phase.

Figure 18:
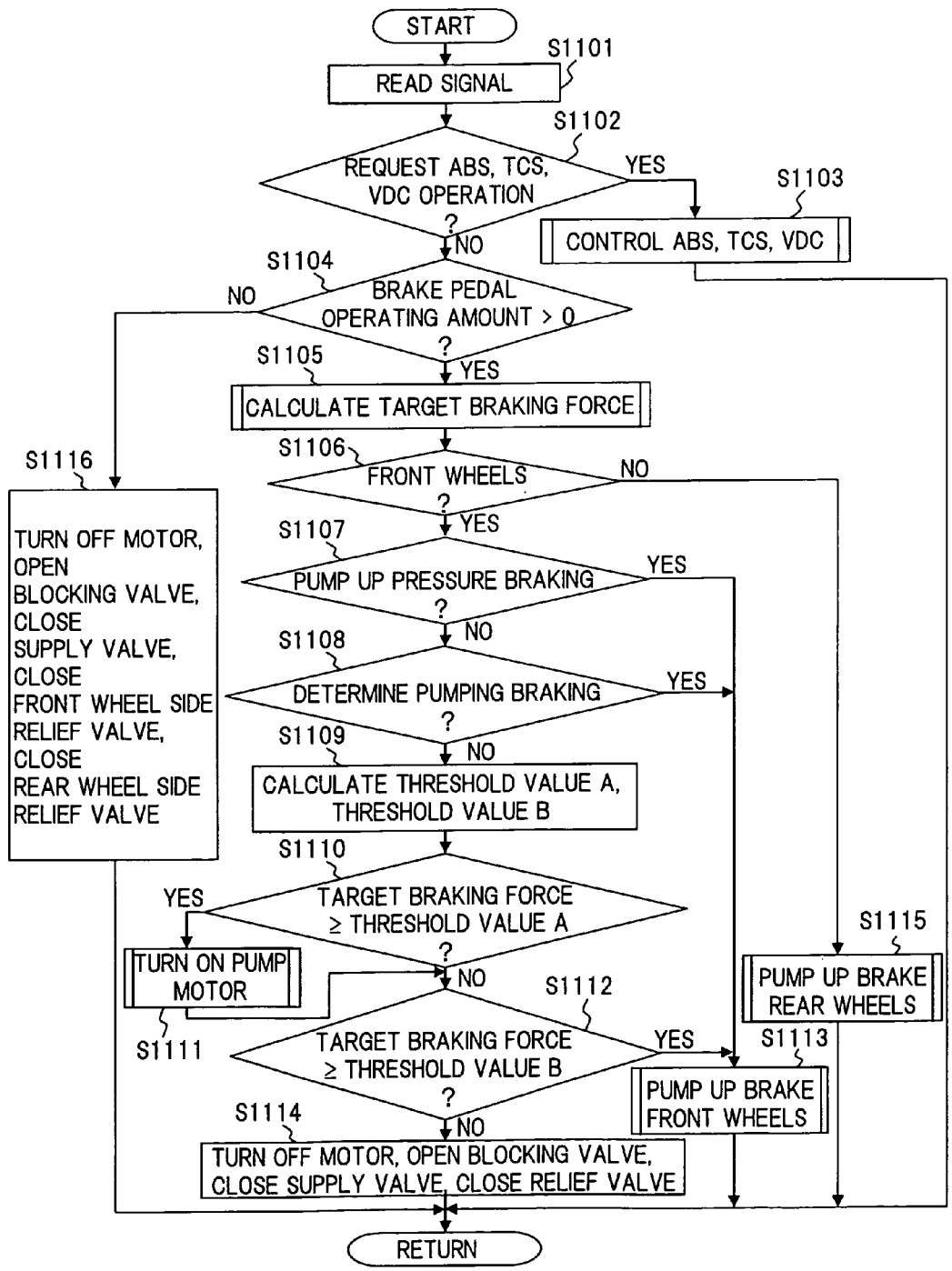
FIG. 18 is a flow chart illustrating a control of the brake hydraulic circuit shown in FIG. 12.

Next, a brake control performed by brake control unit 201 is described in detail, with reference to the flow chart in FIG. 18.

In the flow chart in FIG. 18, in step S1101, various kinds of signals are read.

Specifically, signals indicating an operating amount of the brake pedal (stroke amount or master cylinder pressure), booster negative pressure, wheel cylinder pressure, and the like are read.

In step S1102, it is determined whether or not there is a request for operating an ABS (anti lock braking system), a TCS (traction control system), or a VDC (vehicle dynamics control).

The ABS is a system that detects wheel rotating speed at the time of braking, and wheel lock is prevented by controlling brake fluid pressure, thereby improving vehicle stability during quick braking.

The TCS is a system that controls to optimize the slip ratio of driving wheels. When wheel spins occurs in the driving wheels it reduces the wheel spin by controlling the brake fluid pressure to the drive wheels, and by limiting engine torque.

The VDC is a system for improving the stability of a vehicle in addition to the functions of the ABS and TCS. It detects a steering operating amount, a vehicle yaw rate, a lateral direction acceleration (lateral gravity force), and a wheel speed to thereby find a vehicle slip angle (angle between the vehicle traveling direction and the steering direction of the wheel), and determines the degree of understeer or oversteer of the vehicle, and performs engine output control and brake fluid pressure control for each of the four wheels to thereby generate a momentum opposing the understeer or oversteer about the center of the gravity of the vehicle.

In the case where there is a request for operating the ABS, the TCS, or the VDC, controls in step S1104 and subsequent steps described later are not performed, and the sequence proceeds to step S1103 to perform a control to increase/decrease or maintain the brake fluid pressure according to the request for the ABS, TCS, or VDC.

That is to say, opening control of relief valves 2020A to 2020D enables individual pressure reduction control for the pressure of wheel cylinders 204 to 207. Moreover, by performing opening control of supply valves 2005A to 2005D while operating pump 2004, an increase in wheel cylinder pressures can be individually controlled.

Furthermore, by closing cutoff valves 2002A and 2002B, relief valves 2020A to 2020D, and supply valves 2005A to 2005D, the pressures of wheel cylinders 204 to 207 can be individually controlled to be maintained.

On the other hand, in the case where there is no request for operating the ABS, the TCS, or the VDC, the sequence proceeds to step S1104.

In step S1104, based on whether or not the operating amount of brake pedal 131 is greater than or equal to a reference value (for example, zero), it is determined whether or not braking is being operated (whether or not a braking request from the driver is present).

The brake pedal operating amount includes; a stroke amount BS of brake pedal 131 detected by brake pedal sensor 208, a master cylinder pressure MCP detected by fluid pressure sensor 209, and a stepping force of brake pedal 131 detected by a stepping force sensor.

If braking is not being operated, the sequence proceeds to step S1116 where cutoff valves 2002A and 2002B are opened, motor 2003 is turned off, supply valves 2005A to 2005D are closed, relief valves 2020A and 2020B on the front wheel side are closed, and relief valves 2020C and 2020D on the rear wheel side are opened.

Consequently, there is created a state where master cylinder pressure may be supplied to wheel cylinders 204 and 205 on the front wheel side. Moreover wheel cylinders 206 and 207 on the rear wheel side are connected to reservoir pipe 2009, further creating a state where the cylinder pressure of wheel cylinders 206 and 207 may be relieved.

Meanwhile, when braking is being operated, the sequence proceeds to step S1105, and a target braking force (target wheel cylinder pressure) is calculated according to the brake operating amount.

Figure 19:
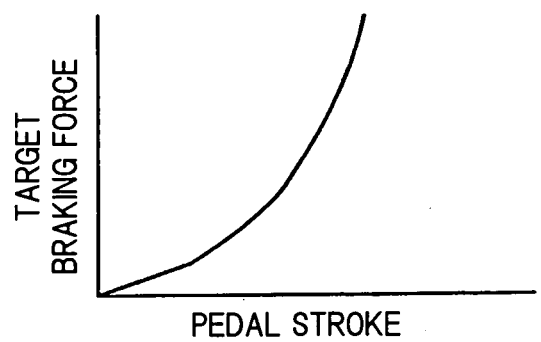
FIG. 19 is a diagram illustrating a relationship between brake pedal stroke amount and target braking force in the embodiment of the present invention.

For example, if braking is determined as being operated based on that the stroke amount BS of brake pedal 131 detected by brake pedal sensor 208 exceeds the reference value, then as shown in FIG. 19, a greater target braking force (target wheel cylinder pressure) is calculated as the stroke amount BS of brake pedal 131 detected by brake pedal sensor 208 (requested braking force detection device) becomes greater.

Figure 20:
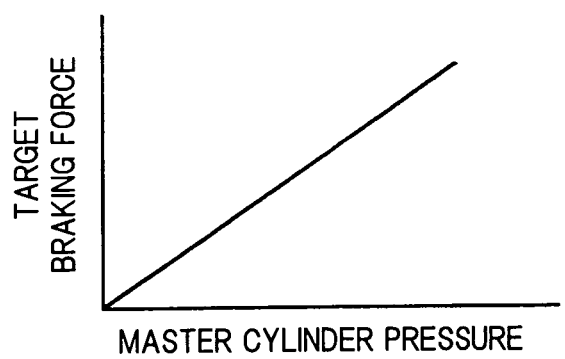
FIG. 20 is a diagram illustrating a relationship between master cylinder pressure and target braking force in the embodiment of the present invention.

Furthermore, if braking is determined as being operated based on that the master cylinder pressure MCP detected by fluid pressure sensor 209 exceeds the reference value, then as shown in FIG. 20, a greater target braking force (target wheel cylinder pressure) can be calculated as the master cylinder pressure MCP detected by fluid pressure sensor 209 (requested braking force detection device) becomes greater.

Moreover, if braking is determined as being operated based on that the stepping force of the brake pedal exceeds the reference value, a greater target braking force (target wheel cylinder pressure) can be calculated as the stepping force becomes greater.

Furthermore, the target braking force (target wheel cylinder pressure) can be determined according to the loading state of the vehicle.

This is to determine a target braking force according to changes in load, because the load on the vehicle causes the load on the front and rear wheels to be different compared to the case of having no load on the vehicle.

The loading state may be detected for example based on the slip ratio of the respective wheels being decelerated, and may also be detected by a load sensor or the like.

Furthermore, a target braking force (target wheel cylinder pressure) for the front and rear left/right wheels can be determined according to the steering angle and vehicle traveling speed during braking.

This is to increase the target braking force (target wheel cylinder pressure) of the wheel on the cornering-outside because the load on the wheel on the cornering-outside becomes greater than the load on the wheel on the cornering-inside when the vehicle is cornering.

A system that changes the braking force for the front and rear left/right wheels according to changes in the load on the respective wheels is installed in an electronically controlled braking system (EBD) in some cases, and in the case where such an EBD is equipped, it can be operated in cooperation with the system of the present embodiment.

As the brake operating amount (stroke amount BS, master cylinder pressure MCP, brake pedal stepping force) becomes greater, the target braking force for the front wheel (target wheel cylinder pressure) can be made greater than the target braking force for the rear wheel (target wheel cylinder pressure).

This is because as the deceleration of the vehicle caused by braking becomes greater, the load on the front wheel increases and the load on the rear wheel relatively decreases, and hence the braking force of the front wheel is increased for this amount.

Moreover, the target braking force can be corrected with an increase change rate of the brake operating amount (stroke amount BS, master cylinder pressure MCP, brake pedal stepping force). Specifically, in the case where the above increase change rate exceeds a threshold value, the target braking force (target wheel cylinder pressure) is increase-corrected according to the deviation between the change rate and the threshold value.

In step S1106, it is determined whether to perform control of the wheel cylinder pressure for the front wheel, or to perform control of the wheel cylinder pressure for the rear wheel.

Here, in the case of performing control of the wheel cylinder pressure for the front wheel, the sequence proceeds from step S1106 to step S107.

The determination in step S1106 illustrates that the control of the wheel cylinder pressure is different for the front wheel and the rear wheel. In reality, the control of the wheel cylinder pressure for the front wheel (processes from step S1107 to step S1114) and the control of the wheel cylinder pressure for the rear wheel (process in step S1115) are executed in parallel.

In step S1107, it is determined whether or not there is a pump up pressure braking condition, in which discharge pressure (pump up pressure) of pump 2004 is supplied to front wheel cylinders 204 and 205 to perform braking.

Then if the pump up pressure braking is determined as being operated, the sequence proceeds to step S1113 and the braking with the pump up pressure is continued.

On the other hand, if the pump up pressure braking is determined as not being operated, the sequence proceeds to step S1108 and it is determined whether or not a pumping braking is being operated.

If the pump up pressure braking is not being operated and the pumping braking is not being operated either, the sequence proceeds to step S1109.

In step S1109, based on a booster negative pressure BNP (negative pressure in the negative pressure chamber of brake booster 132a) detected by negative pressure sensor 132b, a threshold value A (second threshold value) and a threshold value B (first threshold value) of the target braking force is set.

Figure 21:
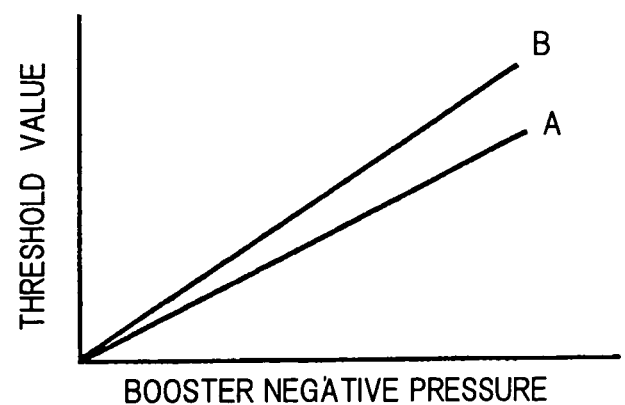
FIG. 21 is a diagram illustrating a relationship between threshold value and booster negative pressure, used for determining a commencement of pump up pressure braking in the embodiment of the present invention.

As shown in FIG. 21, the threshold value B is greater than the threshold value A and the threshold value A and the threshold value B are to be set to greater values as the booster negative pressure BNP becomes greater.

The threshold value B is set to a value slightly lower than the braking force at the full load point of brake booster 132a.

Moreover, the threshold values A and B may be set according to the target intake negative pressure or the actual intake negative pressure instead of setting these threshold values according to the booster negative pressure BNP detected by negative pressure sensor 132b.

Here, it may be such that the threshold value B is greater than the threshold value A if the brake fluid temperature is less than or equal to a determination temperature, and the threshold value A is equal to the threshold value B if the brake fluid temperature exceeds the determination temperature.

As described later, the threshold value A is used for determining commencement of motor driving, and the threshold value B is used for determining switching from the master cylinder pressure to the pump up pressure.

Furthermore under a condition where the brake fluid temperature is low and hence the response of pump up pressure of pump 2004 becomes slower, by starting to drive pump 2004 before actually switching to pump up pressure, a drop in the wheel cylinder pressure caused by the slower response can be prevented.

The brake fluid temperature can be detected by a temperature sensor, and moreover, for example, if the engine oil temperature when starting the engine is less than or equal to a threshold value, and the number of braking operations that have been performed after the engine starts is less than or equal to a threshold value, it can be assumed that the brake temperature is less than or equal to the determination temperature.

In step S1110, by determining whether or not the target braking force is greater than or equal to the threshold value A, it is determined whether or not pump 2004 (motor 2003) is in a timing to start driving.

Then when the target braking force reaches or exceeds the threshold value A, the sequence proceeds to step S1111 and application of electric current to motor 2003 is commenced.

In step S1112, it is determined whether or not the target braking force has reached or exceeded the threshold value B.

When the target braking force has reached or exceeded the threshold value B, the sequence proceeds to step S1113 to shift from the previous state where master cylinder pressure is supplied to wheel cylinders 204 and 205 of the front wheels for performing braking, to a pump up pressure braking state where the discharge pressure of pump 2004 (pump up pressure) is supplied to wheel cylinders 204 and 205 for performing braking.

On the other hand, when the target braking force is less than the threshold value A and when the target braking force is no less than the threshold value A and is no greater than the threshold value B, the sequence proceeds to step S1114 where; cutoff valves 2002A and 2002B are opened, motor 2003 is turned off, supply valves 2005A and 2005B are closed, and relief valves 2020A and 2020B are closed, to perform braking with master cylinder pressure.

Meanwhile, the brake hydraulic circuit shown in FIG. 12 is configured such that master cylinder pressure is not supplied to wheel cylinders 206 and 207 of the rear wheels, and only pump up pressure supply is possible. Therefore, if a control of the rear wheels is determined in step S1106, the sequence proceeds to step S1115 and a pump up pressure supply control for wheel cylinders 206 and 207 of the rear wheels is performed.

Figure 22:
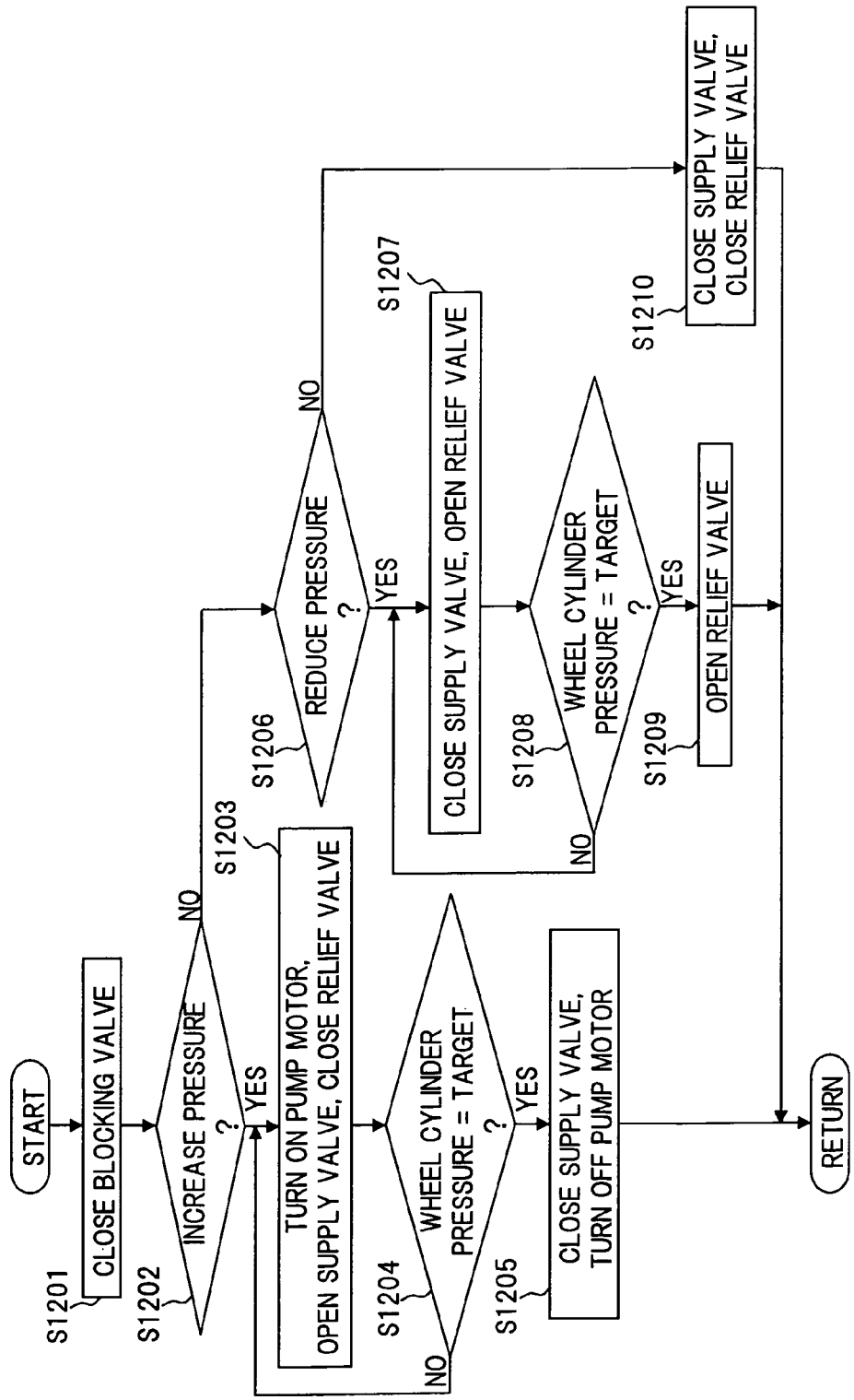
FIG. 22 is a flow chart illustrating a front wheel pump up pressure control in the brake hydraulic circuit in FIG. 12.

The flow chart of FIG. 22 shows in detail a pump up pressure control of the front wheels in the above step S1113.

First, in step S1201, cutoff valves 2002A and 2002B are closed to block master cylinder pressure supply to wheel cylinders 204 and 205 of the front wheels.

In step S1202, the actual pressure of wheel cylinders 204 and 205 detected by pressure sensors 2015A and 2015B is compared with the target wheel cylinder pressure (target braking force), and if the actual wheel cylinder pressure is lower than the target wheel cylinder pressure, a pressure increase request is determined.

If a pressure increase request is determined, the sequence proceeds to step S1203 where; motor 2003 is turned on, supply valves 2005A and 2005B are opened, and relief valves 2020A and 2020B are closed, to supply pump up pressure to wheel cylinders 204 and 205 of the front wheels.

In the next step S1204, it is determined whether or not the actual wheel cylinder pressure has increased to the target wheel cylinder pressure.

In the case where the actual wheel cylinder pressure has not reached the target wheel cylinder pressure, the sequence returns to step S1203 and pump up pressure continues to be supplied to wheel cylinders 204 and 205 of the front wheels.

On the other hand, in step S1204, if it is determined that the actual wheel cylinder pressure has reached the target wheel cylinder pressure, the sequence proceeds to step S1205 and the supply valves 2005A and 2005B are closed and motor 2003 is turned off, thereby maintaining the wheel cylinder pressure at this time.

Moreover, if determined to be not in a pressure increase requesting state in step S1202, the sequence proceeds to step S1206, and it is determined whether or not it is in a pressure reduction requesting state where the actual wheel cylinder pressure is higher than the target wheel cylinder pressure.

Then if it is in a pressure reduction requesting state, the sequence proceeds to step S1207, and supply valves 2005A and 2005B are closed and relief valves 2020A and 2020B are opened so that the cylinder pressure of wheel cylinders 204 and 205 of the front wheels is reduced.

In step S1208, it is determined whether or not the actual wheel cylinder pressure has been reduced to the target wheel cylinder pressure.

In the case where the actual wheel cylinder pressure has not reached the target wheel cylinder pressure, the sequence returns to step S1207 and the cylinder pressure of wheel cylinders 204 and 205 of the front wheels continues to be reduced.

On the other hand, in step S1208, if it is determined that the actual wheel cylinder pressure has reached the target wheel cylinder pressure, the sequence proceeds to step S1209 and relief valves 2020A and 2020B are closed to maintain the wheel cylinder pressure at this time.

Furthermore, if it is determined to be not in the pressure reduction requesting state in the above step S1206, the sequence proceeds to step S1210 and supply valves 2005A and 2005B are closed and relief valves 2020A and 2020B are also closed, thereby maintaining the cylinder pressure of wheel cylinders 204 and 205 of the front wheels.

Figure 23:
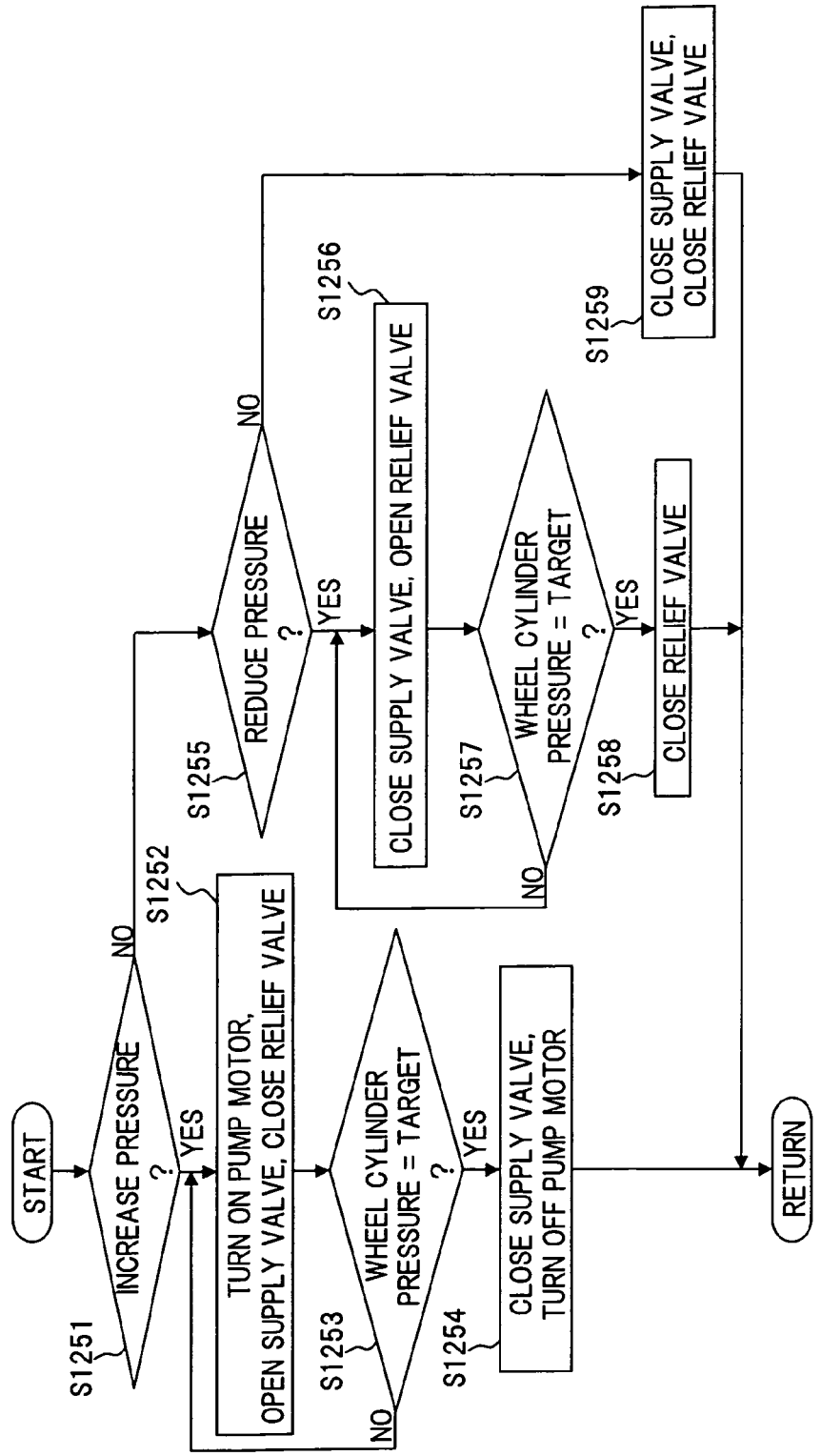
FIG. 23 is a flow chart illustrating a rear wheel pump up pressure control in the brake hydraulic circuit in FIG. 12.

The flow chart of FIG. 23 shows in detail a pump up pressure control of the rear wheels in the above step S1115.

In step S1251, the actual pressure of wheel cylinders 206 and 207 detected by pressure sensors 2015C and 2015D is compared with the target wheel cylinder pressure, and if the actual wheel cylinder pressure is lower than the target wheel cylinder pressure, a pressure increase request is determined.

When a pressure increase request is determined, the sequence proceeds to step S1252 where; motor 2003 is turned on, supply valves 2005C and 2005D are opened, and relief valves 2020C and 2020D are closed, to supply pump up pressure to wheel cylinders 206 and 207 of the rear wheels.

In the next step S1253, it is determined whether or not the actual wheel cylinder pressure has increased to the target wheel cylinder pressure.

In the case where the actual wheel cylinder pressure has not reached the target wheel cylinder pressure, the sequence returns to step S1252, and pump up pressure continues to be supplied to wheel cylinders 206 and 207 of the rear wheels.

On the other hand, in step S1253, if it is determined that the actual wheel cylinder pressure has reached the target wheel cylinder pressure, the sequence proceeds to step S1254 and supply valves 2005C and 2005D are closed and motor 2003 is turned off, thereby maintaining the wheel cylinder pressure at this time.

Moreover, if determined to be not in a pressure increase requesting state in step S1251, the sequence proceeds to step S1255, and it is determined whether or not it is in a pressure reduction requesting state where the actual wheel cylinder pressure is higher than the target wheel cylinder pressure.

Then if it is in the pressure reduction requesting state, the sequence proceeds to step S1256 and the supply valves 2005C and 2005D are closed and the relief valves 2020C and 2020D are opened so that the cylinder pressure of wheel cylinders 206 and 207 of the rear wheels is reduced.

In step S1257, it is determined whether or not the actual wheel cylinder pressure has been reduced to the target wheel cylinder pressure.

In the case where the actual wheel cylinder pressure has not reached the target wheel cylinder pressure, the sequence returns to step S1256 and the cylinder pressure of wheel cylinders 206 and 207 of the rear wheels continues to be reduced.

On the other hand, in step S1257, if it is determined that the actual wheel cylinder pressure has reached the target wheel cylinder pressure, the sequence proceeds to step S1258 and relief valves 2020C and 2020D are closed to maintain the wheel cylinder pressure at this time.

Furthermore, if it is determined to be not in the pressure reduction requesting state in the above step S1255, the sequence proceeds to step S1259 and supply valves 2005C and 2005D are closed and relief valves 2020C and 2020D are also closed, thereby maintaining the cylinder pressure of wheel cylinders 206 and 207 of the rear wheels.

The process has been described in which in step S1108 of the flow chart in FIG. 18, as described above, it is determined whether or not it is in the pumping braking state, and if it is not in the pumping braking state, the sequence proceeds to step S1109 and subsequent steps.

On the other hand, if it is determined in step S1108 that it is in the pumping braking state, the sequence skips step S1109 through step S1112 and proceeds to step S1113 where pump up pressure supply to wheel cylinders 204 and 205 of the front wheels is controlled so that a target braking force can be obtained with pump up pressure.

When pumping braking is carried out in which release of the brake pedal immediately after depressing and then again depressing is repeated, a brake operation is carried out again before the booster negative pressure BNP, which has been reduced accompanying the brake operation, recovers. Consequently, master cylinder pressure that can actually be obtained for the brake operation is reduced even under a condition where the intake negative pressure is sufficiently high.

Consequently, in the pumping braking state, the wheel cylinder pressure is raised to the pressure required for pump up pressure, without boosting the brake operating force with brake booster 132a.

Here, when the amount of brake pedal depressing has become less than or equal to a threshold value, if the brake pedal is depressed again to exceed the threshold value within a set period of time, it is then determined to be in the pumping braking state.

Figure 24:
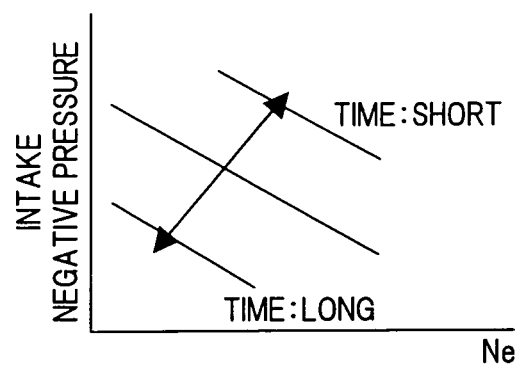
FIG. 24 is a diagram illustrating a relationship between time threshold value, intake negative pressure, and engine rotating speed, used to determine a pumping brake in the embodiment of the present invention.

The above set period of time may be a fixed period of time, or as shown in FIG. 24, it may be variably set based on the engine rotating speed NE and the intake negative pressure (intake pipe negative pressure) PB.

In the case where the set period of time is variably set based on the engine rotating speed NE and the intake negative pressure (intake pipe negative pressure) PB, then as shown in FIG. 24, the set period of time is set shorter for higher engine rotating speed NE and higher intake negative pressure. If the set period of time is short, determination of the pumping braking state becomes more difficult accordingly.

This is because, the booster negative pressure BNP is easily recovered in a short period of time when the engine rotating speed NE is high, and when the intake negative pressure is high, the booster negative pressure BNP can be increased to that extent. As a result, it is difficult to reduce the booster negative pressure BNP even when pumping braking is carried out.

Incidentally, master cylinder pressure is not supplied to wheel cylinders 206 and 207 of the rear wheels in the configuration of hydraulic unit 202 shown in FIG. 12. However, as shown in FIG. 25, it may be a hydraulic circuit such that master cylinder pressure and pump up pressure can be supplied to all of wheel cylinders 204 to 207.

Figure 25:
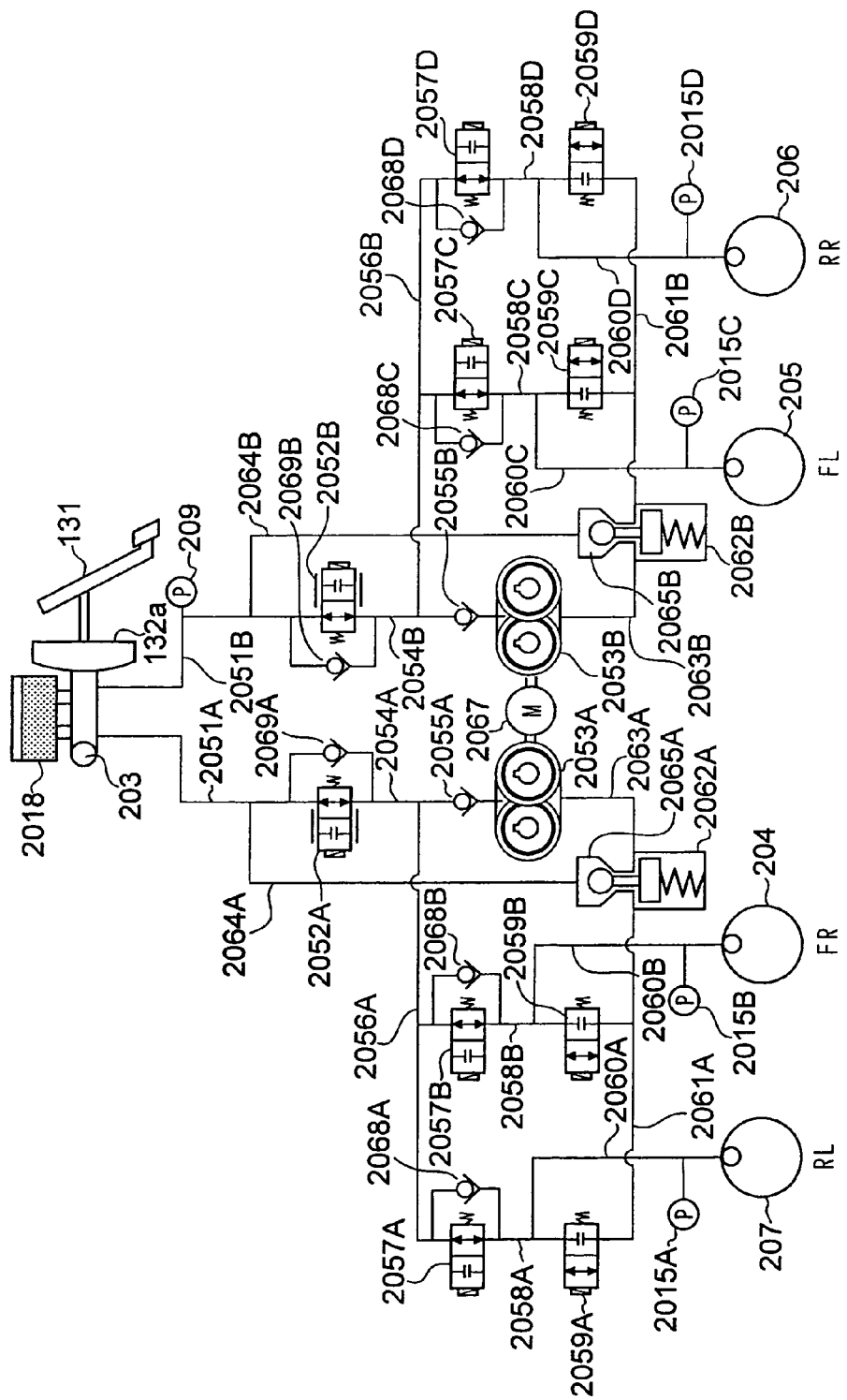
FIG. 25 is a diagram illustrating another example of the brake hydraulic circuit in the embodiment of the present invention.

The hydraulic circuit shown in FIG. 25 is provided independently with a RL, FR system that controls brake fluid pressure for RL wheel cylinder 207 and FR wheel cylinder 204 and a FL, RR system that controls brake fluid pressure for FL wheel cylinder 205 and RR wheel cylinder 206.

To tandem type master cylinder 203, there are respectively connected one end of a supply pipe 2051A that constitutes the RL, FR system and one end of a supply pipe 2051B that constitutes the FL, RR system.

To the other ends of supply pipes 2051A and 2051B, there are connected gate valves 2052A and 2052B.

Gate valves 2052A and 2052B on the downstream side are connected, via common pipes 2054A and 2054B, to discharge openings of pumps 2053A and 2053B. Pumps 2053A and 2053B are, for example, plungers or gear pumps.

In the discharge openings of pumps 2053A and 2053B, there are interposed check valves 2055A and 2055B that permit only discharge direction flows.

Partway along common pipes 2054A and 2054B, there are connected one of the ends of branch pipes 2056A and 2056B, and the other ends of branch pipes 2056A and 2056B respectively branch into two and are connected to supply valves 2057A and 2057B that constitute the RL, FR system and to supply valves 2057C and 2057D that constitute the FL, RR system.

Supply valves 2057A to 2057D on the downstream side are connected, via first pipes 2058A to 2058D, to relief valves 2059A and 2059B that constitute the RL, FR system and to relief valves 2059C and 2059D that constitute the FL, RR system.

Furthermore, partway along first pipes 2058A to 2058D, and respective wheel cylinders 204 to 207, are connected by second pipes 2060A to 2060D.

Ports of relief valves 2059A to 2059D on a side opposite to the side on which first pipes 2058A to 2058D are connected, are connected, via relief pipes 2061A and 2061B, to internal reservoirs 2062A and 2062B.

Moreover, intake openings of pumps 2053A and 2053B are connected, via intake pipes 2063A and 2063B, to internal reservoirs 2062A and 2062B.

Furthermore, supply pipes 2051A and 2051B on the upstream side of gate valves 2052A and 2052B, and internal reservoirs 2062A and 2062B, are connected by reservoir pipes 2064A and 2064B.

In internal reservoirs 2062A and 2062B, there are provided check valves 2065A and 2065B that limit introduction of master cylinder pressure supplied through reservoir pipes 2064A and 2064B into internal reservoirs 2062A and 2062B.

The master cylinder pressure acts in the valve closing direction of check valves 2065A and 2065B. Moreover, the suction pressure of pumps 2053A and 2053B acts in the valve opening direction of check valves 2065A and 2065B, and the relief of the wheel cylinders via reservoir pipes 2064A and 2064B acts in the valve closing direction of check valves 2065A and 2065B.

Pumps 2053A and 2053B are driven by a motor 2067 in which electric current application is PWM controlled.

Relief valves 2059A to 2059D are solenoid valves that are biased towards the valve closing direction by a spring and are opened by application of electric current to an electromagnetic coil.

Supply valves 2057A to 2057D are solenoid valves that are biased towards the valve opening direction by a spring and are opened by application of electric current to an electromagnetic coil.

On the other hand, gate valves 2052A and 2052B are proportional type solenoid valves that are biased towards the valve opening direction by a spring, and in which application of an electric current to an electromagnetic coil that generates an electromagnetic force acting in the valve closing direction is PWM controlled, and in which the valve opening area linearly changes according to the duty of the PWM signal.

Furthermore, in a bypass pipe connecting between the upstream side and downstream side of supply valves 2057A to 2057D, there are interposed check valves 2068A to 2068D that permit brake fluid flow from the downstream side to the upstream side.

Moreover, in a bypass pipe connecting between the upstream side and downstream side of gate valves 2052A and 2052B, there are interposed check valves 2069A and 2069B that permit brake fluid flow from the upstream side to the downstream side.

In the system shown in FIG. 25, when gate valves 2052A and 2052B, supply valves 2057A to 2057D, relief valves 2059A to 2059D, and motor 2067 are all turned off, master cylinder pressure is supplied to respective wheel cylinders 204 to 207 via gate valves 2052A and 2052B, supply valves 2057A to 2057D, and second pipes 2060A to 2060D.

At this time, check valves 2065A and 2065B are closed by the master cylinder pressure, and the master cylinder pressure is not relieved into internal reservoirs 2062A and 2062B.

On the other hand, in the case where the wheel cylinder pressure is increased with the pump up pressure of pumps 2053A and 2053B, then while maintaining supply valves 2057A to 2057D and relief valves 2059A to 2059D in the off state, electric current is applied to gate valves 2052A and 2052B to open, and electric current is applied to motor 2067 to drive pumps 2053A and 2053B.

If negative pressure is generated on the suction side as a result of driving pumps 2053A and 2053B, check valves 2065A and 2065B are opened. Pumps 2053A and 2053B raise the pressure and discharge the brake fluid where the master cylinder pressure is taken as an original pressure; and the fluid pressure raised by pumps 2053A and 2053B is supplied, via supply valves 2057A to 2057D and second pipes 2060A to 2060D, to respective wheel cylinders 204 to 207.

Figure 26:
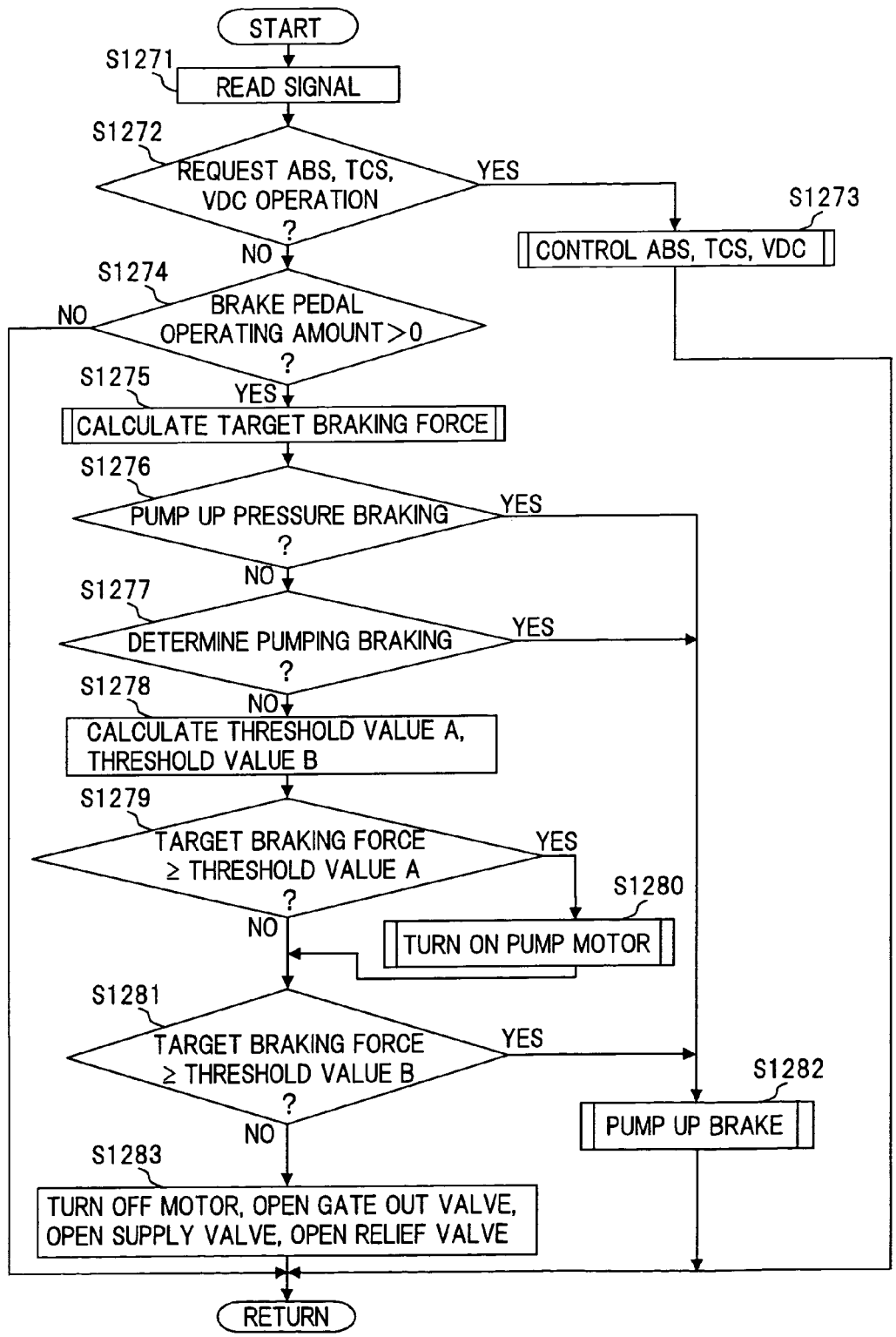
FIG. 26 is a flow chart illustrating a control of the brake hydraulic circuit shown in FIG. 25.

Control of the brake hydraulic circuit shown in FIG. 25 is described, with reference to the flow chart of FIG. 26.

The control shown in the flow chart of FIG. 26 does not include the process for the rear wheels in the control shown in FIG. 18.

In step S1271, various kinds of signals are read.

Specifically, signals indicating an operating amount of the brake pedal (stroke amount or master cylinder pressure), booster negative pressure, wheel cylinder pressure and the like are read.

In step S1272, it is determined whether or not there is a request for operating the ABS (anti lock braking system), the TCS (traction control system), or the VDC (vehicle dynamics control).

In the case where there is an operating request for the ABS, TCS, or VDC, controls in step S1274 and subsequent steps described later are not performed, and the sequence proceeds to step S1273 to perform a control to increase/decrease or maintain the brake fluid pressure according to the request for the ABS, TCS, or VDC.

On the other hand, in the case where there is no request for operating the ABS, the TCS, or the VDC, the sequence proceeds to step S1274.

In step S1274, based on whether or not the operating amount of brake pedal 131 is greater than or equal to a reference amount (for example, zero), it is determined whether or not braking is being operated (whether or not a braking request from the driver is present).

The brake pedal operating amount includes; a stroke amount BS of brake pedal 131 detected by brake pedal sensor 208, a master cylinder pressure MCP detected by fluid pressure sensor 209, and a stepping force of brake pedal 131 detected by the stepping force sensor.

If braking is not being operated, the sequence proceeds to step S1283 where: gate valves 2052A and 2052B, supply valves 2057A to 2057D, relief valves 2059A to 2059D, and motor 2067 are all turned off; gate valves 2052A and 2052B are opened; supply valves 2057A to 2057D are opened; and relief valves 2059A to 2059D are closed.

Therefore, if the sequence proceeds to step S1283, it becomes possible to supply master cylinder pressure to respective wheel cylinders 204 to 207.

On the other hand, when braking is being operated, the sequence proceeds to step S1275, and a target braking force (target wheel cylinder pressure) is calculated as with the above step S1105.

In step S1276, it is determined whether or not the pump up pressure braking is being operated in which pumps 2053A and 2053B raise the brake fluid pressure while taking the master cylinder pressure as an original pressure.

Then if the pump up pressure braking is determined as being operated, the sequence proceeds to step S1282 and the pump up pressure braking is continued.

On the other hand, if the pump up pressure braking is determined as not being operated, the sequence proceeds to step S1277 and it is determined whether or not pumping braking is being operated.

If the pump up pressure braking is not being operated and the pumping braking is not being operated either, the sequence proceeds to step S1278.

In step S1278, based on the booster negative pressure BNP (negative pressure of the negative pressure chamber of brake booster 132a), the threshold value A and threshold value B of the above target braking force is set as with the above step S1109.

In step S1279, by determining whether or not the target braking force is greater than or equal to the threshold value A, it is determined whether or not pumps 2053A and 2053B are in a timing to start driving.

Then when the target braking force reaches or exceeds the threshold value A, the sequence proceeds to step S1280, and application of electric current to motor 2067 is commenced.

In step S1281, it is determined whether or not the target braking force has reached or exceeded the threshold value B.

When the target braking force has reached or exceeded the threshold value B, the sequence proceeds to step S1282, shifting from the existing state where master cylinder pressure is supplied to wheel cylinders 204 to 207 to thereby operate braking, to pump up pressure braking state in which braking is operated with pump up pressure supplied by pumps 2053A and 2053B.

On the other hand, if the target braking force is less than the threshold value A, and if the target braking force is greater than or equal to the threshold value A and less than the threshold value B, the sequence proceeds to step S1283 where; gate valves 2052A and 2052B are opened, supply valves 2057A to 2057D are opened, relief valves 2059A to 2059D are closed, and pumps 2053A and 2053B are stopped, so as to supply master cylinder pressure to wheel cylinders 204 to 207.

In the above step S1282, based on the comparison between the actual wheel cylinder pressure and the target wheel cylinder pressure, it is determined which one of; pressure increase, pressure reduction, and pressure maintenance is to be requested respectively in the RL, FR system and the FL, RR system, and based on this determination, gate valves 2052A and 2052B and motor 2067 are controlled according to the patterns shown in FIG. 27.

During the pump up control in step S1282, supply valves 2057A to 2057D and relief valves 2059A to 2059D are maintained in the non-control state (state where no electric current is applied), and thereby supply valves 2057A to 2057D are maintained opened and relief valves 2059A to 2059D are maintained closed.

In FIG. 27, for example in the case where a pressure increase is requested in both of the RL, FR system and the FL, RR system, gate valves 2052A and 2052B are closed (on) and motor 2067 is driven. As a result pumps 2053A and 2053B raise the brake fluid pressure while taking the master cylinder pressure as an original pressure, so that the raised brake fluid pressure (pump up pressure) is supplied to respective wheel cylinders 204 to 207 via supply valves 2057A to 2057D being controlled to open.

Moreover, in the case where a pressure reduction is requested in both of the RL, FR system and the FL, RR system, gate valves 2052A and 2052B are opened (off) and motor 2067 is stopped to thereby stop pumps 2053A and 2053B raising the pressure.

Furthermore, in the case where it is requested to maintain the current cylinder pressure in both of the RL, FR system and the FL, RR system, gate valves 2052A and 2052B are closed (on) and motor 2067 is stopped, so that the communication between wheel cylinders 204 to 207 and master cylinder 203 is broken and pumps 2053A and 2053B do not raise pressure.

Here, as described above, at the time of the pressure increase request and the pressure maintenance request, gate valves 2052A and 2052B are both closed (on). Meanwhile, by switching driving and stopping of motor 2067, it is switched between the pressure increase state and the pressure maintenance state.

However, for example in the case where a pressure increase is requested in the RL, FR system and pressure maintenance is requested in the FL, RR system, motor 2067 drives pumps 2053A and 2053B at the same time. Therefore, pump 2053A is driven and pump 2053B cannot be stopped.

Consequently, for example in the case where a pressure increase request in the RL, FR system and a pressure maintenance request in the FL, RR system overlap with each other, gate valve 2052A is closed (on), gate valve 2052B is half-opened, and motor 2067 is driven.

If gate valve 2052A is closed (on) and motor 2067 is turned on to drive pump 2053A, then the brake fluid pressure that has been raised by pump 2053A is supplied to wheel cylinders 207 and 204 of the RL, FR system, and the cylinder pressure is raised as a result.

On the other hand, in the FL, RR system where gate valve 2052B is half-opened, supply pipe 2054B and reservoir pipe 2064B are communicated with each other via gate valve 2052B being controlled to half-open, and consequently some of the brake fluid in supply pipe 2054B flows into reservoir pipe 2064B and is re-suctioned by pump 2053B via intake pipe 2063B. Therefore the wheel cylinder pressure is maintained.

That is to say, the cylinder pressure is maintained as a result of brake fluid circulation via gate valve 2052B being controlled to half-open. The wheel cylinder pressure is maintained at a low value when the circulation amount is larger and conversely the wheel cylinder pressure is maintained at higher value when the circulation amount is smaller.

Then the opening of gate valve 2052B and the rotating speed of the motor cause changes in the circulation amount, and the pressure to be maintained is determined according to the circulation amount. Therefore, by controlling the opening of gate valve 2052B and the rotating speed of the motor, it is possible to increase/reduce the wheel cylinder pressure.

The control to half-open gate valves 2052A and 2052B is performed by the setting of the ON duty in the duty control of electric current application to the electromagnetic coil.

Moreover, for example in the case where a pressure increase request in the RL, FR system and a pressure reduction request in the FL, RR system overlap with each other, gate valve 2052A is closed (on), gate valve 2052B is opened, and motor 2067 is driven.

FIG. 28 shows patterns of opening/closing control of supply valves 2057A to 2057D and relief valves 2059A to 2059D for requests of pressure increase, pressure reduction, and pressure maintenance, in the case where wheel cylinder pressure for each of the wheels (wheel cylinders 204 to 207) is independently controlled.

In the pump up control in the above step S1282, supply valves 2057A to 2057D and relief valves 2059A to 2059D are maintained in the non-control state as described above.

The opening/closing control, in accordance with the patterns shown in FIG. 28, of supply valves 2057A to 2057D and relief valves 2059A to 2059D is performed according to the request for the ABS, TCS, or VDC in the above step S1273.

Specifically, for a pressure increase request: supply valves 2057A to 2057D are controlled so as to open; and relief valves 2059A to 2059D are controlled so as to close, for a pressure reduction request: supply valves 2057A to 2057D are controlled so as to close; and relief valves 2059A to 2059D are controlled so as to open, and for a pressure maintenance request: supply vales 2057A to 2057D are controlled so as to close; and relief valves 2059A to 2059D are controlled so as to close.

According to the above embodiment, intake negative pressure is limited in order to reduce pumping loss. As a result, in the case where booster negative pressure is comparatively low, if the target braking force cannot be obtained with that booster negative pressure, pump up pressure, instead of master cylinder pressure, is supplied to the wheel cylinders in order to obtain the target braking force.

Therefore, the required braking force can be generated while reducing pumping loss by limiting intake negative pressure.

That is to say, since the threshold value and the target braking force according to the booster negative pressure at that time are compared, then in the case where the target braking force can be obtained even in a state of limiting intake negative pressure, pumps 2004, 2053A, and 2053B would not be unnecessarily driven, and pumps 2004, 2053A, and 2053B are driven to obtain the target braking force only when master cylinder pressure to match the target braking force cannot be obtained by the booster negative pressure at that time.

In other words, even if there are changes in the braking force that can be generated by the boost of brake booster 132a, according to the intake negative pressure at that time, the shortage of the braking force is compensated by driving pumps 2004, 2053A, and 2053B while making maximum use of the braking force obtained by the above boost. Therefore, a required braking force can be obtained even while limiting the intake negative pressure to low, and pumps 2004, 2053A, and 2053B are not unnecessarily driven. As a result, fuel economy performance can be improved.

Figure 29:
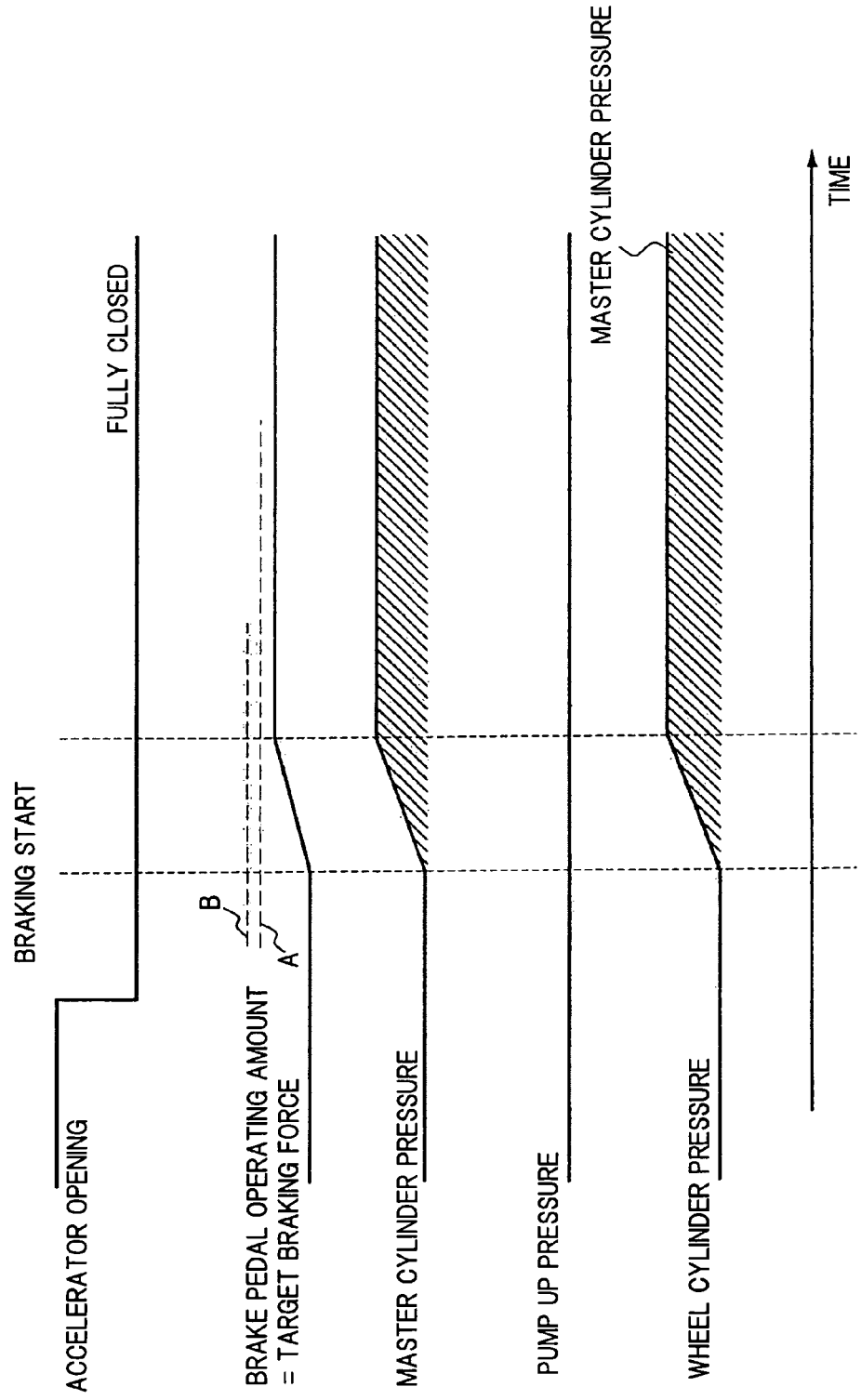
FIG. 29 is a time chart illustrating pressure changes in the case of operating the brake pedal to a small degree in the embodiment of the present invention.

The time chart of FIG. 29 shows an operation in the case where the level of brake pedal depressing is comparatively low, that is, in the case where the target braking force is comparatively small.

In the case of FIG. 29, since the level of brake pedal depressing is comparatively low and the target braking force does not exceed the threshold values A and B, the master cylinder pressure generated according to the braking operation is directly supplied to the wheel cylinders, and the master cylinder pressure becomes equal to the wheel cylinder pressure.

Therefore, even in the case where the target intake negative pressure at that time is low, when the level of brake pedal depressing is comparatively low and the target braking force is comparatively small, the target braking force can be obtained with the master cylinder pressure without use of pump up pressure.

Figure 30:
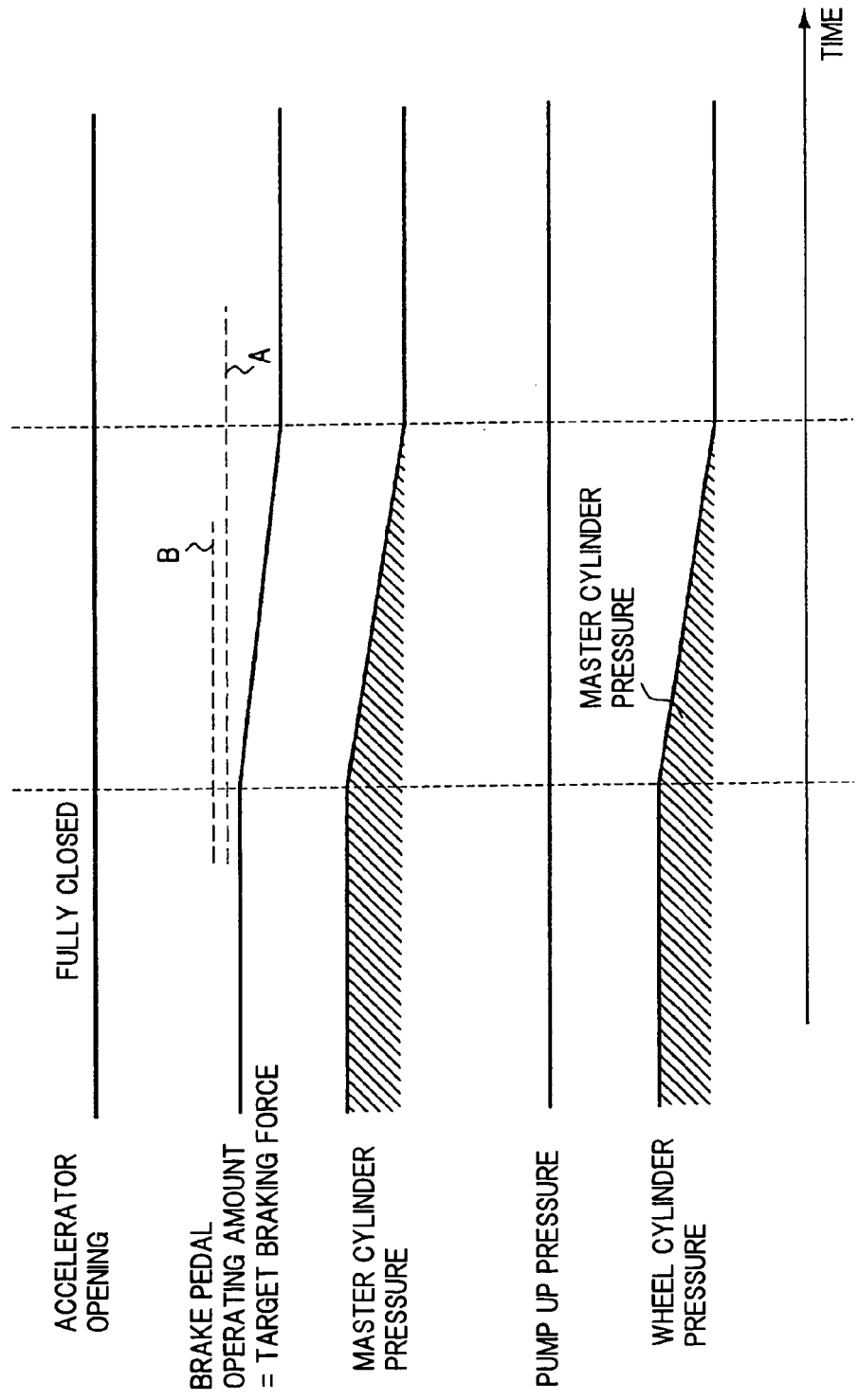
FIG. 30 is a time chart illustrating pressure changes in the case of operating the brake pedal to a small degree in the embodiment of the present invention.

The time chart of FIG. 30 shows an operation in which the foot is removed from the brake pedal after the state of being depressed at a comparatively low level shown in FIG. 29.

Since the level of brake pedal depressing was comparatively low and the target braking force was obtained with the master cylinder pressure without use of pump up pressure, then also when the foot is removed from the brake pedal, the wheel cylinder pressure is reduced accompanying the reduction in the master cylinder pressure, and the braking force is gradually reduced as a result.

Figure 31:
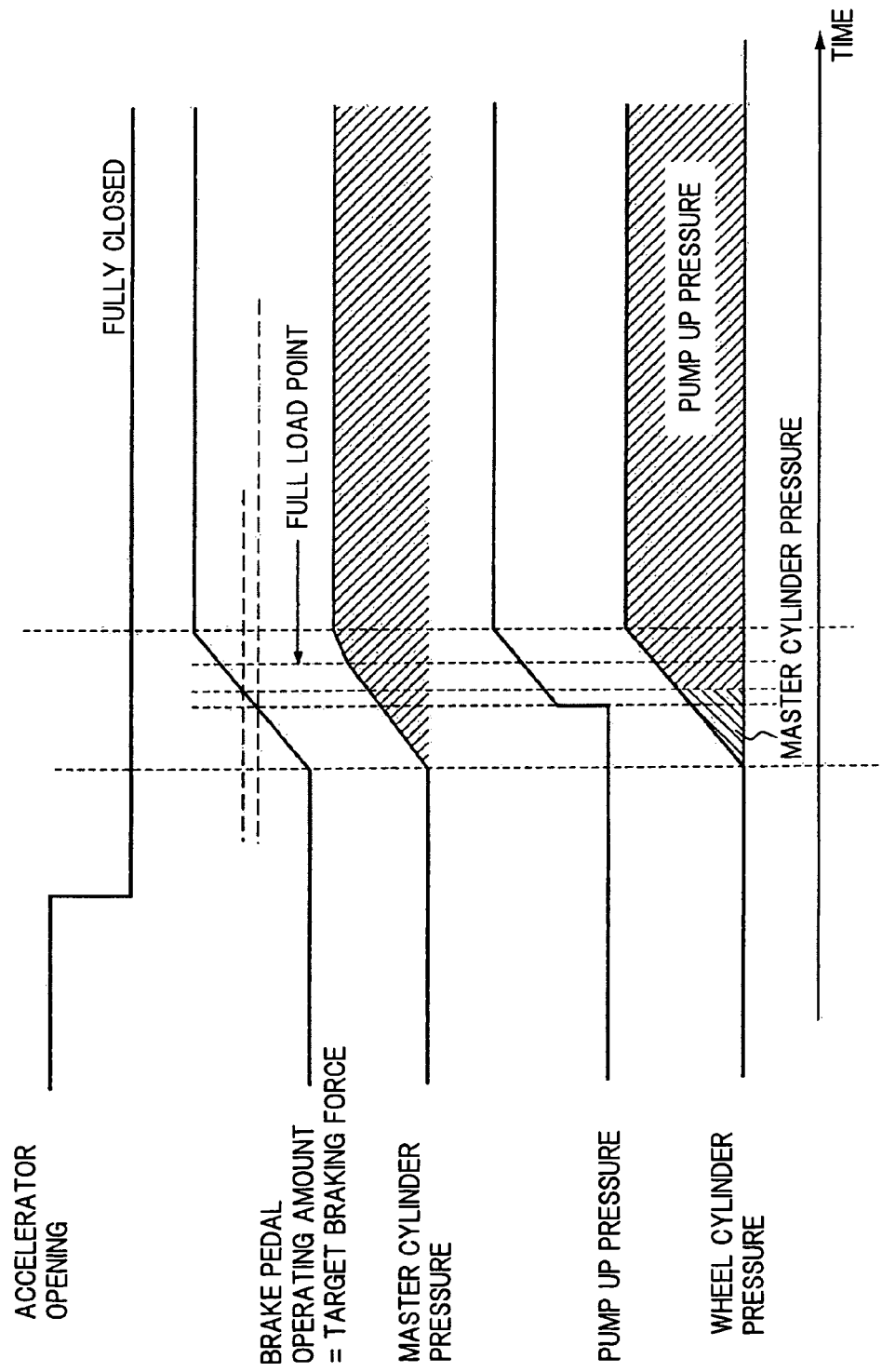
FIG. 31 is a time chart illustrating pressure changes in the case of operating the brake pedal to a large degree in the embodiment of the present invention.

On the other hand, the time chart of FIG. 31 shows an operation in the case where the level of brake pedal depressing is comparatively high, that is, in the case where the target braking force is comparatively large.

If the target braking force is less than the threshold values A and B immediately after the commencement of brake pedal depressing, the master cylinder pressure that increases accompanying the brake pedal depressing is directly supplied to the wheel cylinder. However, if the brake pedal is further depressed and the target braking force becomes greater than or equal to the threshold value A, pump motor 2004 starts driving.

Then if the brake pedal is further depressed and the target braking force reaches or exceeds the threshold value B, the pump up pressure raised by the pump is supplied to the wheel cylinder, and a request to exceed the braking force (master cylinder pressure) at the full load point of the brake booster 132a is realized by the pump up pressure.

Figure 32:
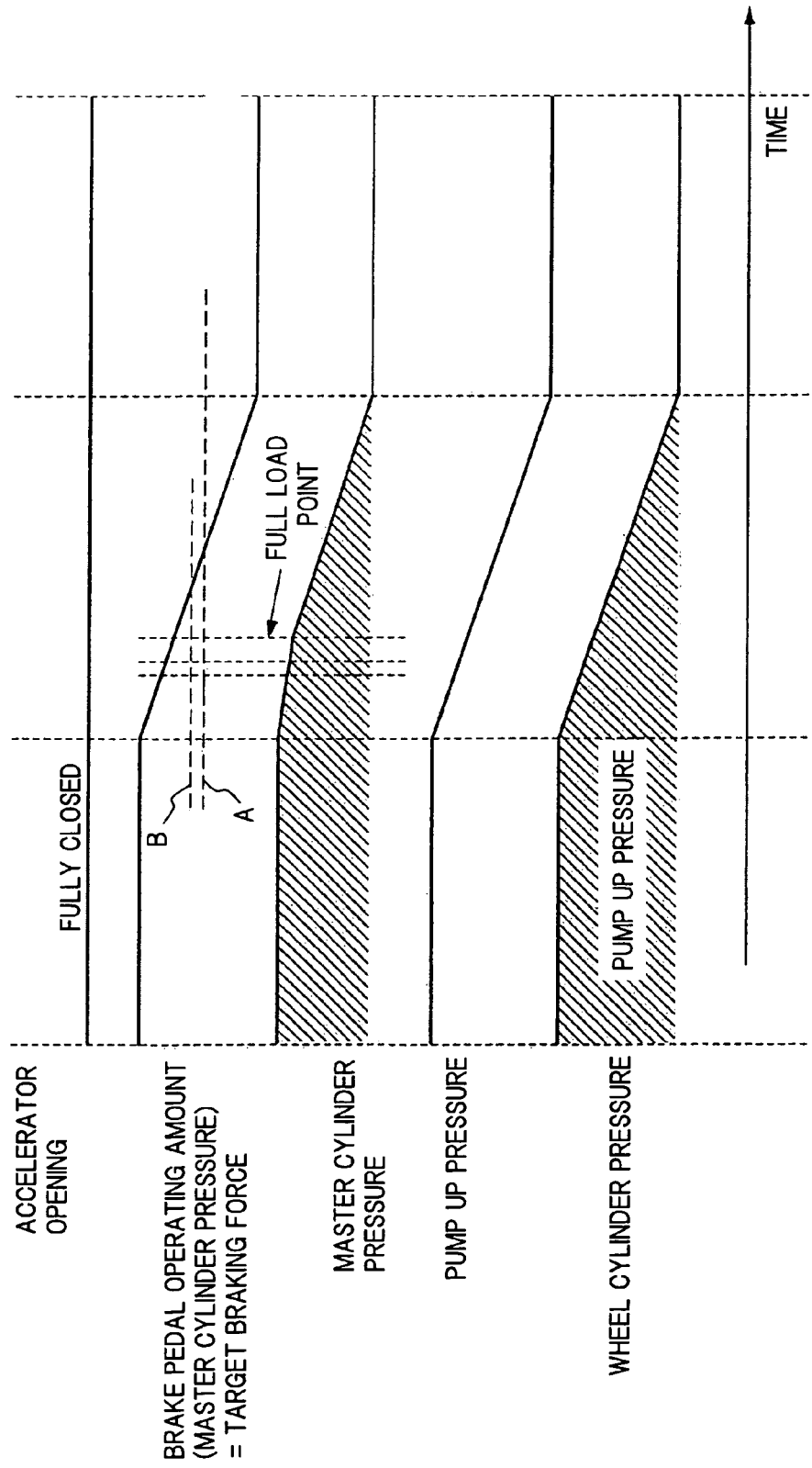
FIG. 32 is a time chart illustrating pressure changes in the case of operating the brake pedal to a large degree in the embodiment of the present invention.

The time chart of FIG. 32 shows an operation in which the foot is removed from the brake pedal after the state of the brake pedal being depressed at a high level.

In this case, a pump up pressure braking is commenced halfway through the brake pedal depressing operation. Therefore, the pump up control is not stopped even when the target braking force drops across the threshold values A and B, and the wheel cylinder pressure is controlled for the target braking force by controlling on/off of the pump and supply/discharge of pump up pressure until the target braking force becomes zero.

Incidentally, if an abnormality occurs in variable valve lift mechanism (VEL) 112 or electronically controlled throttle (ETB) 104 provided in engine 101, or if an abnormality occurs in the brake hydraulic circuit shown in FIG. 12 and FIG. 25, a desired braking force may not be achievable in some cases in the normal control described above.

Figure 33:
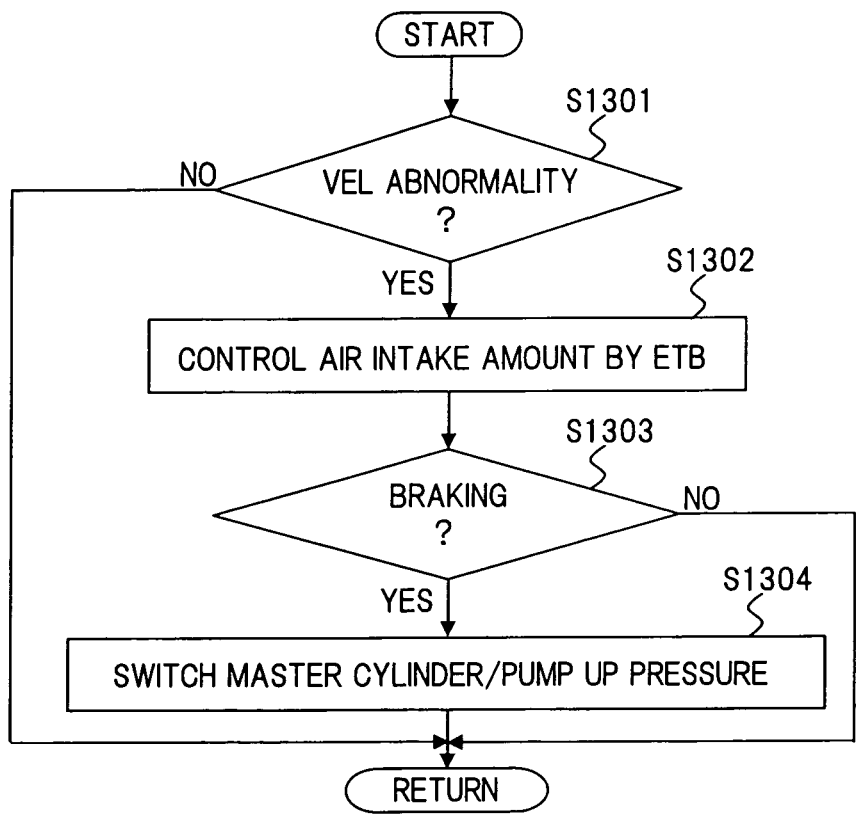
FIG. 33 is a flow chart illustrating a process in the case where an abnormality has occurred in the variable valve lift mechanism (VEL) in the embodiment of the present invention.
Figure 34:
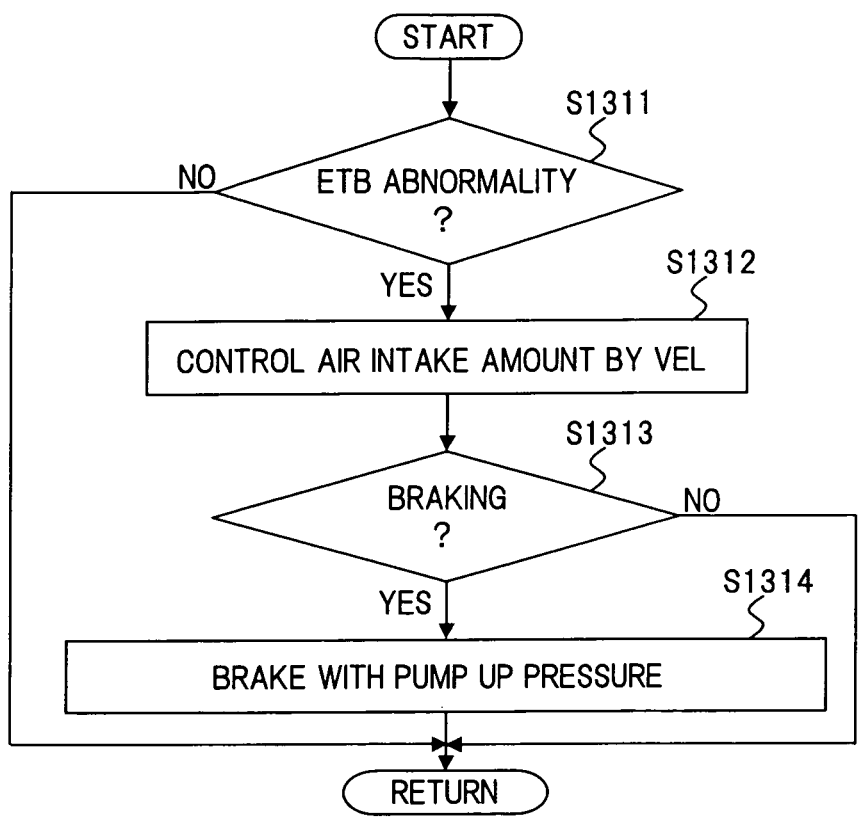
FIG. 34 is a flow chart illustrating a process in the case where an abnormality has occurred in an electronically controlled throttle (ETB) in the embodiment of the present invention.
Figure 35:
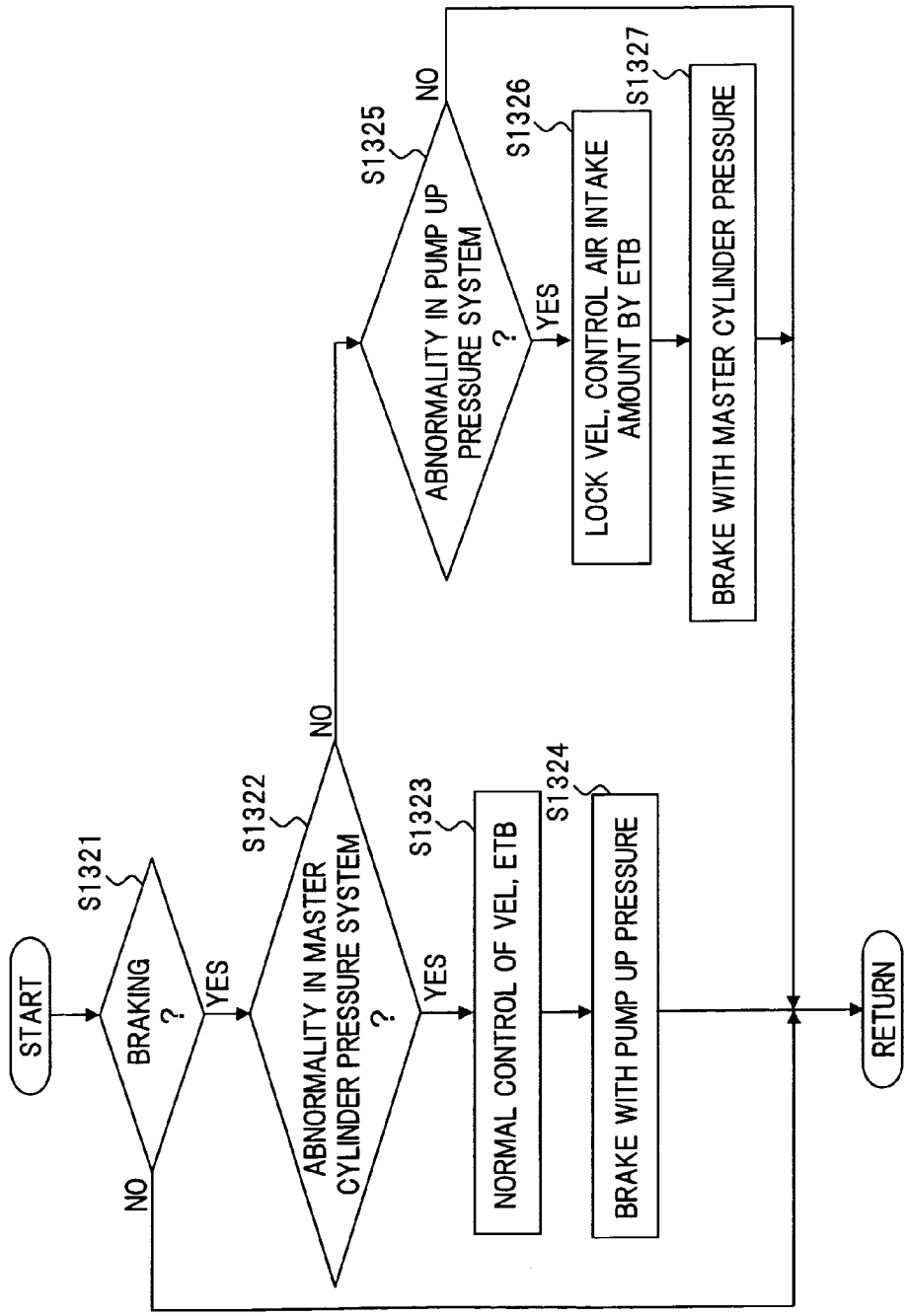
FIG. 35 is a flow chart illustrating a process in the case where an abnormality has occurred in the brake hydraulic circuit in the embodiment of the present invention.

Consequently, processes shown in the flow charts of FIG. 33 to FIG. 35 are executed as a fail-safe sequence for the above abnormalities.

The flow chart in FIG. 33 shows a process in the case where an abnormality occurs in variable valve lift mechanism (VEL) 112.

In step S1301, it is determined whether or not an abnormality is occurring in variable valve lift mechanism (VEL) 112.

For example, in the case where the actual valve lift amount does not become close to the target valve lift amount, specifically, in the case where the deviation between both of these amounts continues to be greater than or equal to a predetermined value for a predetermined period of time or longer, an abnormality in variable valve lift mechanism (VEL) 112 can be determined.

Moreover, when a sensor for detecting the actual valve lift amount fails to operate, an abnormality in variable valve lift mechanism (VEL) 112 can be determined.

In step S1301, if an occurrence of an abnormality in variable valve lift mechanism (VEL) 112 is determined, the sequence proceeds to step S1302 where control of changing the valve lift amount performed by variable valve lift mechanism (VEL) 112 is stopped, and electronically controlled throttle (ETB) 104 performs air-intake amount control of engine 101.

Then in step S1303, it is determined whether or not the brake pedal is being operated. If the brake pedal is being operated, the sequence proceeds to step S1304 where switching control between master cylinder pressure supply and pump up pressure supply is performed, in accordance with the flow charts in FIG. 18 or FIG. 26, based on the comparison between the threshold values A, B and the target braking force according to the brake pedal operating amount.

However, in the case where the abnormality in variable valve lift mechanism (VEL) 112 is such that the valve lift amount of intake valve 105 is locked at a low level, it may not be possible to generate a high level of intake negative pressure in some cases even if electronically controlled throttle (ETB) 104 is controlled based on the target air intake amount.

Therefore, a braking with pump up pressure can be performed for the case of the valve lift amount being locked at a low level, or in the case of general abnormalities in variable valve lift mechanism (VEL) 112.

The flow chart in FIG. 34 shows a process in the case where an abnormality occurs in electronically controlled throttle (ETB) 104.

In step S1311, it is determined whether or not an abnormality is occurring in electronically controlled throttle (ETB) 104.

For example, in the case where the actual throttle opening does not reach the vicinity of the target throttle opening, specifically, in the case where the deviation between both of these openings continues to be greater than or equal to a predetermined value for a predetermined period of time or longer, an abnormality in electronically controlled throttle (ETB) 104 can be determined.

Moreover, when a sensor for detecting the actual throttle opening fails to operate, an abnormality in electronically controlled throttle (ETB) 104 can be determined.

In the case where there is an abnormality occurring in electronically controlled throttle (ETB) 104, the sequence proceeds to step S1312 where variable valve lift mechanism (VEL) 112 performs control of the air intake amount of engine 101.

Then in step S1313, it is determined whether or not the brake pedal is being operated, and if the brake pedal is being operated, the sequence proceeds to step S1314 where pump up pressure is supplied so as to obtain the target braking force.

In other words, in step S1314, the pump up pressure braking in step S1113 or step S1282 is executed.

This is because the abnormality in electronically controlled throttle (ETB) 104 makes it impossible to perform control of the intake negative pressure, and it is to obtain the target braking force without being influenced by the intake negative pressure by supplying pump up pressure so as to obtain the target braking force.

However, in the case where an abnormality occurs in electronically controlled throttle (ETB) 104 causing its opening to be locked in the vicinity of full opening, the intake negative pressure is locked at a high level, and therefore it is possible to perform braking with a master cylinder pressure supply.

The flow chart in FIG. 35 shows a process in the case where an abnormality occurs in the brake hydraulic circuit.

In step S1321, it is determined whether or not the brake pedal is being operated, and if the brake pedal is being operated, the sequence proceeds to step S1322.

In step S1322, it is determined whether or not an abnormality is occurring in a master cylinder pressure supply system (brake booster 132*a* or master cylinder 203).

For example, if the deviation between the target wheel cylinder pressure (target braking force) and the actual wheel cylinder pressure continues to be greater than or equal to a predetermined value for a predetermined period of time or longer in a state of operating braking with master cylinder pressure, then it is determined that there is an abnormality occurring in the master cylinder pressure supply system.

In the case where there is an abnormality occurring in the master cylinder pressure supply system, the sequence proceeds to step S1323 where electronically controlled throttle (ETB) 104 and variable valve lift mechanism (VEL) 112 are normally controlled.

In the next step S1324, a control to obtain the target braking force with pump up pressure is performed, and thereby a desired braking force can be obtained even if there is an abnormality in master cylinder pressure.

In other words, in step S1324, the pump up pressure braking in step S1113 or step S1282 is executed.

On the other hand, if it is determined in step S1322 that there are no abnormalities occurring in the master cylinder pressure supply system, sequence proceeds to step S1325.

In step S1325, it is determined whether or not an abnormality is occurring in a pump up pressure supply system (pump/motor).

For example, if the deviation between the target wheel cylinder pressure (target braking force) and the actual wheel cylinder pressure continues to be greater than or equal to a predetermined value for a predetermined period of time or longer in a state of operating braking with pump up pressure, then it is determined that there is an abnormality occurring in the pump up pressure supply system.

In the case where there is an abnormality occurring in the pump up pressure supply system, the sequence proceeds to step S1326 where the target valve lift amount in variable valve lift mechanism (VEL) 112 is fixed at a value equal to that of an engine in which the valve lift amount of intake valve 105 is not variable, and electronically controlled throttle (ETB) 104 performs control of air intake amount.

Then in step S1327, no pump up pressure supply is performed and master cylinder pressure is supplied to the wheel cylinder.

Here, as a result of electronically controlled throttle (ETB) 104 performing the control of air intake amount, a high level of intake negative pressure is generated. Therefore, it is possible to generate the target braking force with master cylinder pressure.

The processes shown in the flow charts in FIG. 33 to FIG. 35 assume the case of an abnormality occurring independently.

Incidentally, in engine 101 shown in FIG. 1, fuel injection valve 130 is disposed in air intake port 102A. However, as shown in FIG. 36, it is also possible to employ the brake system according to the invention of the present application in an in-cylinder direct injection type engine in which fuel injection valve 130 directly injects fuel into combustion chamber 106.

Figure 36:
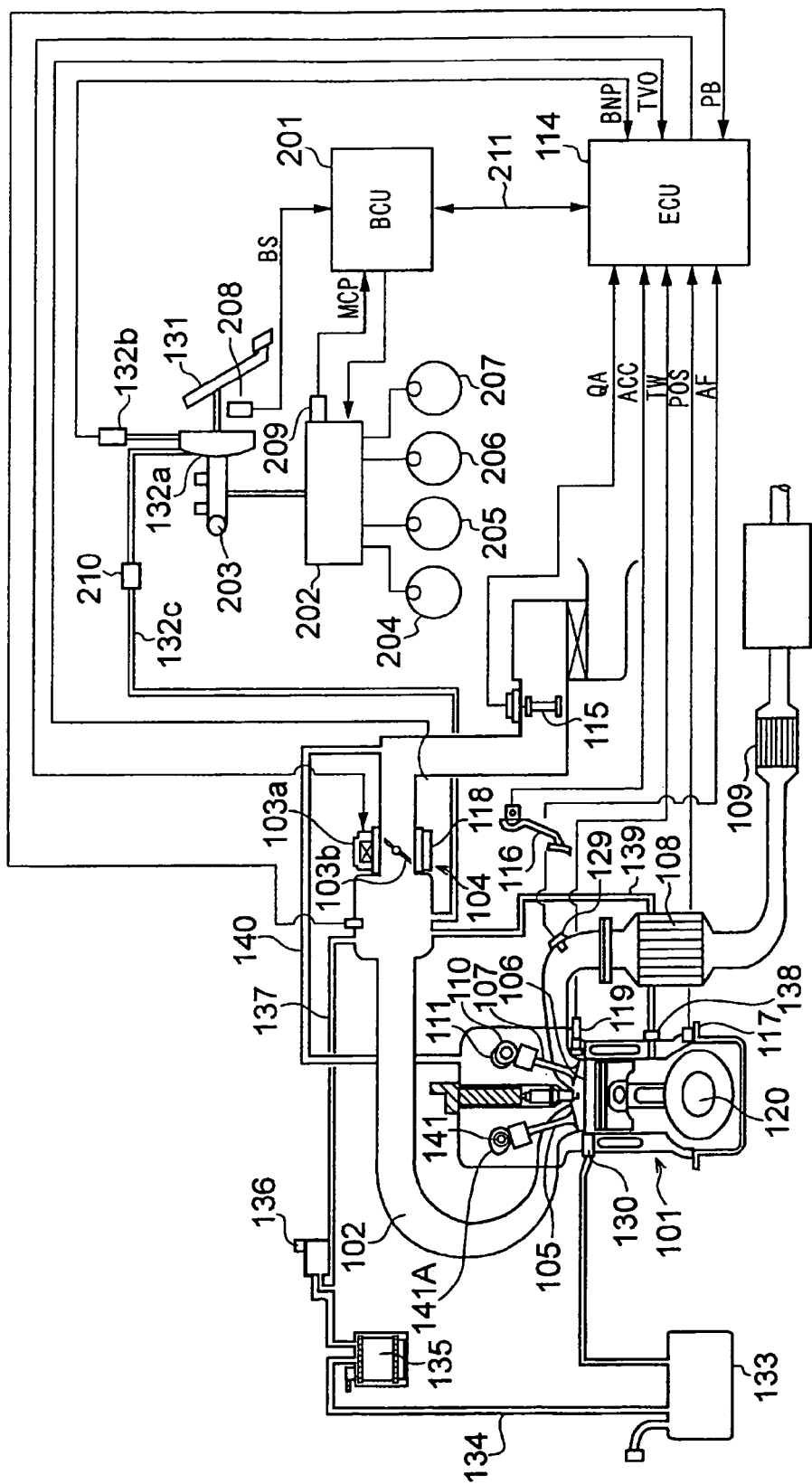
FIG. 36 is a diagram illustrating an in-cylinder direct injection type engine in the embodiment of the present invention.

In engine 101 shown in FIG. 36, engine 101 shown in FIG. 1 has been modified so as to change the installation location of fuel injection valve 130 from air intake port 102A to the cylinder block, so that an injection port of fuel injection valve 130 is directed directly into combustion chamber 106.

Furthermore, in in-cylinder direct injection type engine 101 shown in FIG. 36, variable valve lift mechanism 112 and variable timing mechanism 113 that enable variation in the opening characteristic of intake valve 105 are not provided, and intake valve 105 is driven by a cam 141A pivotally supported on an intake cam shaft 141 so as to open and close while maintaining a constant valve lift amount, valve operating angle, and valve timing.

Therefore, in in-cylinder direct injection type engine 101 shown in FIG. 36, the amount of air intake is controlled by electronically controlled throttle (ETB) 104.

In FIG. 36, the same reference symbols are given to components common to those shown in FIG. 1, and detailed descriptions thereof are omitted.

In-cylinder direct injection type engine 101 may be an engine comprising a mechanism for varying the opening characteristic of intake valve 105 in variable valve lift mechanism 112 and variable valve timing mechanism 113.

In in-cylinder direct injection type engine 101, stratified charging is possible in which an air-fuel mixture is stratified within combustion chamber 106 so as to be combusted. With stratified charging the air-fuel ratio can be made very lean.

Moreover when the air-fuel ratio is made very lean, it is necessary to ensure the energy amount by increasing the air amount from an amount in the case of a rich air-fuel ratio, and by increasing the opening of electronically controlled throttle (ETB) 104 in order to increase the air amount, pumping loss is reduced and fuel economy performance can be improved.

However, while an increase in the opening of electronically controlled throttle (ETB) 104 results in reduced pumping loss, it reduces intake negative pressure. Therefore, by using braking with pump up pressure, a braking force can be ensured while achieving a reduction in pumping loss.

Figure 37:
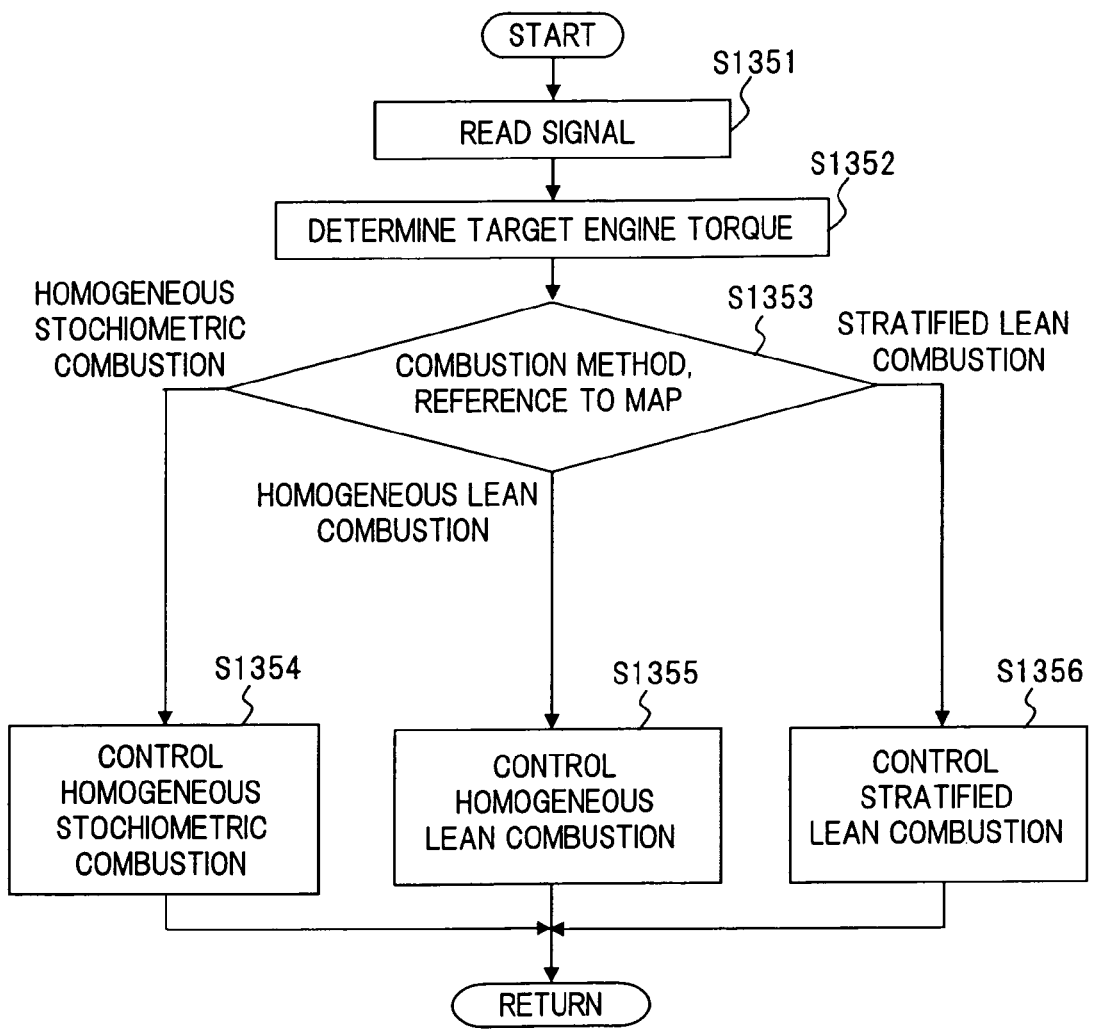
FIG. 37 is a flow chart illustrating a control for switching combustion methods of the in-cylinder direct injection type engine in the embodiment of the present invention.

The flow chart of FIG. 37 shows a combustion control in in-cylinder direct injection type engine 101 shown in FIG. 36.

In step S1351, signals such as accelerator opening ACC, engine rotating speed NE, coolant temperature TW, and vehicle speed VSP, are read.

In step S1352, a target engine torque tTe is decided. The target engine torque tTe is decided by correcting a basic value set based on the accelerator opening ACC and vehicle speed VSP, in accordance with a gear ratio of a transmission gear that transmits the output of engine 101 to driving wheels, and with a torque ratio of a torque converter.

In step S1353, a combustion method is decided.

In engine 101 there are set three types of combustion methods namely; homogeneous stochiometric combustion, homogeneous lean combustion, and stratified lean combustion.

The homogeneous stochiometric combustion and the homogeneous lean combustion are combustion modes in which a homogeneous air-fuel mixture is created within combustion chamber 106 by injection during the air intake stroke. In the homogeneous stochiometric combustion a homogeneous air-fuel mixture is created at a theoretical air-fuel ratio, and in the homogeneous lean combustion a homogeneous mixture is created at an air-fuel ratio that is leaner than the theoretical air-fuel ratio (air-fuel ratio=20 to 30).

Moreover, the stratified lean combustion is a combustion mode in which the average air-fuel ratio is approximately 40, and a comparatively rich air-fuel mixture is created in a region around a spark plug by injection during the compression stroke, thereby enabling stable ignition/combustion with the spark plug.

Figure 38:
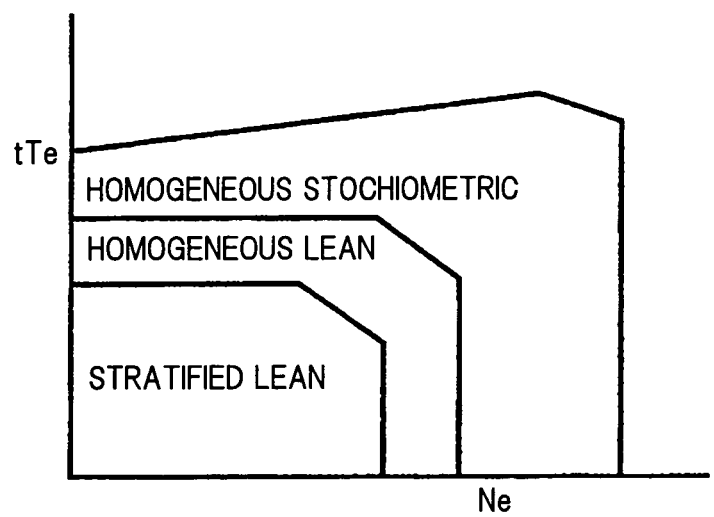
FIG. 38 is a diagram illustrating regions of the respective combustion methods of the in-cylinder direct injection type engine in the embodiment of the present invention.

When deciding a combustion method, as shown in FIG. 38, reference is made to a map in which the combustion methods are stored for each of regions pre-divided according to target engine torque tTe and engine rotating speed NE, and a combustion method that corresponds to the target engine torque tTe and the engine rotating speed NE at that time is found.

Then if the homogeneous stochiometric combustion is selected, the sequence proceeds to step S1354, and fuel injection control for the homogeneous stochiometric combustion is executed.

In the homogeneous stochiometric combustion, while a fuel injection amount is set to an amount corresponding to a theoretical air-fuel ratio, rich/lean of the actual air-fuel ratio for the theoretical air-fuel ratio is determined based on a signal according to the oxygen concentration in the exhaust gas output from an oxygen sensor 129, and a feedback correction coefficient is set based on this rich/lean determination result to correct the fuel injection amount with the feedback correction coefficient.

Then based on the fuel injection amount that has been corrected with the feedback correction coefficient, fuel injection valve 130 performs fuel injection in the air intake stroke.

Moreover, if the homogeneous lean combustion is selected, the sequence proceeds to step S1355, and fuel injection control for the homogeneous lean combustion is executed.

In the homogeneous lean combustion, while the fuel injection amount is set to an amount that corresponds to a lean air-fuel ratio (air-fuel ratio=20 to 30), the air-fuel ratio feedback control based on an output from oxygen sensor 129 is stopped, and fuel injection valve 130 performs fuel injection in the air intake stroke based on the above fuel injection amount.

Furthermore, if the stratified lean combustion is selected, then the sequence proceeds to step S1356, and fuel injection control for the stratified lean combustion is executed.

In the stratified lean combustion, while the fuel injection amount is set to an amount that corresponds to a lean air-fuel ratio (air-fuel ratio=approximately 40), the air-fuel ratio feedback control based on an output from oxygen sensor 129 is stopped, and fuel injection valve 130 performs fuel injection in the compression stroke based on the above fuel injection amount.

In the above homogeneous stochiometric combustion, the homogeneous lean combustion, and the stratified lean combustion, opening of electronically controlled throttle (ETB) 104 is controlled so that an air intake amount that enables a target engine torque at a target air-fuel ratio of each of the combustion modes is achieved.

In the homogeneous lean combustion and the stratified lean combustion, the air-fuel ratio is set leaner than the theoretical air-fuel ratio. Therefore, in order to generate a torque the same as that in the case of a richer air-fuel ratio, it is necessary to suction a greater amount of air into the cylinder, and by increasing the throttle opening for increasing the air intake amount, pumping loss can be reduced.

Particularly during the stratified lean combustion, since the air-fuel ratio is made very lean, the throttle opening is controlled to open wider. Consequently, however, as the boost negative pressure of brake booster 132*a* becomes insufficient, the boost for the brake operating force with brake booster 132*a* becomes disabled.

Figure 39:
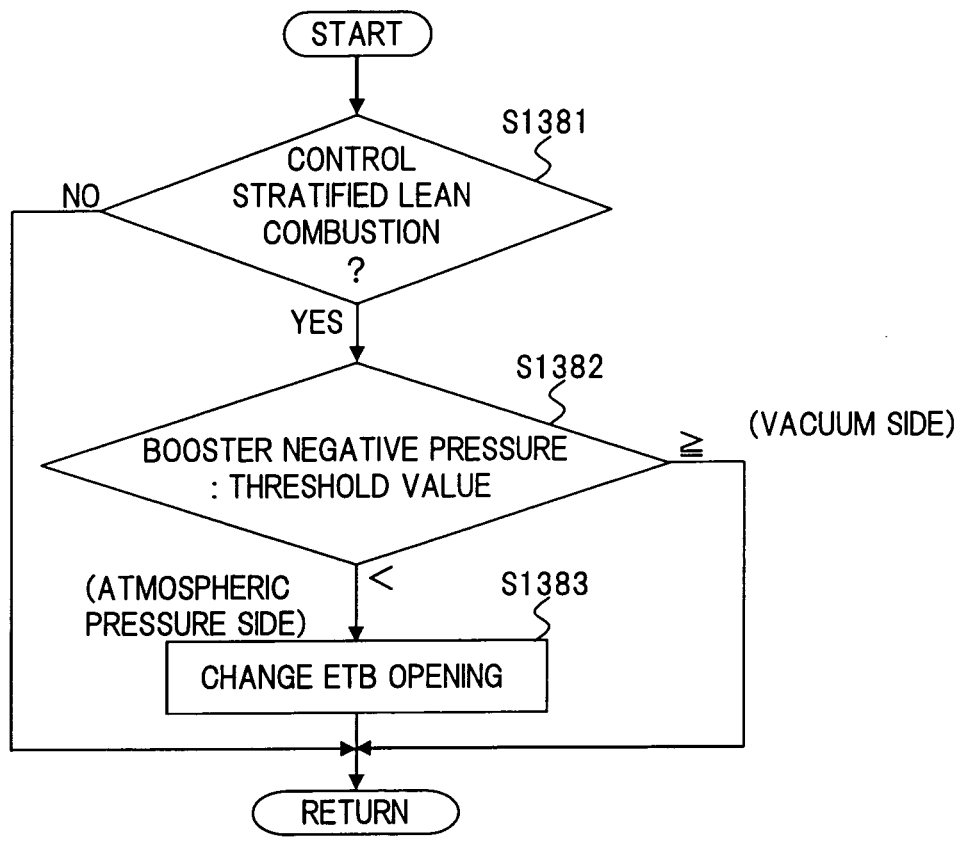
FIG. 39 is a flow chart illustrating a correction process for throttle opening of the in-cylinder direct injection type engine in the embodiment of the present invention.

Consequently, in order to generate the bare minimum intake negative pressure required in brake booster 132*a*, opening of electronically controlled throttle (ETB) 104 is forcefully changed according to the flow chart of FIG. 39.

First, in step S1381, it is determined whether or not it is in the stratified lean combustion state, and if in the stratified lean combustion state, the sequence proceeds to step S1382.

In step S1382, it is determined whether or not the booster negative pressure (or intake negative pressure) at that time is less than a threshold value SL1 (minimum allowable value).

Here, if the booster negative pressure is less than the threshold value SL1 (minimum allowable value) and is in the vicinity of atmospheric pressure, the sequence proceeds to step S1383 where the target opening of electronically controlled throttle (ETB) 104 is changed to an opening at which the booster negative pressure is equal to the threshold value (minimum allowable value).

Specifically, reference is made to a map in which throttle openings, at which the intake negative pressure is at the target value, are stored, according to the target engine torque tTe and the engine rotating speed NE, and a throttle opening at which the intake negative pressure is at the target value under a condition of the target engine torque tTe and the engine rotating speed NE at that time, is retrieved. Accordingly, the throttle opening that has been retrieved is taken as the target opening of electronically controlled throttle (ETB) 104.

Regarding the change to be made in the target throttle opening in step S1383, the target throttle opening is changed to be smaller, and as a result the air intake amount is reduced. Therefore, in order to generate the target engine torque tTe, it is necessary to increase the fuel injection amount, and hence the air-fuel ratio is changed to rich.

Under an operating condition in the stratified lean combustion where booster negative pressure is less than the threshold value SL1 (minimum allowable value), it is possible to switch to the homogeneous lean combustion or to the homogeneous stochiometric combustion.

If the stratified lean combustion is switched to the homogeneous lean combustion or to the homogeneous stochiometric combustion, the target air-fuel ratio is changed to be richer. Therefore, in order to generate the same level of torque, it is necessary to reduce the throttle opening to the reduce air intake amount, resulting in an increase in intake negative pressure.

Figure 40:
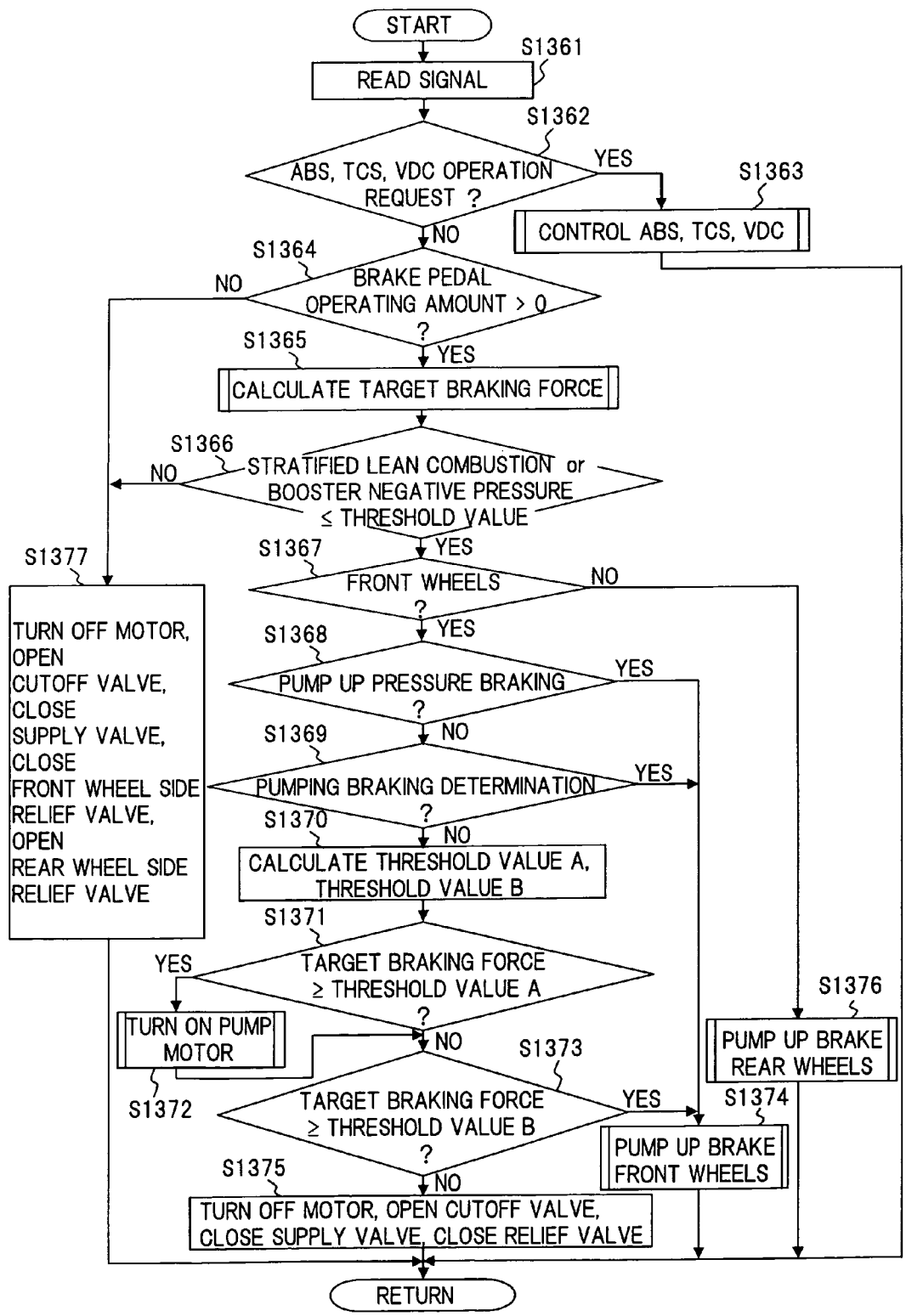
FIG. 40 is a flow chart illustrating a control of the brake hydraulic circuit that uses intake negative pressure of the in-cylinder direct injection type engine in the embodiment of the present invention.

The flow chart of FIG. 40 shows a pump pressure supply control in the case where the boost of brake booster 132*a* is performed with use of the intake negative pressure of in-cylinder direct injection type engine 101.

The brake control shown in the flow chart of FIG. 40 shows a control in the case where the brake hydraulic circuit shown in FIG. 12 is used.

Moreover, as an additional step to the flow chart of FIG. 18 between the step for calculating a target braking force and the step for determining front wheels/rear wheels, the flow chart of FIG. 40 includes a step for determining whether or not it is a stratified lean combustion, and/or for determining whether or not booster negative pressure is less than or equal to a threshold value. Processes similar to those of the steps in the flow chart of FIG. 18 are performed in other steps in the flow chart of FIG. 40.

In step S1361, signals indicating; an operating amount of the brake pedal (stroke amount or master cylinder pressure), booster pressure, wheel cylinder pressure, and the like are read.

In step S1362, it is determined whether or not there is a request for operating the ABS (anti lock braking system), the TCS (traction control system), or the VDC (vehicle dynamics control).

In the case where there is a request for operating the ABS, the TCS, or the VDC, the sequence proceeds to step S1363 where a control to increase/decrease or maintain the brake fluid pressure is performed according to the request for the ABS, TCS, or VDC.

On the other hand, in the case where there is no request for operating the ABS, the TCS, or the VDC, the sequence proceeds to step S1364.

In step S1364, based on whether or not the operating amount of brake pedal 131 is greater than or equal to the reference amount (for example, zero), it is determined whether or not braking is being operated (whether or not there is a braking request from the driver).

The brake pedal operating amount includes; a stroke amount BS of brake pedal 131 detected by brake pedal sensor 208, a master cylinder pressure MCP detected by fluid pressure sensor 209, and a stepping force of brake pedal 131 detected by a stepping force sensor.

If braking is not being operated, the sequence proceeds to step S1377 where cutoff valves 2002A and 2002B are opened, motor 2003 is turned off, supply valves 2005A to 2005D are closed, relief valves 2020A and 2020B on the front wheel side are closed, and relief valves 2020C and 2020D on the rear wheel side are opened.

Consequently, there is created a state where master cylinder pressure may be supplied to wheel cylinders 204 and 205 on the front wheel side, and wheel cylinders 206 and 207 on the rear wheel side are connected to reservoir pipe 2009, further creating a state where the cylinder pressure of wheel cylinders 206 and 207 may be relieved.

Meanwhile, when braking is being operated, the sequence proceeds to step S1365, and a target braking force (target wheel cylinder pressure) is calculated as with the above step S1105.

In step S1366, a determination as to whether or not it is a stratified lean combustion and/or a determination as to whether or not booster negative pressure is less than or equal to a threshold value SL2 (>SL1) are performed.

In the region where the stratified lean combustion is selected, as described above, the air-fuel ratio is made very lean and the throttle opening is increased, thereby reducing pumping loss to improve fuel economy.

However, if the throttle opening is increased, intake negative pressure is reduced and master cylinder pressure obtained by the boost of brake booster 132*a* is reduced, and if the throttle opening is reduced in order to ensure sufficient intake negative pressure, pumping loss is increased and fuel economy is deteriorated as a result.

Consequently, in the brake control shown in the flow chart of FIG. 40, during the stratified lean combustion in which intake negative pressure is reduced, if the target braking force cannot be obtained by the boost of brake booster 132a with use of the intake negative pressure at that time, braking is to be performed with pump up pressure.

The determination in the above step S1366 is to determine whether or not it is necessary to perform braking with pump up pressure by determining whether or not it is a stratified lean combustion in which intake negative pressure is suppressed low. It determines whether or not it is a stratified lean combustion or determines if the booster negative pressure at that time has become a booster negative pressure in the stratified lean combustion state.

In step S1366, if stratified lean combustion is determined, and/or booster negative pressure is determined as a booster negative pressure in the stratified lean combustion state, the sequence proceeds to step S1367.

In step S1367, it is determined whether to perform a control of the wheel cylinder pressure for the front wheel, or to perform a control of the wheel cylinder pressure for the rear wheel.

Here, in the case of performing a control of the wheel cylinder pressure for the front wheel, the sequence proceeds from step S1367 to step S1368.

The determination in step S1367 illustrates that the controls of the wheel cylinder pressure differ from each other between the front and rear wheels. In reality, the control of the wheel cylinder pressure of the front wheel (processes from step S1368 to step S1375), and the control of the wheel cylinder pressure of the rear wheel (process in step S1376) are executed in parallel.

In step S1368, it is determined whether or not a pump up pressure braking, in which discharge pressure (pump up pressure) of pump 2004 is supplied to wheel cylinders 204 and 205 of the front wheels to perform braking, is being operated.

Then if the pump up pressure braking is determined as being operated, the sequence proceeds to step S1374 and the pump up pressure braking is continued.

On the other hand, if the pump up pressure braking is not determined as being operated, the sequence proceeds to step S1369 and it is determined whether or not a pumping braking is being operated.

If the pump up pressure braking is not being operated and the pumping braking is not being operated either, the sequence proceeds to step S1370.

In step S1370, based on the booster negative pressure BNP (negative pressure of the negative pressure chamber of brake booster 132a), the threshold value A and threshold value B of the above target braking force is set as with the above step S1109.

In step S1371, by determining whether or not the target braking force is greater than or equal to the threshold value A, it is determined whether or not pump 2004 (motor 2003) is at a timing to start driving.

Then when the target braking force reaches or exceeds the threshold value A, the sequence proceeds to step S1372, and application of electric current to motor 2003 is commenced.

In step S1373, it is determined whether or not the target braking force has reached or exceeded the threshold value B.

When the target braking force has reached or exceeded the threshold value B, the sequence proceeds to step S1374 to shift from the previous state where master cylinder pressure is supplied to wheel cylinders 204 and 205 of the front wheels for performing braking, to a pump up pressure braking state where the discharge pressure of pump 2004 (pump up pressure) is supplied to wheel cylinders 204 and 205 for performing braking.

On the other hand, when the target braking force is less than the threshold value A, and when the target braking force is no less than the threshold value A and is no greater than the threshold value B, the sequence proceeds to step S1375 where; cutoff valves 2002A and 2002B are opened, motor 2003 is turned off, supply valves 2005A and 2005B are closed, and relief valves 2020A and 2020B are closed, to perform braking with master cylinder pressure.

On the other hand, if a control of the rear wheels is determined in step S1367, the sequence proceeds to step S1376 where a pump up pressure supply control for wheel cylinders 206 and 207 of the rear wheels is performed.

Details of controls in the above step S1374 and step S1376 are as illustrated in the flow charts of FIG. 22 and FIG. 23.

In-cylinder direct injection type engine 101 and the brake hydraulic circuit shown in FIG. 25 can be combined. In this case, immediately after it is determined to be in the braking state in step S1274 in the flow chart of FIG. 26, determination of whether or not it is a stratified lean combustion and/or determination of whether or not the booster negative pressure is less than or equal to the threshold value SL2 is performed.

Then if it is determined as a stratified lean combustion and/or it is determined that the booster negative pressure is booster negative pressure in the stratified lean combustion state, the sequence proceeds to step S1275, and if it is determined to be not stratified lean combustion and/or it is determined that the booster negative pressure is not booster negative pressure in the stratified lean combustion state, the sequence proceeds to step S1283.

According to the above brake control, the braking is performed with pump up pressure in the case where the target braking force cannot be obtained by the boost with use of the intake negative pressure at that time. As a result, braking with the target braking force can be realized while keeping intake negative pressure to be generated in stratified lean combustion in in-cylinder direct injection type engine 101 low.

Furthermore, since pump up pressure is supplied to the wheel cylinder, there is no need for providing a vacuum tank for braking for compensating for any deficiency in master cylinder pressure, and it is possible to reduce manufacturing cost of the brake hydraulic circuit while increasing freedom of component layout within the engine room.

Incidentally, if an abnormality occurs in electronically controlled throttle (ETB) 104 provided in in-cylinder direct injection type engine 101, or if an abnormality occurs in the brake hydraulic circuit shown in FIG. 12 and FIG. 25, a desired braking force may not be achievable in some cases in the normal control described above.

Figure 41:
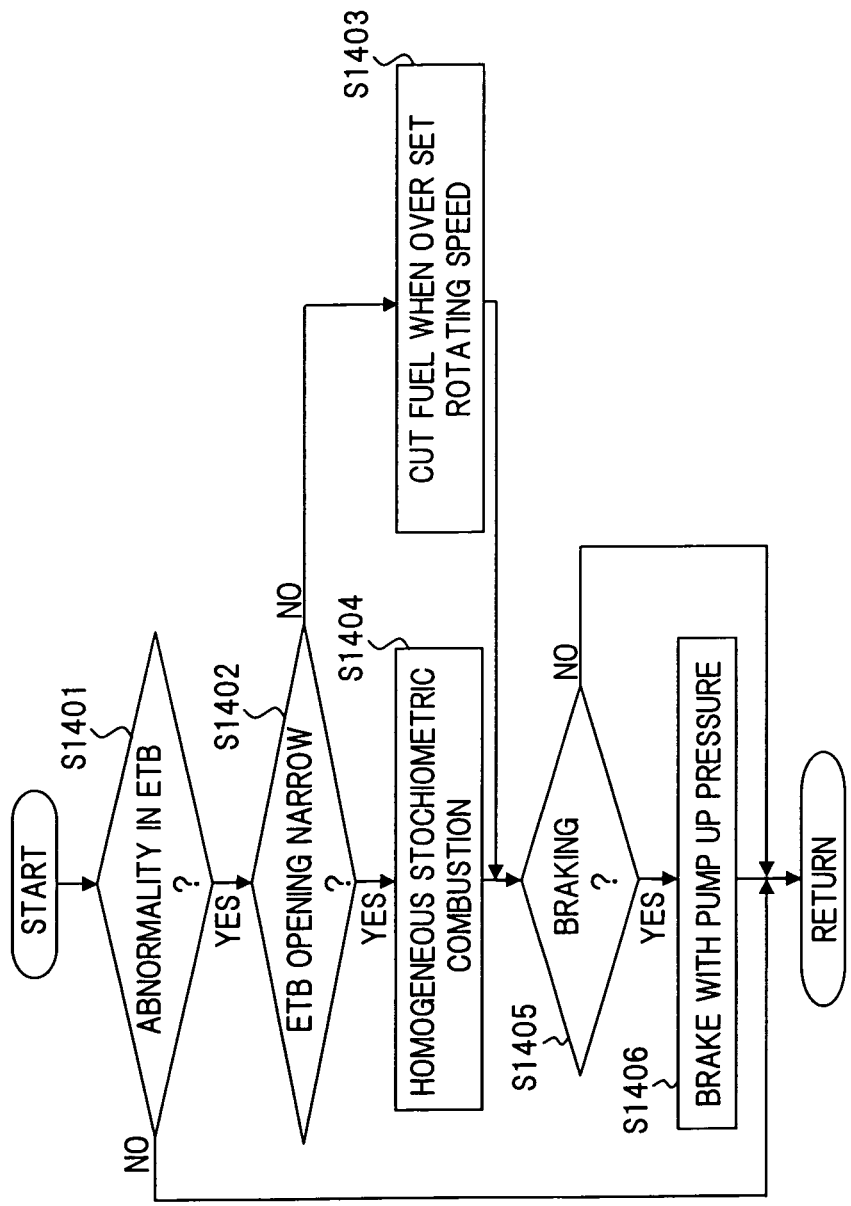
FIG. 41 is a flow chart illustrating a process in the case where an abnormality has occurred in an electronically controlled throttle (ETB) of the in-cylinder direct injection type engine in the embodiment of the present invention.
Figure 42:
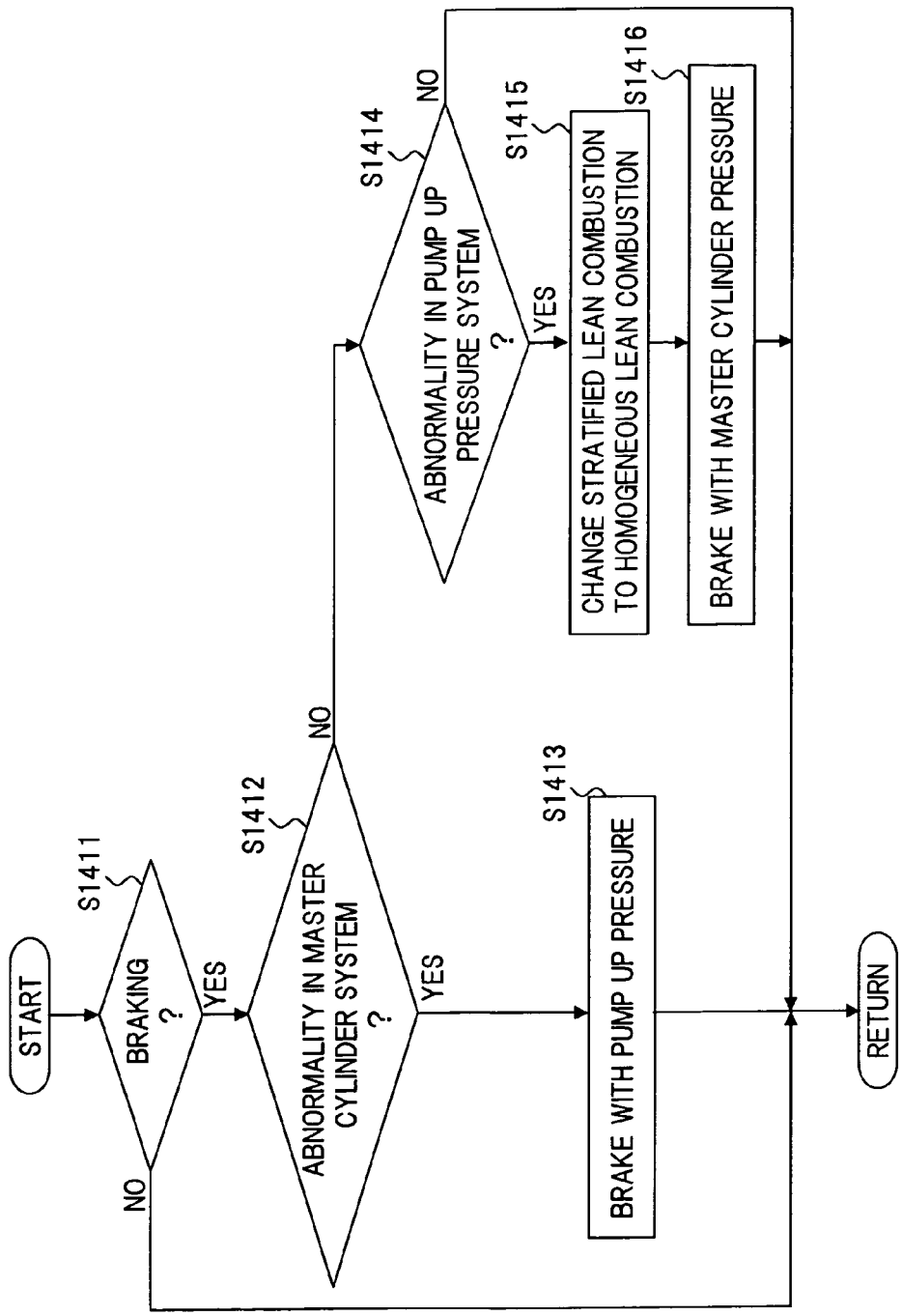
FIG. 42 is a flow chart illustrating a process in the case where an abnormality has occurred in the brake hydraulic circuit combined with the in-cylinder direct injection type engine in the embodiment of the present invention.

Consequently, processes shown in the flow charts of FIG. 41 and FIG. 42 are executed as a fail-safe sequence for the above abnormalities.

The flow chart in FIG. 41 illustrates a countermeasure for the case where an abnormality occurs in electronically controlled throttle (ETB) 104.

In step S1401, it is determined whether or not an abnormality is occurring in electronically controlled throttle (ETB) 104.

For example, in the case where the actual throttle opening does not reach the vicinity of the target throttle opening, specifically, in the case where the deviation between both of these openings continues to be greater than or equal to a predetermined value for a predetermined period of time or longer, an abnormality in electronically controlled throttle (ETB) 104 can be determined.

Moreover, when a sensor for detecting the actual throttle opening fails to operate, an abnormality in electronically controlled throttle (ETB) 104 can be determined.

In the case where an abnormality is occurring in electronically controlled throttle (ETB) 104, the sequence proceeds to step S1402.

In step S1402, it is determined whether or not electronically controlled throttle (ETB) 104 is still in the narrow opening range (in the vicinity of full close).

In the case where electronically controlled throttle (ETB) 104 is still in the intermediate/wide opening range, the sequence proceeds to step S1403 and fuel cut is executed when the engine rotating speed NE reaches or exceeds a set rotating speed to limit engine output.

That is to say, in the case where electronically controlled throttle (ETB) 104 is locked at an intermediate/wide opening and is unable to reduce air intake amount, the engine torque exceeds the target engine torque if an amount of fuel suitable for the air intake amount is injected. Therefore by executing fuel cut, generation of an excessively large engine torque can be prevented.

In the process in step S1403, as long as the engine torque can be limited, fuel injection to the same cylinder may be performed less frequently, or may be stopped for some of the cylinders, instead of executing fuel cut.

Moreover, the combustion method in the case where the sequence proceeds to step S1403 may be any one of; the homogeneous stochiometric combustion, the homogeneous lean combustion, and the stratified lean combustion. Furthermore, by forcefully performing the stratified lean combustion (by making the target air-fuel ratio lean), the engine torque can be limited.

On the other hand, in the case where electronically controlled throttle (ETB) 104 is locked at a low opening, the sequence proceeds to step S1404.

In step S1404, the combustion method is set to homogeneous stochiometric combustion, and an amount of engine torque required for traveling in the low air intake amount state is obtained.

In step S1405, it is determined whether or not braking is being operated, and if braking is being operated, the sequence proceeds to step S1406 to perform braking with pump up pressure, from the commencement of the braking.

Therefore, even if electronically controlled throttle (ETB) 104 is locked at an intermediate/wide opening and is unable to normally generate intake negative pressure, a required braking force can still be generated.

In the case where electronically controlled throttle (ETB) 104 is locked at a low opening, a significant intake negative pressure can be generated. Therefore, braking with master cylinder pressure can be performed.

The flow chart in FIG. 42 shows a countermeasure for the case where an abnormality occurs in the brake hydraulic circuit.

In step S1411, it is determined whether or not the brake pedal is being operated (whether or not braking is being operated). If braking is determined the sequence proceeds to step S1412.

In step S1412, it is determined whether or not an abnormality is occurring in a master cylinder pressure supply system (brake booster/master cylinder).

For example, if the deviation between the target wheel cylinder pressure (target braking force) and the actual wheel cylinder pressure continues to be greater than or equal to a predetermined value for a predetermined period of time or longer in a state of operating braking with master cylinder pressure, it is determined that there is an abnormality occurring in the master cylinder pressure supply system.

If an abnormality is occurring in the master cylinder pressure supply system, the sequence proceeds to step S1413 and a control to obtain a target braking force with pump up pressure is performed, thereby enabling to obtain a desired braking force even with the abnormality in the master cylinder pressure.

On the other hand, if it is determined in step S1412 that there are no abnormalities occurring in the master cylinder pressure supply system, the sequence proceeds to step S1414.

In step S1414, it is determined whether or not an abnormality is occurring in a pump up pressure supply system (pump/motor).

For example, if the deviation between the target wheel cylinder pressure (target braking force) and the actual wheel cylinder pressure continues to be greater than or equal to a predetermined value for a predetermined period of time or longer in a state of operating braking with pump up pressure, it is determined that there is an abnormality occurring in the pump up pressure supply system.

Figure 43:
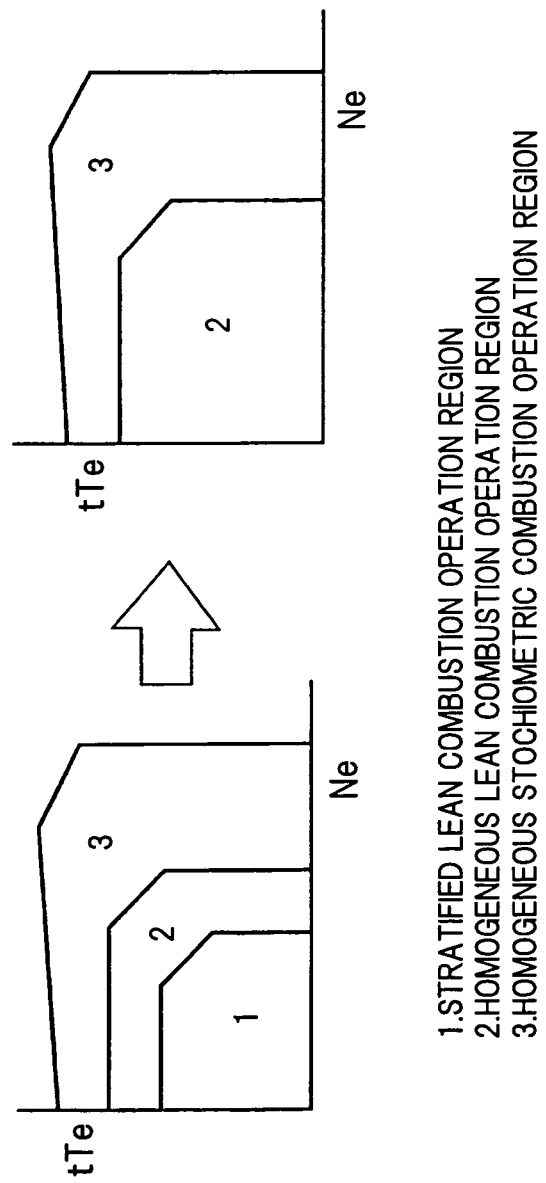
FIG. 43 is a diagram illustrating a process for changing the regions of the respective combustion methods of the in-cylinder direct injection type engine in the embodiment of the present invention.

If an abnormality is occurring in the pump up pressure supply system, the sequence proceeds to step S1415, and as shown in FIG. 43, a change is made to the combustion method to perform homogeneous lean combustion in the stratified lean combustion region. Furthermore, in the next step S1416, braking is not performed with pump up pressure, and braking is performed with master cylinder pressure.

The target air-fuel ratio in the stratified lean combustion is leaner than the target air-fuel ratio in the homogeneous lean combustion. Therefore, in order to generate the same amount of target engine torque, the stratified lean combustion requires an amount of air greater than that required in the homogeneous lean combustion.

Consequently, in the stratified lean combustion the throttle opening is made wider compared to in the homogeneous lean combustion, resulting in a reduced intake negative pressure.

In other words, if the stratified lean combustion is switched to the homogeneous lean combustion, the throttle opening is controlled to be narrower, and intake negative pressure is increased as a result.

Therefore, in the case where braking with pump up pressure is not possible, a greater level of intake negative pressure is generated by switching from the stratified lean combustion to the homogeneous lean combustion, so that it is possible to generate a required braking force with master cylinder pressure.

The brake system according to the present patent application is not limited to the combination with a gasoline spark ignition engine, and may be applied to a diesel engine provided with the electronically controlled throttle (ETB) 104.

That is to say, also in a diesel engine in which the opening of electronically controlled throttle (ETB) 104 is reduced to generate intake negative pressure, in the case where the target braking force is greater than a threshold value according to the booster negative pressure at that time, if braking with pump up pressure is performed, a required braking force can be generated while keeping the target of the intake negative pressure low. As a result, a braking force can be ensured while reducing pumping loss.

Moreover, in the above embodiment, wheel cylinder pressure sensors 2015A to 2015D detect the wheel cylinder pressure in each of wheel cylinders 204 to 207. However, the wheel cylinder pressure may be estimated and pump up pressure may be controlled based on this estimation result.

Figure 44:
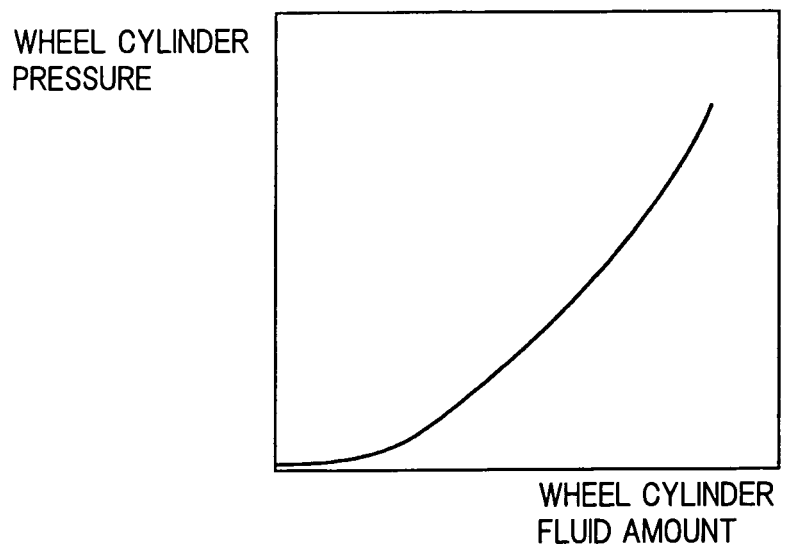
FIG. 44 is a graph illustrating a relationship between wheel cylinder fluid amount and wheel cylinder pressure in the embodiment of the present invention.

As shown in FIG. 44, there is a constant correlation between the fluid amount of wheel cylinders 204 to 207 and the wheel cylinder pressure. Therefore the wheel cylinder pressure can be estimated from the fluid amount of wheel cylinders 204 to 207 using the correlation.

The fluid amount QW of wheel cylinders 204 to 207 can be found, in the case of the brake hydraulic circuit in FIG. 25 for example, from the liquid amount Qw1 discharged from pumps 2053A and 2053B and the liquid Qw2 flowing out from gate valves 2052A and 2052B.

$$QW = Qw1 - Qw2$$

Here, the fluid amount Qw1 discharged from pumps 2053A and 2053B is an integrated value of the discharge flow rate q1 of pumps 2053A and 2053B.

$$Qw1 = \int q1 \, dt$$

Moreover, the discharge flow rate q1 of pumps 2503A and 2053B is calculated as follows from; discharge fluid amount Vp per one revolution of pumps 2053A and 2053B, rotating speed N of motor 2067, and leakage flow rate qL for inside pumps 2053A and 2053B.

$$q1 = Vp \times N - qL$$

Figure 45:
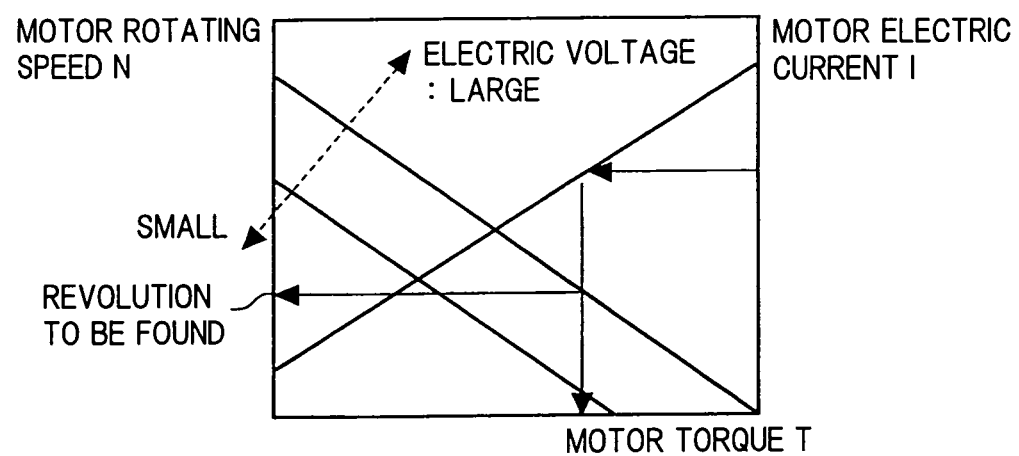
FIG. 45 is a graph illustrating a relationship between motor electric current, motor electric voltage, and motor rotating speed N in the embodiment of the present invention.

The discharge fluid value Vp is a fixed value that is defined for each of pumps 2053A and 2053B. The rotating speed N of motor 2067 can be found as shown in FIG. 45 from the motor electric current and the motor electric voltage.

Figure 46:
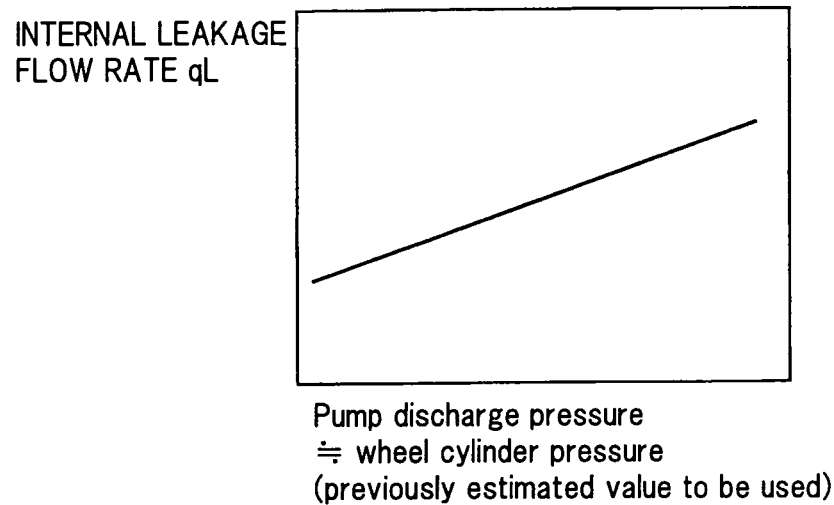
FIG. 46 is a graph illustrating a relationship between pump discharge pressure and leakage flow rate in the embodiment of the present invention.

Furthermore, between the pump discharge pressure (wheel cylinder pressure) and the leakage flow rate qL, there is a constant correlation as shown in FIG. 46. Therefore, the leakage flow rate qL can be found from the previous estimate result of the wheel cylinder pressure.

That is to say, the pump discharge flow rate q1 is found by detecting the motor electric current and the motor electric voltage, and by integrating this pump discharge flow rate q1, the fluid amount Qw1 due to discharge from the pump is found.

Figure 47:
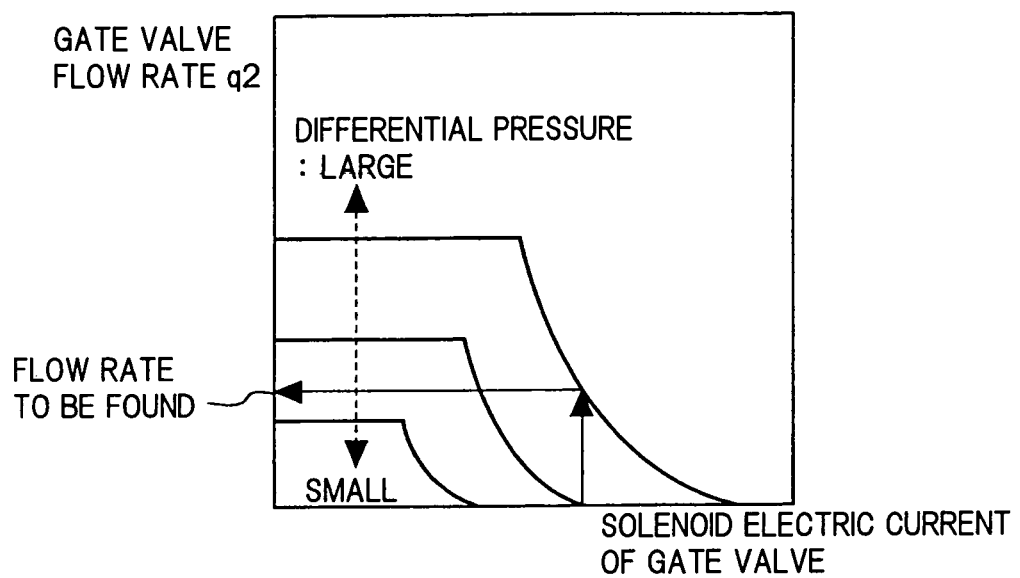
FIG. 47 is a graph illustrating a relationship between solenoid electric current of a gate valve, differential pressure across the gate valve, and flow rate through the gate valve, in the embodiment of the present invention.

On the other hand, as shown in FIG. 47, the fluid amount Qw2 that flows out from gate valves 2052A and 2052B can be found from the differential pressure between the wheel cylinder pressure and the master cylinder pressure, and the solenoid electric current of gate valves 2052A and 2052B.

The previous estimate result is used as the wheel cylinder pressure for finding the differential pressure, and a value detected by fluid sensor 209 is used as the master cylinder pressure.

Here, since gate valves 2052A and 2052B are biased towards the valve opening direction by a spring and are closed by an electromagnetic force, the solenoid electric current is low, and the fluid amount Qw2 becomes greater for a greater differential pressure across gate valves 2052A and 2052B.

As described above, the fluid amount Qw2 can be found by detecting the solenoid electric current of gate valves 2052A and 2052B, and the master cylinder pressure, and the wheel cylinder fluid amount QW can be found from the difference between the fluid amount Qw1 and the fluid amount Qw2.

Based on the fluid amount QW of wheel cylinders 204 to 207, the graph of FIG. 44 is referenced, and the wheel cylinder pressure is estimated.

The entire contents of Japanese Patent Application No. 2008-064021, filed Mar. 13, 2008 are incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing description of the embodiments according to the present invention is provided for illustration only, and not for the purpose of limiting the invention as defined by the appended claims and their equivalents.

We claim:

1. A brake system for a vehicle having mounted thereon an engine having a torque control unit that controls a variable valve lift mechanism capable of continuously changing a valve lift amount of an intake valve to generate a target torque, and a negative pressure control unit that controls an electronically controlled throttle to generate a target intake negative pressure, comprising:
    a booster unit configured to use intake negative pressure of the engine to produce a boosted brake operating force for the vehicle;
    a first pressure generator unit configured to generate a first brake fluid pressure according to the boosted brake operating force produced by the booster unit;
    a second pressure generator unit configured to generate a second brake fluid pressure by means of an electric brake fluid pump;
    a request detection unit configured to detect a degree of a driver-applied-braking-force;
    a switching unit configured to controllably switch supply of a brake fluid pressure to a wheel cylinder in a manner such that: the supply of the first brake fluid pressure to the wheel cylinder takes place when the degree of the driver-applied-braking-force is less than a driver-applied-braking-force threshold value, and the supply of the second brake fluid pressure switching from the first brake fluid pressure takes place when the degree of the driver-applied-braking-force is greater than or equal to the threshold value;
    a driver-applied-braking-force threshold value setting unit configured to vary a setting of the driver-applied-braking-force threshold value in real-time, relative to a real-time intake negative pressure of the engine;
    a first diagnosing unit configured to diagnose whether or not an abnormality occurs in the second brake fluid pressure; and
    a first fail safe unit configured to fix the valve lift amount of the intake valve in the variable valve lift mechanism to a predetermined value while controlling a torque by the electronically controlled throttle, and to inhibit the supply of the second brake fluid pressure to the wheel cylinder while allowing the supply of the first brake fluid pressure to the wheel cylinder, when the abnormality is diagnosed in the second brake fluid pressure.

2. A brake system for a vehicle according to claim 1, further comprising
    a negative pressure detection unit configured to detect a negative pressure of a negative pressure chamber of the booster unit, wherein
    the driver-applied-braking-force threshold value setting unit sets the driver-applied-braking-force threshold value according to the negative pressure of the negative pressure chamber.

3. A brake system for a vehicle according to claim 1, wherein
    the driver-applied-braking-force threshold value setting unit sets the driver-applied-braking-force threshold value according to the target intake negative pressure.

4. A brake system for a vehicle according to claim 1, wherein
    the driver-applied-braking-force threshold value setting unit sets a first driver-applied-braking-force threshold value for determining switching of a brake fluid pressure source and a second driver-applied-braking-force threshold value for determining a start of driving of the brake fluid pump, the second driver-applied-braking-force threshold value being equal to or less than the first driver-applied-braking-force threshold value and, the switching unit allows the brake fluid pump to start to be driven at a time when the degree of the driver-applied-braking-force reaches or exceeds the second driver-applied-braking-force threshold value, and switches the supply of the first brake fluid pressure to the supply of the second brake fluid pressure to the wheel cylinder at a time when the degree of the driver-applied-braking-force reaches or exceeds the first driver-applied-braking-force threshold value.

5. A brake system for a vehicle according to claim 4, wherein the driver-applied-braking-force threshold value setting unit sets the first driver-applied-braking-force threshold value and sets the second driver-applied-braking-force threshold value to be smaller than the first driver-applied-braking-force threshold value, when a brake fluid temperature is less than or equal to a reference temperature, and sets the first driver-applied-braking-force threshold value and the second driver-applied-braking-force threshold value to an identical value, when the brake fluid temperature exceeds the reference temperature.

6. A brake system for a vehicle according to claim 1, wherein the request detection unit detects the degree of the drive-applied-braking-force based on an operating amount of a brake pedal of the vehicle.

7. A brake system for a vehicle according to claim 1, further comprising:

a brake fluid pressure detection unit configured to detect a brake fluid pressure prevailing in the wheel cylinder; and a brake fluid pressure control unit configured to control, in a state of supplying of the second brake fluid pressure to the wheel cylinder, the supply of the second brake fluid pressure to the wheel cylinder so that the brake fluid pressure prevailing in the wheel cylinder becomes a pressure that corresponds to the driver-applied-braking-force.

8. A brake system for a vehicle according to claim 1, further comprising:

a determination unit configured to determine execution of pumping braking; and a pumping braking control unit configured to conduct a switching from the first brake fluid pressure to the second brake fluid pressure when execution of pumping braking is determined.

9. A brake system for a vehicle according to claim 8, wherein the determination unit determines execution of pumping braking when the brake pedal is operated again within a set period of time after the brake pedal has been released.

10. A brake system for a vehicle according to claim 9, wherein the determination unit sets the set period of time to become longer than a current set period of time, in response to a predetermined reduction in the intake negative pressure of the engine as well as to lowering of an engine rotating speed.

11. A brake system for a vehicle according to claim 1, further comprising:

a diagnosing unit configured to diagnose whether or not an abnormality occurs in the negative pressure control unit; and a fail safe unit configured to inhibit the supply of the first brake fluid pressure to the wheel cylinder while allowing the supply of the second brake fluid pressure to the wheel cylinder, when the abnormality is diagnosed in the negative pressure control unit.

12. A brake system for a vehicle according to claim 1, further comprising:

a diagnosing unit configured to diagnose whether or not an abnormality occurs in the second brake fluid pressure; and a fail safe unit configured to inhibit the supply of the second brake fluid pressure to the wheel cylinder while allowing the supply of the first brake fluid pressure to the wheel cylinder, and to increase the target intake negative pressure in the negative pressure control unit, when the abnormality is diagnosed in the second brake fluid pressure.

13. A brake system for a vehicle according to claim 1, further comprising:

a diagnosing unit configured to diagnose whether or not an abnormality occurs in the first brake fluid pressure, and a fail safe unit configured to inhibit the supply of the first brake fluid pressure to the wheel cylinder while allowing the supply of the second brake fluid pressure to the wheel cylinder, when the abnormality is diagnosed in the first brake fluid pressure.

14. A brake control method for a vehicle having mounted thereon an engine having a torque control unit that controls a variable lift mechanism capable of continuously changing a valve lift amount of an intake valve to generate a target torque, and a negative pressure control unit capable of controlling an electronically controlled throttle to generate a target intake negative pressure, comprising:

employing an intake negative pressure of the engine for causing a brake operating force for the vehicle to be boosted;

generating a first brake fluid pressure according to the boosted brake operating force;

operating a brake fluid pump to generate a second brake fluid pressure;

detecting a degree of a driver-applied-braking-force;

supplying the first brake fluid pressure to a wheel cylinder when the driver-applied-braking-force is less than a driver-applied-braking-force threshold value;

switching supplying of the first brake fluid pressure to the wheel cylinder to supplying of the second brake fluid pressure to the wheel cylinder, when the driver-applied-braking-force is greater than or equal to the driver-applied-braking-force threshold value;

varying a setting of the driver-applied-braking-force threshold value in real-time, relative to a real-time intake negative pressure of the engine;

performing a first diagnosing to diagnose whether or not an abnormality occurs in the second brake fluid pressure; and when the abnormality is diagnosed in the second brake fluid pressure, fixing the valve lift amount of the intake valve in the variable valve lift mechanism to a predetermined value while controlling a torque by the electronically controlled throttle, and to inhibit the supply of the second brake fluid pressure to the wheel cylinder while allowing the supply of the first brake fluid pressure to the wheel cylinder.

15. A brake control method for a vehicle according to claim 14, wherein
the operation of setting the driver-applied-braking-force threshold value comprises:
detecting a negative pressure of a negative pressure chamber of the booster unit, to be used for boosting the brake operating force; and
setting the driver-applied-braking-force threshold value according to the negative pressure of the negative pressure chamber.

16. A brake control method for a vehicle according to claim 14, wherein
the operation of setting the driver-applied-braking-force threshold value comprises:
setting the driver-applied-braking-force threshold value according to the target intake negative pressure.

17. A brake control method for a vehicle according to claim 14, wherein
the operation of setting the driver-applied-braking-force threshold value comprises:
setting a first driver-applied-braking-force threshold value for determining switching of a brake fluid pressure source, while further setting a second driver-applied-braking-force threshold value for determining a start of driving of the brake fluid pump, the second driver-applied-braking-force threshold value being equal to or smaller than the first driver-applied-braking-force threshold value, and
the switching from the first brake fluid pressure to the second brake fluid pressure comprises:
starting driving of the brake fluid pump at a time when the degree of the driver-applied-braking-force reaches or exceeds the second driver-applied-braking-force threshold value; and
switching supplying of the first brake fluid pressure to the wheel cylinder to supplying of the second brake fluid pressure to the wheel cylinder, at a time when the driver-applied-braking-force reaches or exceeds the first driver-applied-braking-force threshold value.

18. A brake control method for a vehicle according to claim 17, wherein
the operation of setting the driver-applied-braking-force threshold values comprises:
setting the first driver-applied-braking-force threshold value and setting the second driver-applied-braking-force threshold value to be smaller than the first driver-applied-braking-force threshold value, when a brake fluid temperature is less than or equal to a reference temperature; and
setting the first driver-applied-braking-force threshold value and the second driver-applied-braking-force threshold value equal to each other, when the brake fluid temperature exceeds the reference temperature.

19. A brake control method for a vehicle according to claim 14, wherein
the operation of detecting the driver-applied-braking-force comprises:
detecting an operating amount of a brake pedal; and
determining the degree of the driver-applied-braking-force, based on the operating amount of the brake pedal.

20. A brake control method for a vehicle according to claim 14, further comprising:
detecting a brake fluid pressure prevailing in the wheel cylinder; and
controlling a supply operation of the second brake fluid pressure to the wheel cylinder during supplying of the second brake fluid pressure to the wheel cylinder, to thereby adjustably bring the brake fluid pressure prevailing in the wheel cylinder to a pressure corresponding to the driver-applied-braking-force.

21. A brake control method for a vehicle according to claim 14, further comprising:
determining whether or not pumping braking is executed; and
switching from the first brake fluid pressure to the second brake fluid pressure, when execution of pumping braking is determined as a result of the determining.

22. A brake control method for a vehicle according to claim 21, wherein
the operation of determining whether or not the pumping braking is executed comprises:
measuring a period of time from completion of releasing of a brake pedal to a reopening of operation of the brake pedal; and
determining that the pumping braking should be executed, when the period of time is shorter than or equal to a set period of time.

23. A brake control method for a vehicle according to claim 22, further comprising:
detecting the intake negative pressure of the engine;
detecting a rotating speed of the engine; and
setting the period of time to become longer than a current set period of time, in response to a predetermined reduction in the intake negative pressure of the engine and a lowering of the engine rotating speed.

24. A brake control method for a vehicle according to claim 14, further comprising:
diagnosing whether or not an abnormality occurs in the negative pressure control unit; and
inhibiting supply of the first brake fluid pressure to the wheel cylinder, while alternatively supplying the second brake fluid pressure to the wheel cylinder, when the diagnosing indicates occurrence of the abnormality in the negative pressure control unit.

25. A brake control method for a vehicle according to claim 14, further comprising:
diagnosing whether or not an abnormality occurs in the second brake fluid pressure;
inhibiting supply of the second brake fluid pressure to the wheel cylinder, while alternatively supplying the first brake fluid pressure to the wheel cylinder, when the diagnosing indicates occurrence of the abnormality in the second brake fluid pressure;
and
increasing the target intake negative pressure in the negative pressure control unit, when the diagnosing indicates occurrence of the abnormality in the second brake fluid pressure.

26. A brake control method for a vehicle according to claim 14, further comprising:
diagnosing whether or not an abnormality occurs in the first brake fluid pressure;
inhibiting supply of the first brake fluid pressure to the wheel cylinder, while alternatively supplying the second brake fluid pressure to the wheel cylinder, when the diagnosing indicates occurrence of the abnormality in the first brake fluid pressure.

27. A brake system for a vehicle having mounted thereon an engine provided with a torque control unit that controls a variable valve lift mechanism capable of continuously changing a valve lift amount of an intake valve to generate a target torque, and a negative pressure control means for controlling an electronically controlled throttle to generate a target intake negative pressure, comprising:

a booster means for boosting a brake operating force by using an intake negative pressure of the engine;

a first pressure generator means for generating a first brake fluid pressure according to the brake operating force boosted by the booster means;

a second pressure generator means for generating a second brake fluid pressure using an electric brake fluid pump means;

a request detection means for detecting a degree of a driver-applied-braking-force;

a switching means for permitting the first brake fluid pressure to be supplied to a wheel cylinder so long as the degree of the driver-applied-braking-force is less than a driver-applied-braking-force threshold value, and for switching supply of the first brake fluid pressure to the wheel cylinder over to supply of the second brake fluid pressure to the same wheel cylinder, when the degree of the driver-applied-braking-force becomes greater than or equal to the driver-applied-braking-force threshold value;

a driver-applied-braking-force threshold value setting means for varying a setting of the driver-applied-braking-force threshold value in real-time, relative to a real-time intake negative pressure of the engine;

a first diagnosing unit configured to diagnose whether or not an abnormality occurs in the second brake fluid pressure; and a first fail safe unit configured to fix the valve lift amount of the intake valve in the variable valve lift mechanism to a predetermined value while controlling a torque by the electronically controlled throttle, and to inhibit the supply of the second brake fluid pressure to the wheel cylinder while allowing the supply of the first brake fluid pressure to the wheel cylinder, when the abnormality is diagnosed in the second brake fluid pressure.

28. A brake system for a vehicle according to claim 1, further comprising:

a second diagnosing unit configured to diagnose whether or not an abnormality occurs in the electronically controlled throttle; and a second fail safe unit configured to allow the supply of the second brake fluid pressure to the wheel cylinder when the abnormality is diagnosed in the electronically controlled throttle.

29. A brake method for a vehicle according to claim 14, further comprising:

performing a second diagnosing to diagnose whether or not an abnormality occurs in the electronically controlled throttle; and allowing the supply of the second brake fluid pressure to the wheel cylinder when the abnormality is diagnosed in the electronically controlled throttle.

* * * * *